United States Patent US 7,966,246 B2
Ingargiola et al. (45) Date of Patent: Jun. 21, 2011

(54) USER INTERFACE FOR CORRELATION OF ANALYSIS SYSTEMS

(75) Inventors: Rosario M. Ingargiola, Novato, CA (US); Robert Levinson, Santa Cruz, CA (US)

(73) Assignee: Alphacet, Inc., Petaluma, CA (US)

( * ) Notice: Subject to any disclaimer, the term of this patent is extended or adjusted under 35 U.S.C. 154(b) by 1425 days.

(21) Appl. No.: 10/971,842

(22) Filed: Oct. 21, 2004

(65) Prior Publication Data

US 2005/0090911 A1    Apr. 28, 2005

Related U.S. Application Data

(60) Provisional application No. 60/514,033, filed on Oct. 23, 2003, provisional application No. 60/513,938, filed on Oct. 23, 2003.

(51) Int. Cl.
G06Q 40/00 (2006.01)
(52) U.S. Cl. .......................................... 705/37; 705/35
(58) Field of Classification Search .................... 705/37, 705/35
See application file for complete search history.

(56) References Cited

U.S. PATENT DOCUMENTS

| | | | | |
|---|---|---|---|---|
| 5,444,819 | A * | 8/1995 | Negishi | 706/21 |
| 6,735,580 | B1 * | 5/2004 | Li et al. | 706/21 |
| 6,993,504 | B1 * | 1/2006 | Friesen et al. | 705/37 |
| 7,464,052 | B1 * | 12/2008 | Coppola, III | 705/35 |
| 2002/0174043 | A1 * | 11/2002 | Gilbert et al. | 705/35 |
| 2005/0091146 | A1 * | 4/2005 | Levinson | 705/37 |

* cited by examiner

Primary Examiner — Jagdish N Patel
(74) Attorney, Agent, or Firm — Lowenstein Sandler PC

(57) ABSTRACT

A system for management, correlation, and combination of various analysis techniques is disclosed. Graphical user interface (GUI) controls and displays are provided to allow a user to configure different aspects of an analysis system. A financial analysis application allows a user to designate instruments whose data points, factors or other relevant data can be pre-processed with indicators. The outputs of the indicators are provided to advisors for calculation and grouping. A user is able to select the types of raw data to use, the instruments, the factors, the data feeds and other sources for data, the indicators that perform processing and the advisors that perform analysis, grouping and outputting of results for combining using machine learning mechanisms.

18 Claims, 27 Drawing Sheets

Advanced User Preferances

Spectrum Parameters
- ○ Default
- ○ Worst Performer
- ○ Median Performer ← 312
- ● Best Performer
- ○ k-th where k-th has performed best historically

Period Parameters
- ○ Last n prime numbered periods
- ○ Last n Fibonacci numbered periods
- ○ Random selection of n of the last m periods
- ● User defined set
  - where n = [ ]
  - where m = [ ] ← 314

Indicators/Advisors/Overlay Advisors
- ○ Use raw output values
- ○ Use change in the last n periods
  - where n = [ ]
- ○ Use change of the change in last n periods
  - where n = [ ]
- ○ Use chg of chg of the chg in the last n periods
  - where n = [ ]
- ○ Use slope/regression line over last n periods
  - where n = [ ]
- ○ Use SMA of n
- ● Use EMA of n where EMA is m periods
  - where m = [ ]
- ○ Use SMA of m
- ○ Use projected value ← 316
- ○ Ignore if below confidence n
  - where n = [ ]
- ○ Spectrum of any/all selected options

Look Back Time Frames
- ○ default ← 318
- ○ last n periods
- ● last n periods starting m periods ago
- ○ last n periods where n = last specific day of week [ Mon ▼ ]
- where n = [ ]

Normalization – Input Data
- ○ Default   ○ Use absolute value   ○ Use sign [ ]
- ○ Standard deviations from mean ← 320
- ○ Transform function n where n = [ ]
- ○ Gaussian range  ● Random range [ ] [ ]
- ○ Range remap [ ] [ ]

Normalization – Output Data
- ○ Default   ○ Use absolute value   ○ Use sign [ ]
- ○ Standard deviations from mean ← 322
- ● Transform function n where n = [ ]
- ○ Gaussian range  ○ Random range [ ] [ ]
- ○ Range remap [ ] [ ]

Learning Criterion – General          Weighting
- ○ Default
- ○ Maximize correct % (direction) [ ]
- ● Maximize correct % (magnitude) [ ]
- ○ Minimize consecutive error (direction) [ ]
- ○ Minimize consecutive error (magnitude) [ ]
- ○ Weighted sum of any/all (as %)    sum = 0.00%

← 324

[ Restore Defaults ]   [ Save / Continue ]
      326                    328

Instrument View - Output Screen

Preferences

| | | |
|---|---|---|
| Portfolio Name | Long/Short Equity - A | |
| Current View | Single Instrument | |
| Frequency | Multi-Period | ← 990 |
| Sort Mode | Frequency Order | |
| REPORT DATE | 9/23/04 | |
| REPORT TIME | 10:02:00 GMT | |
| CURRENT TIME | 10:05:00 GMT | |
| DATA SOURCE | eData | |

Show Rankings For [All Elements]   Show [Top 10]

| Strategy Element Name | Current Rank | Previous Rank | Current Strength | Previous Strength |
|---|---|---|---|---|
| User Defined Advisor | 1 | 3 | 7.25 | 5.55 |
| User Defined Volatility Advisor | 2 | 2 | 6.47 | 6.40 |
| DiNapoli Fibonacci Advisor | 3 | 1 | 6.24 | 7.35 |
| Buying Pressure Overlay Advisor | 4 | 7 | 5.95 | 3.79 |
| EMA 1-50 Day Spectrum Indicator | 5 | 6 | 5.68 | 5.53 |
| 3 Day Pivot Indicator | 6 | 8 | 5.43 | 4.98 |
| Positive Range Streak Indicator | 7 | 4 | 4.91 | 5.97 |
| Price Change of Crude Oil Factor | 8 | 10 | 4.82 | 4.12 |
| U.S. Dollar Index Cash Factor | 9 | 5 | 4.53 | 5.46 |
| 3 Day Slow RSI Indicator | 10 | 9 | 4.16 | 4.25 |

[Export History]

← 994

LONG - Multi-Period ← 992

| Instrument Name | Symbol | Current Price | Frequency | Predicted Next Close | Magnitude | Confidence/Probability | Stop Loss | Take Profit | Gain/Loss Ratio (x1) |
|---|---|---|---|---|---|---|---|---|---|
| S&P Deposit Receipts | SPY | 104.57 | 30 Minute | 104.69 | 0.12 [0.11%] | 7 | 104.45 [-0.08|-0.08%] | 104.66 [0.09|0.08%] | 1.12 |
| | | | 1 Hour | 104.35 | 0.22 [-0.21%] | 5 | NA | NA | NA |
| | | | 4 Hour | 104.89 | 0.32 [0.31%] | 9 | 104.41 [-0.12|-0.11%] | 104.85 [0.32|0.31%] | 2.66 |
| | | | 1 Day | 105.13 | 0.56 [0.54%] | 10 | 104.35 [-0.22|-0.20%] | 105.01 [0.44|0.43%] | 2.01 |
| | | | 2 Day | 105.85 | 1.28 [1.22%] | 9 | 104.29 [-0.24|-0.22%] | 105.77 [1.20|1.17%] | 4.99 |
| | | | 3 Day | 106.21 | 1.64 [1.57%] | 9 | 104.21 [-0.36|-0.31%] | 106.05 [1.48|1.37%] | 4.11 |
| | | | 4 Day | 106.47 | 1.90 [1.82%] | 9 | 104.14 [-0.43|-0.39%] | 106.33 [1.76|1.65%] | 4.09 |
| | | | 1 Week | 106.74 | 2.17 [2.08%] | 9 | 104.03 [-0.54|-0.48%] | 106.47 [1.91|1.79%] | 3.53 |

Figure 22-B

USER INTERFACE FOR CORRELATION OF ANALYSIS SYSTEMS

CLAIM OF PRIORITY

This patent application claims the priority and benefit of the following provisional patent applications fully incorporated herein by reference thereto as if repeated verbatim immediately hereinafter. Benefit of these filing dates is claimed with respect to all common subject matter:

Application No. 60/513,938, filed Oct. 23, 2003, entitled "SYSTEM AND METHOD FOR PREDICTING STOCK PRICES"; and Application No. 60/514,033 and filed Oct. 23, 2003, entitled "INTELLIGENT AGENTS FOR PREDICTIVE MODELING".

RELATED APPLICATIONS

This invention is related to the following co-pending U.S. patent applications fully incorporated herein by reference thereto as if repeated verbatim immediately hereinafter:

Ser. No. 10/970,892 filed on Oct. 21, 2004, entitled "SYSTEM AND METHOD FOR PREDICTING STOCK PRICES"; and Ser. No. 10/971,954 filed on Oct. 21, 2004, entitled "INTELLIGENT AGENTS FOR PREDICTIVE MODELING".

BACKGROUND OF THE INVENTION

This invention is related in general to digital processing systems and more specifically to a system for modeling, analyzing and predicting the behavior of-a process or system by correlating the results of other analysis.

Computer systems provide powerful analysis tools in business, research, education, government and other fields. One field of interest includes the analysis of financial markets and instruments. For example, stock, bond, option, commodity and derivatives trading has been the subject of many types of published techniques, whether automated ("agents") or manual. As the field of financial analysis has progressed, these techniques have become more numerous and varied. Often different techniques may work well in some situations, or for a certain period of time, but will fail to provide desirable results in other situations or at other periods of time.

For example, one technique may be to combine the performance of a group of stocks of companies in a common market, such as production of natural gas and oil. The general movement of the group of companies (i.e., up or down in price) can be used to predict the probable movement of another individual company in the same market. While this technique might work well where general market trends are the dominating factor in the market's price, the technique might not work well or even at all when a singular factor, such as an excessively high price to earnings ratio, can cause a company's current stock price to decline even when the general market trend for the that company's industry is increasing.

Some techniques may operate on simple concepts but may use variables -or parameters that must be characterized or selected by a human user or operator in order to arrive at an analysis or prediction. For example, the common measure of a "moving average" of a stock's price is a simple calculation but the start and end of the time period used to calculate the moving average can be infinitely variable. Other parameters can include the resolution of samples (e.g., per day, hour, minute, etc.), the manner of display of the results (e.g., table, plot, bar graph), and the type of data to which the technique is applied.

Although traditional techniques have proven to be useful for prediction and analysis of systems such as financial markets, as the number and complexity of techniques grows it is often difficult for a human user of the techniques to effectively use the techniques and to combine or correlate the various results provided by the techniques.

SUMMARY OF EMBODIMENTS OF THE INVENTION

A system for management, correlation and combination of various analysis techniques, or "advisors." Graphical user interface (GUI) controls and displays are provided to allow a user to configure different aspects of an analysis system. A financial analysis application allows a user to designate instruments whose data points, factors or other relevant data can be pre-processed with indicators. The outputs of the indicators are provided to advisors for calculation and grouping. A user is able to select the, types of raw data to use, the instruments, the factors, the data feeds and other sources for data, the indicators that perform processing and the advisors that perform analysis, grouping and outputting of results for combining using machine learning mechanisms. A user can set or adjust other parameters such as modeling frequency, scheduled processing, whether the system is running a simulation or is designed for higher performance execution. These and other characteristics of the system can be saved as a portfolio for later use and adjustment by the user. Other features are described.

In one embodiment the invention provides a method for predicting the behavior of a system, the method using a processor coupled to a user input device and a display, the method comprising displaying a plurality of possible instruments; accepting a signal from a user input device to select one or more instruments as predictor instruments, wherein the predictor instruments include factors; accepting a signal from a user input device to designate one or more possible indicators as active indicators; processing the output of one or more active indicators; and displaying a result of the processing.

In another embodiment the invention provides A method for predicting the performance of a system, the method executing on a computer system, the computer system including a processor coupled to a display and coupled to a user input device, the method comprising: displaying a plurality of indicators, wherein an indicator accepts one or more data points and provides a result; accepting a signal from the user input device to select a plurality indicators; associating a plurality of the data points with the plurality of indicators; storing a state of a process including an indication of the selected plurality of indicators and the associated plurality of the data points; and restoring the state of the process including the selected plurality of indicators and the associated plurality of the data points.

In another embodiment the invention provides a method for analyzing a financial instrument, the method comprising: identifying a plurality of instruments having data points; allowing user selection of a plurality of processes to process the data points and provide outputs; allowing user selection of a combining of the outputs; and adjusting performance of an analysis based on a comparison of an output with a past event.

In another embodiment the invention provides a method for applying analysis techniques to a collection of data, the method executing on a computer system, the computer system including a processor coupled to a display screen, the method comprising: displaying a plurality of data sources on the display screen, wherein the data sources include data points; displaying a plurality of data types on the display screen; accepting a signal from a user input device to select a data type; identifying data points of the data sources having the selected data type; displaying a plurality of advisor processes on the display screen, wherein the advisor processes accept inputs and provide outputs; accepting a signal from a user input device to select one or more advisor processes; and applying the data points having the selected data type to the selected advisor processes to provide an input.

DETAILED DESCRIPTION OF EMBODIMENTS OF THE INVENTION

Data Model Overview:

In general, the user interface described herein allows a human user to select, manage and manipulate data, and processes that use the data, to provide a prediction, recommendation or other analysis of a system being modeled. In a securities analysis application, the price movement of instruments such as stocks, bonds, futures, etc., is predicted by modeling data points of instruments and "factors." In the context of one embodiment of a securities analysis application, instruments may also be designated as factors in the price movement of other instruments. Additionally, data types such as Price/Earnings Ratio, dividends, etc., and other data such as macroeconomic data (e.g., an unemployment rate, domestic product, etc.), can also be designated as "instruments," so that they can be the target of the modeling processes.

Both instrument and factor data are referred to as "raw data." The instrument and factor raw data are used to derive other data called "indicators" which include results of preprocessing the raw data. For example, an indicator can be used to calculate a change over prior data in a series The resulting indicator outputs and other possible data (e.g., the raw data itself, or data from external data "feeds") are used as inputs to processes called "advisors," which can include one or more machine learning based components (e.g., "combiners" discussed in more detail, below) to collect, or group, the outputs from lower-level advisors to arrive at an ultimate recommendation or prediction of the price movement of one or more instruments. In one embodiment, a user may add one or more additional processing layers, where the outputs of the combiners at the preceding processing layer are used as inputs for another group of advisors called "overlay advisors," whose outputs are then used as inputs for another group of combiners to arrive at an ultimate recommendation or prediction of the price movement of one or more instruments.

Figure 23:
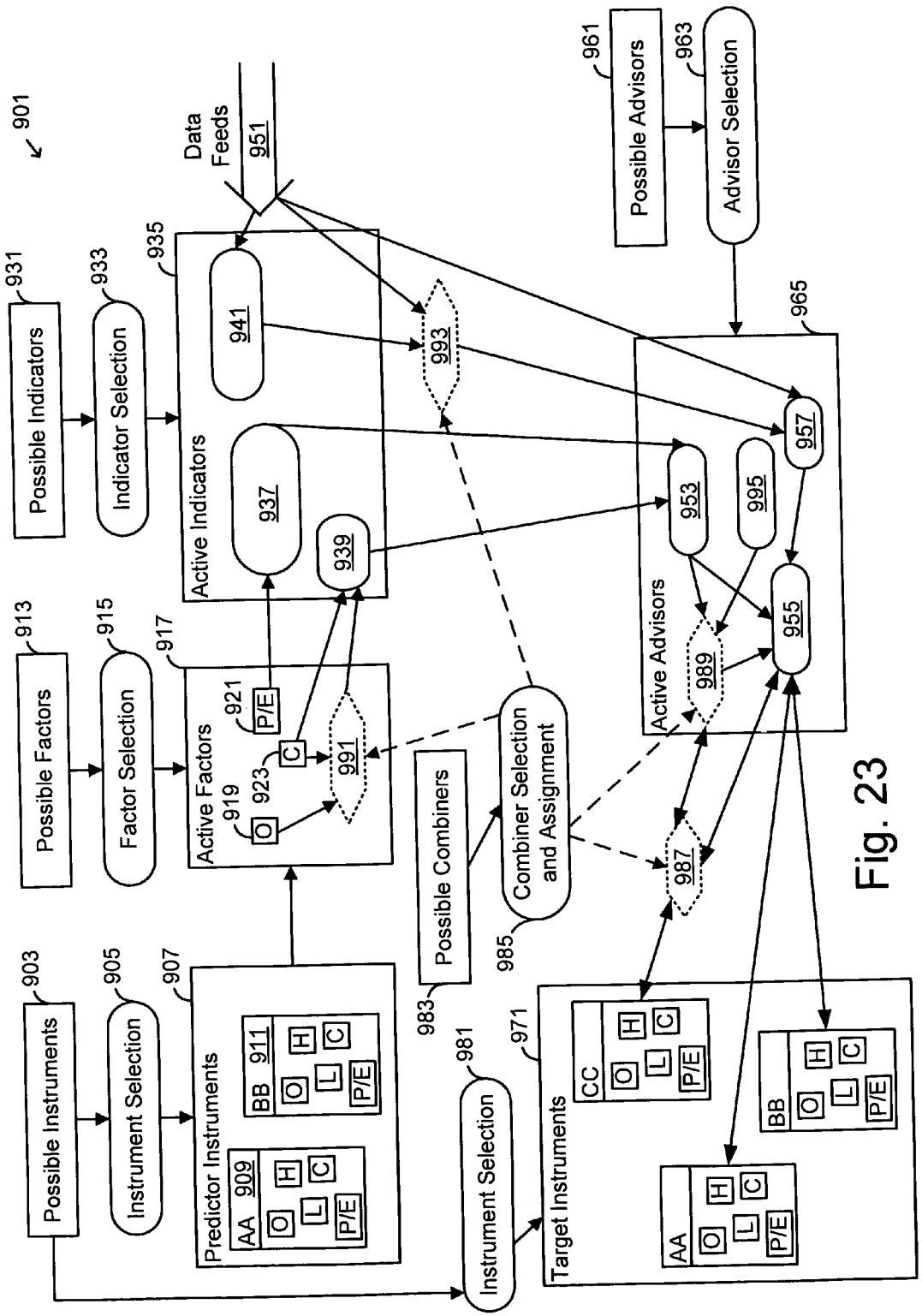
FIG. 23 illustrates a basic data model.

FIG. 23 illustrates basic data items, processes and data flow in a data model for a preferred embodiment of the invention. In FIG. 23, the analysis system, or "portfolio," 901 includes predictor instruments 907 such as stock AA 909 and BB 911. Naturally, any number of instruments or other modeling targets can be designated as predictor instruments. In practice the number of predictor instruments can be in the hundreds or thousands or more, as desired. For ease of illustration, the number and complexity of the data items discussed in FIG. 23 is greatly reduced.

Predictor instruments 907 are chosen from a large pool of possible instruments 903. Although the example of FIG. 23 uses stocks, any type of financial instrument, or other data, can be used. In other embodiments, other systems or processes can be applied with features of the present invention. For example, the invention can be used to determine the outcome of sports events, determine an individual most likely to be successful in business or scholastic aptitude, identify social trends such as growth of cities, predict productivity or output of different markets (e.g., agricultural, industrial, technology, etc.), predict the outcome of an election, etc. In general, techniques or functionality described herein may be applied to any type of analysis system.

A user can choose to use less than the entire possible set of instruments by performing instrument selection 905. Such selection is useful, and often necessary, to reduce the amount of processing power and other resources (e.g., memory, bandwidth, etc.) required for achieving desired results. Also, allowing user selection of data items, parameters, processes, inter-process communication, and other characteristics of the system is important to allow the user to customize and direct the system to achieve desired results.

The extent of a user's ability to select, set, or otherwise affect characteristics of the system can vary with different embodiments. Normally this is a design tradeoff between complexity of use and degree of user control over the system. A preferred embodiment of the system attempts to strike a balance between complexity and control. Automatic selecting or a combination of manual and automated selecting can be used. Default or stored selections can similarly be used along with other options or ways to perform selection of current optimum configuration. Other selection of characteristics or settings of the system, discussed below, can also be set in various ways. The selections can be stored as part of the overall "portfolio" that a user designs, which configuration can be reused in subsequent portfolios created by the user. Or portions of the settings (e.g., just the instrument selections) can be stored as a recommended or available predetermined selection set, e.g., default and user defined libraries.

Each instrument includes data points that are associated with it. For ease of illustration, each of the predictor instruments in FIG. 23 are shown to have five data points represented as open ("O"), high ("H"), low ("L"), close ("C") and price/earning ratio ("P/E"). In actual implementation many more data points can be included, some of which are shown in Table I, below.

BEGIN TABLE I
Sector and Key Mover Factors

| | |
|---|---|
| IXCO | NASDAQ Computer Index |
| IXF | NASDAQ Financial 100 Index |
| MOX | Morgan Stanley Internet Index |
| MSH | Morgan Stanley Technology Index |
| PSE | DJ PSE High Technology Index |
| NDX | NASDAQ 100 Index |
| OEX | S&P 100 Index |

Volatility and Trend Factors

| | |
|---|---|
| VIX | CBOE Volatility Index |
| TRIN | NYSE Short Term Trading Index |
| TRIT | NASDAQ Stocks Short Term Trend Index |

Interest Rates, Exchange Rates and Commodities Factors

| | |
|---|---|
| TNX | Ten Year Treasury Note Index |
| TYX | Thirty Year Treasury Bond Index |
| VIX | CBOE Market Volatility Index |
| OIX | CBOE Oil Index |
| GOX | CBOE Gold Index |
| OSX | Oil Service Sector Index |
| XAU | Phil American Gold & Silver Index |
| XEU | Euro Index |

Macroeconomic Announcement Factors

Change in non-farm payrolls
Unemployment rate
Employment cost index
Durable goods orders
NAPM manufacturing
NAPM non-manufacturing
Advanced retail sales
Industrial production
Consumer price index

END TABLE I

Instrument data points can be filtered by selection of data types, or factors. A default condition is to use all available data points from all predictor instruments as factors. However, if a user chooses to select specific factors then the selected factors will be used in analysis. Other ways of selecting factors are possible such as by using all types of data points except for the selected factors, allowing Boolean or relational expressions to determine sets of selected factors, etc. FIG. 23 shows active factors 917 including open 919, close 923 and P/E ratio 921 data point types. The active factors have been selected from a larger set of possible factors 913 by factor selection 915. Typically, selection of factors and other data types is by user selection. However, factor selection can be achieved in different ways as described above in connection with characteristic settings for the portfolio.

Active factors can include data types other than the data point types of the target instruments (i.e., OHLC). For example, macroeconomic data such as unemployment rates and consumer price index could be used. The data point representation that will be used in the modeling processes may itself be specified by the user, and can include integer, floating point, ordinal, etc. specifications.

Indicators are used to operate on or transform active instruments, factors and other data into indicator outputs for processing by advisors. Many indicators can include computations that are standard in financial analysis. For example, a 25-day moving average of the closing price of an instrument can be computed. The computation can use the data point frequency of the close of a stock at the end of each day in the 25 day average. Other indicators can use custom, non-standard, yet-to-be-created or any other type of computation or processing. As discussed below, indicators can use parameters that are set by a user, obtained as defaults, obtained from a network source, set automatically, etc. For the moving average indicator, typical parameters include the time-series sampling frequency (e.g., per day, per week, per hour, etc.) and the interval over which to compute the average. Examples of indicators are shown in Table II, below.

BEGIN TABLE II
Facilitation in Uptrends: total change/total range (EMA: 4 trends)
Facilitation in Downtrends: total change/total range (EMA: 4 trends)
Average Up Retracement: total change/total range divided by same for previous trend (EMA: 4 trends)
Average Down Retracement: total change/total range divided by same for previous trend (EMA: 4 trends)
8 Day Day Fast RSI: 3 day fast stochastic (DiNapoli) (EMA: 3 periods)
3 Day Slow RSI: 3 day slow stochastic (DiNapoli) (EMA: 3 periods)
MA 8: average close (EMA: 8 periods)
MA 17: average close (EMA: 17 periods)
MA Difference 9: average of MA17 – MA8 (EMA: 9 periods)
Average Advance 15 EMA: average up move (EMA: 15 previous up moves)
Average Decline 15 EMA: average down moves (EMA: 15 previous down moves)
Positive Reactivity: change/range after up move (EMA: 3 up moves)
Negative Reactivity: change/range after down move (EMA: 3 down moves)
3 Day Pivot: hi + lo + close/3 (EMA: 3)
5 Day Average Facilitation: change/range (EMA: 5)
34 Day Average Facilitation: change/range (EMA: 34)
5 Day Average Force: change * range (EMA: 5)
34 day Average Force: change * range (EMA: 34)
Winning/Losing Streak: consecutive up periods, if positive; consecutive down periods, if negative
Positive Range Streak: consecutive periods range beats 3 period average range
Negative Range Streak: consecutive periods range smaller than 3 period average range
Positive Facilitation Streak: # of periods of increasing change/range
Negative Facilitation Streak: # of periods of decreasing change/range
13 day Moving Average: average close (EMA: 13)
Public Power: open – previous close (EMA: ATL)
Pro Power: close – open (EMA: ATL)
Bear Power: close – low (EMA: ATL)
Bull Power: high – close (EMA: ATL)
Trend Up/Down: proprietary short term trend indicator (1 or –1)
Current Average TrendMagnitude: current trend length total change (EMA: 4 trends)
3 period Average Range: average range (EMA: 3 periods)
34 Day Moving Average: average close (EMA: 34 periods)
5 Day Moving Average: average close (EMA: 5 periods)
34 Day Difference from Average: 5 day moving average – 34 day moving average (EMA: 34 periods)
5 Day Difference from Average: 5 day moving average – 34 day moving average (EMA: 5 periods)
10 Day Range Average: average range (EMA: 10 periods)
Adaptive Fair Price: proprietary estimate of "correct" close based on rating high range periods higher
Pivot Trend Clock: total distance price has stayed on one side of 3 day -continued pivot (EMA: 3)
Within Drummond Range: (close − Drummond Low)/(Drummond Hi − Drummond Low) (EMA: ATL)
Within Current Key Range: proprietary version of Drummond Range using Key High and Key Low from proprietary short-term trend indicator
Within Price Pulse Range: same as Current Key Range but using Price Pulse High [+2.618 * (−Key High * close)] and Price Pulse Low [+2.618 * (−Key Low * close)] (EMA: 3)
Pivot Tension: distance from 3 day pivot/average distance from 3 day pivot
Momentum Speed: indicator from Bill Williams "New Trading Dimensions" (close − close 5 periods ago)/(close − close 34 periods ago)
Relative Range Size: 3 day range average/10 day range average
Break Direction Indicator: scoring system that gives next day's trade direction [Let Prevpiv = previous pivot; Let Buybreak = 2Prevpiv − previous low; Let Sellbreak = 2Prevpi − previous high] If close above buybreak or if low above sellbreak get 2 points or else get 1 point; If close below sellbreak if high above buybreak lose 2 points or else lose 1 point; If high above buybreak lose 0.5 points if low above sellbreak lose −0.5 points
Fuel: proprietary ATL day EMA of sum of number of elements in {previous open, previous close previous high, previous low} that open, high, low, and close beat; high fuel (above 8) is usually considered bullish.
Note: References to "ATL" mean average trend length, which is a dynamically adjusted by calculating a 3 period exponentially weighted moving average ("EMA"; default) of a selected short term trend indicator ("STT" as described later is a system default).
END TABLE II In FIG. 23, P/E ratio 921 is an input to indicator 937. Indicator 939 uses indicators 919 and 923 as inputs which represent the open and close of different instruments. For example, if 10 instruments are selected as predictor instruments, then indicator 931 would use the open and close values for each of the 10 instruments. Further, if indicator 939 has sampling frequency as a parameter and the sampling frequency is set to "daily" and assuming a 25 day interval then indicator 939's computation will use 10×2×25=500 data points. Other indicators such as 941 can use data that is obtained from sources other than the active factors. For example, data feed 951 is supplying indicator 941 with data for computation. Other data sources can include user-input data, data obtained from data stored on a user's local computer or generated by a user's company, etc. In general, any type of data or computation can be used at one or more points of the system shown in FIG. 23. For example, data feeds can be used to obtain predictor instruments, active factors, etc.

Active indicators can be selected from a pool of possible indicators 931 via indicator selection 933 similarly to selection of other items of the portfolio.

Advisors use the output of indicators as inputs. Advisors can be configured to use any type, number or combination/sequence of indicator outputs, data and parameters. For example, data feed 951 is shown as an input directly to active advisor 957. Advisors can similarly be selected from a pool of possible advisors 961 via advisor selection 963 to result in active advisors 965.

Advisors can couple to other advisors such that the output of one advisor is used as the input to a second advisor. For example, the outputs of active advisors 953 and 957 are provided to active advisor 955. Examples of advisors are provided in Table III, below.

Advisor outputs can be used as inputs to other advisors called overlay advisors, and or machine learning based components called combiners. Ultimately, an advisor is used to provide an output signal that represents the advisor's predicted change in the target instrument price upon which a recommendation or prediction of a target instruments 971 is based, in part (generally, factors will also influence advisor outputs, and these advisor output signals are subjected to additional processing as described in detail later). For example, the advisors output signal can be an increase or decrease in price which could correspond to a "buy" or "sell" recommendation for target instrument. User's can select the target instruments from possible instruments 903 via instrument selection 981, but more typically the target instruments will include all instruments in the portfolio and the top-level advisors will check each instrument and provide a recommendation. Advisors can use any type of data, including data from instruments, to arrive at a result.

In FIG. 23, advisors 953 and 957 output their results, or signals, to overlay advisor 955. An overlay advisor is an advisor that does not output its result to another advisor. The overlay advisor's output is used (in whole or in part) to generate a prediction of performance or recommendation of an action. An overlay advisor's output can be used by a combiner such as combiner 987 to produce the final outcome or recommendation for a prediction of a target instrument's behavior.

BEGIN TABLE III
OptionalAdvisors

Joe DiNapoli Advisor: Fibonacci based day trading system as outlined by Joe DiNapoli
Equity Trading Advisor: equity day trading system using all current coded indicators with proprietary scoring system
Mutual Fund Trading Advisor: proprietary mutual fund day trading system
Optional Overlay Advisors Surprise Overlay Advisor: evaluates difference between actual close and predicted close; close − predicted close (EMA: 1)
Momentum Overlay Advisor: reviews total change in last ATL periods; close − close ATL periods previous
Pattern Analysis Prediction Overlay Advisor: reviews signals from mid-level pattern analysis advisors to approximate the populations of traders correlated with following them or "fading" them (leaving off following them)
Buying Pressure Overlay Advisor: proprietary spectrum indicator that adjusts
for trending versus chopping market movements
Pivot Point Overlay Advisor: proprietary day trading system related to distance from 3 period pivot points
Balance Overlay Advisor: estimated bulls − estimated bears as determined from review of pattern analysis routines
END TABLE III Combiners such as 987, 989, 991 and 993 can be used at different points in the system. In FIG. 23 combiners are assigned to process information from factors, indicators, advisors and overlay advisors. A combiner is used to combine, aggregate or compute two or more inputs. Combiners can include machine learning algorithms to detect relationships between or among input data. In a preferred embodiment a user is able to select and assign combiners, as shown at 985, from a library of possible combiners 983. In general, combiners can be assigned at any point in the system with any type and number of data items or outputs.

Figure 24:
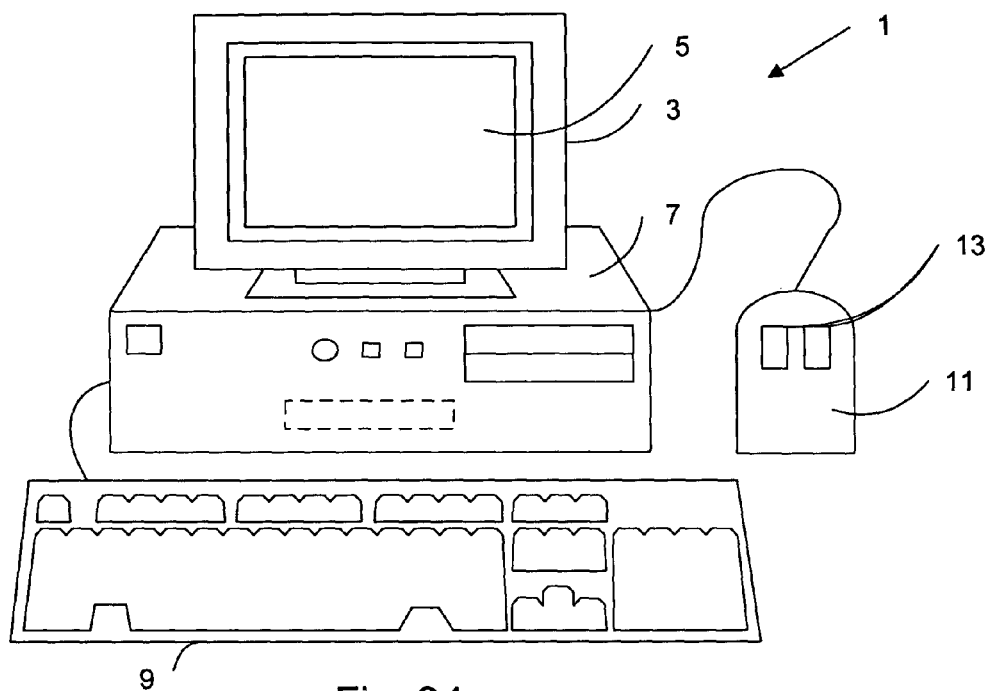
FIG. 24 is an illustration of a computer system.

Basic Hardware:

FIG. 24 is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

Figure 25:
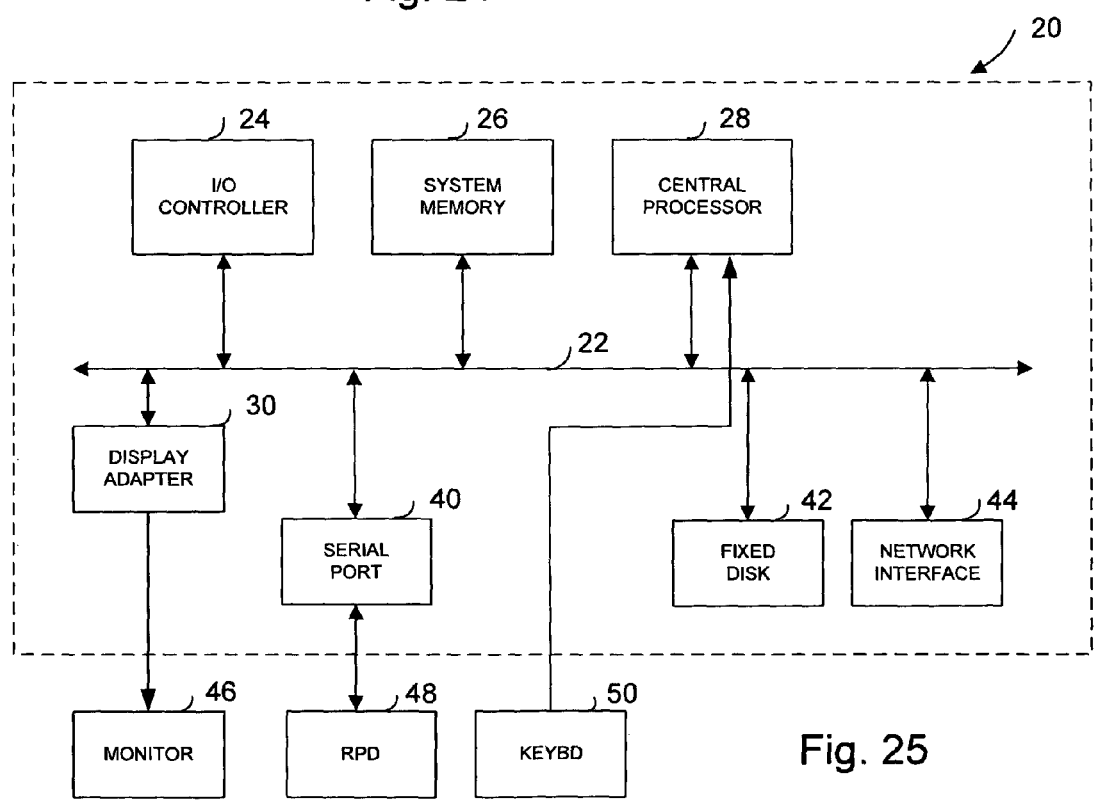
FIG. 25 illustrates subsystems that might typically be found in a computer system.

FIG. 25 illustrates subsystems that might typically be found in a computer such as computer 100 of FIG. 24.

In FIG. 25, subsystems within box 20 are directly interfaced to internal bus 22. Such subsystems typically are contained within the computer system such as within cabinet 7 of FIG. 24. Subsystems include input/output (I/O) controller 24, System Random Access Memory (RAM) 26, Central Processing Unit (CPU) 28, Display Adapter 30, Serial Port 40, Fixed Disk 42 and Network Interface Adapter 44. The use of bus 22 allows each of the subsystems to transfer data among the subsystems and, most importantly, with the CPU. External devices can communicate with the CPU or other subsystems via bus 22 by interfacing with a subsystem on the bus. Monitor 46 connects to the bus through Display Adapter 30. A relative pointing device (RPD) such as a mouse connects through Serial Port 40. Some devices such as Keyboard 50 can communicate with the CPU by direct means without using the main data bus as, for example, via an interrupt controller and associated registers (not shown).

As with the external physical configuration shown in FIG. 24, many subsystem configurations are possible. FIG. 25 is illustrative of but one suitable configuration. Subsystems, components or devices other than those shown in FIG. 25 can be added. A suitable computer system can be achieved without using all of the subsystems shown in FIG. 25. For example, a standalone computer need not be coupled to a network so Network Interface 44 would not be required. Other subsystems such as a CDROM drive, graphics accelerator, etc. can be included in the configuration without affecting the performance of the system of the present invention.

Figure 26:
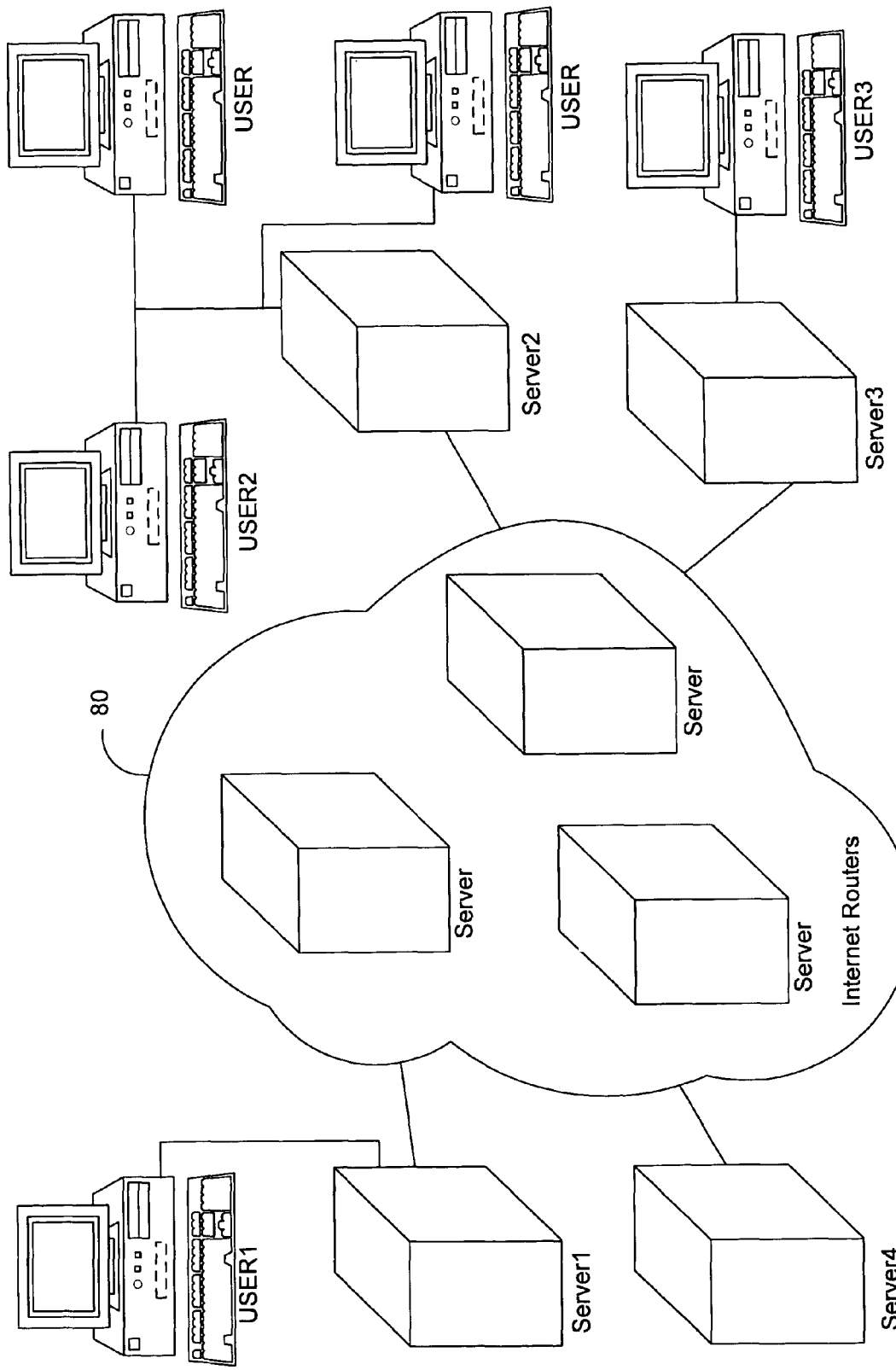
FIG. 26 is a generalized diagram of a typical network.

FIG. 26 is a generalized diagram of a typical network.

In FIG. 26, a network system includes several local networks coupled to the Internet. Although specific network protocols, physical layers, topologies, and other network properties are presented herein, the present invention is suitable for use with any network.

In FIG. 26, computer USER1 is connected to Server1. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection 80 of servers. Other common devices and structures such as routers, switches, backbones, etc., are not shown in this simplified diagram. Note that the use of the Internet for distribution or communication of information is not strictly necessary to practice the present invention but is merely used to illustrate a preferred embodiment, below. Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 or T3 line. Similarly, other computers at 164 are shown utilizing a local network at a different location from USER1 computer. The computers at 164 are coupled to the Internet via Server2. USER3 and Server3 represent yet a third installation.

Note that the concepts of "client" and "server," as used in this application and the industry, are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on two or more processors in a distributed processing environment, parts of a single program may be executing on different physical machines, etc. Further, two different programs, such as a client and server program, can be executing in a single machine, or in different machines. A single program can be operating as a client for one information transaction and as a server for a different information transaction.

Figure 1:
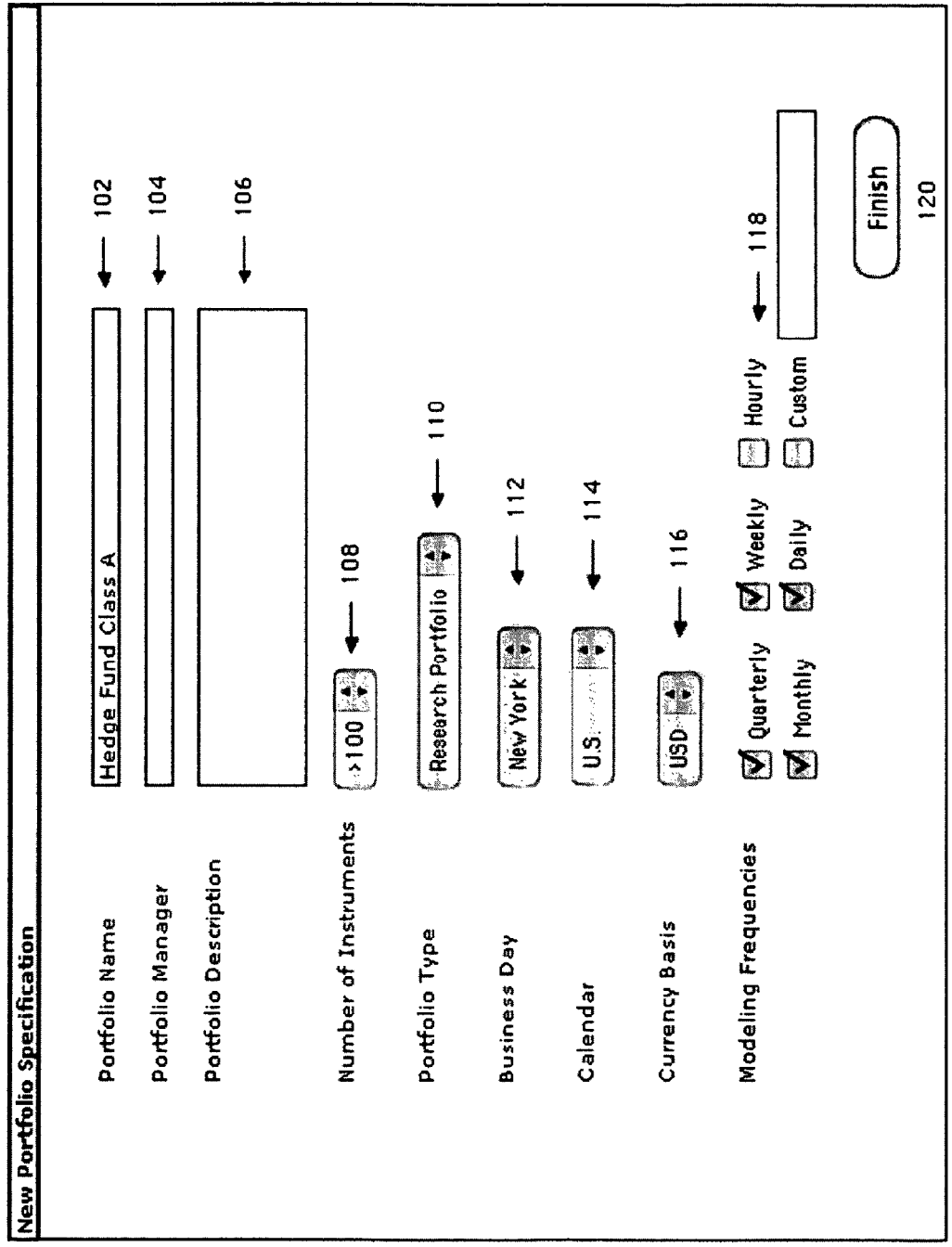
FIG. 1 illustrates a screen display that allows a user to create and configure a portfolio.

User Interface:

FIG. 1 illustrates a screen display that allows a user to create a new portfolio and to set basic portfolio specifications. At 102 the user can enter a name for the portfolio. Defining a name can be left completely to the user's discretion or a name or partial name (i.e., default identifier) can be automatically provided. For example, if the user is working at a large analysis firm a naming convention may be used for different groups or clients. A manager can be designated for the portfolio at 104 and a description can be supplied at 106. Other basic information about the portfolio can be automatically generated. For example, the date and time of the portfolio can be stored along with the creating user, company, etc.

At 108 the user can select the estimated number of instruments to be initially included in the portfolio. This information is used to estimate the required computing resources at each stage of the portfolio setup process to help the user avoid overloading existing resources. Each subsequent configuration choice has implications on processing time, so certain computationally expensive features, such as spectrum processing, may not be recommended for higher frequency prediction tasks without first ensuring that adequate computing power is available (i.e., a user wishing to predict a 5 minute timeframe would need to ensure that the processing time is within 5-30 seconds in order for the prediction to be actionable). At 110 a "Research" or "Executing" type of portfolio can be designated. If the portfolio is a Research Portfolio then it is intended for simulation to see how well the portfolio's modeling and predictions are performing. In other words, limited, or no, trading of securities will be performed using the Research Portfolio. If the portfolio is designated as an Executing Portfolio then actual trades may be automatically or manually placed as a result of the portfolio's processing. In a preferred embodiment, a Research Portfolio includes recordkeeping and diagnostic functions and data that are not necessarily used for an Executing Portfolio.

A Research Portfolio can be optimized into an Executing Portfolio for faster execution. For example, a preferred embodiment of the invention is written in a computer language called "List Processing" (LISP). The LISP code or script for a Research Portfolio can be compiled into an executable version, or Executing Portfolio. A Research Portfolio will generally not be considered as important as an Executing Portfolio and the system can schedule running of research portfolio's at non-peak periods such as after markets are closed. A default scheduler will automatically process Research Portfolios at a time when Execution Portfolios are not being processed so that maximum resources are available for time sensitive processing tasks. Because the processing can be scheduled by the user for any time of day, such as in the evenings, they may maintain a large number of Research Portfolios without necessitating the procurement of additional computing resources.

A business day and calendar type can be set at 112 and 114, respectively. These settings are used in time-of-day and market open and closed timings and are also important when using agents based on the local time of a market. For example, a user may reside in New York, but trade markets in London, England. In this example the portfolio's prediction tasks must be mapped to the open and closed timings of the market in London, but the user may only transact business on business days in New York, observing U.S. Holidays rather than U.K. Holidays. A currency basis is set at 116 as the units for outputting references to instrument price and portfolio holdings. A default condition is to make all references to instrument prices in the original currency denomination (i.e., if the portfolio has U.S. stocks, and European Union stocks, then the magnitude component of the predictions would be referenced in USD and Euros respectively). However, a user may select their preferred currency basis, and all references to instrument price will be in the designated currency basis. Additional settings include a time period for modeling frequencies at 118. In a preferred embodiment, a user can select one or more time intervals for modeling within any single portfolio, resulting in an output for each instrument in the portfolio, which represents a prediction of the next price in the series, at each selected frequency.

For example, a user could select hourly and daily frequencies, to obtain from the system, immediately after the close of each hour and also each day, the predictions of the instrument price at the close of the next hour and day in the series. The time-series data of an instrument, generally consisting of Open, High, Low and Close price data points, and sometimes other time-series data, is used in the modeling for each respective frequency. A user can also specify custom frequencies using Greenwich Mean Time notation. For example, a user could specify a "custom day" frequency that consists of time intervals 09:00 (9:00 am EST) through 15:30 (3:30 pm EST; 30 minutes before the market closes) in a case where they wish to obtain a prediction for the closing price of stocks listed on the NYSE for the next business day, but they wish to receive these predictions immediately after 15:30 so that they have 30 minutes before the market closes to execute trades should an adjustment be deemed desirable.

When a user specifies custom frequencies, the system automatically constructs time-series data for the custom period, including, but not limited to, Open, High, Low and Close ("OHLC") price points using lower frequency time-series data. In the above example, the OHLC price points could be obtained by taking the Open of the first 30 minute interval beginning at 09:00 and the High and Low being captured by monitoring all Highs and Lows for each subsequent 30 minute interval, and finally, the Close would be obtained from the Close price of the 30 minute interval beginning at 15:00 and concluding at 15:30. Generally, most commercial data feeds will provide various frequencies of data ranging from tick data or one minute OHLC to daily OHLC. The user can save their entries and proceed to the next screen in the portfolio sert up process by activating Finish button 120.

Other embodiments can use different numbers or types of settings. For example, additional settings can include selection of input data formats (e.g., designating a network data source,-data format), output data file formats (e.g., Excel, plain text, etc.), custom data sources such as user-supplied data from a local file, manually typed or entered, etc.

Figure 2:
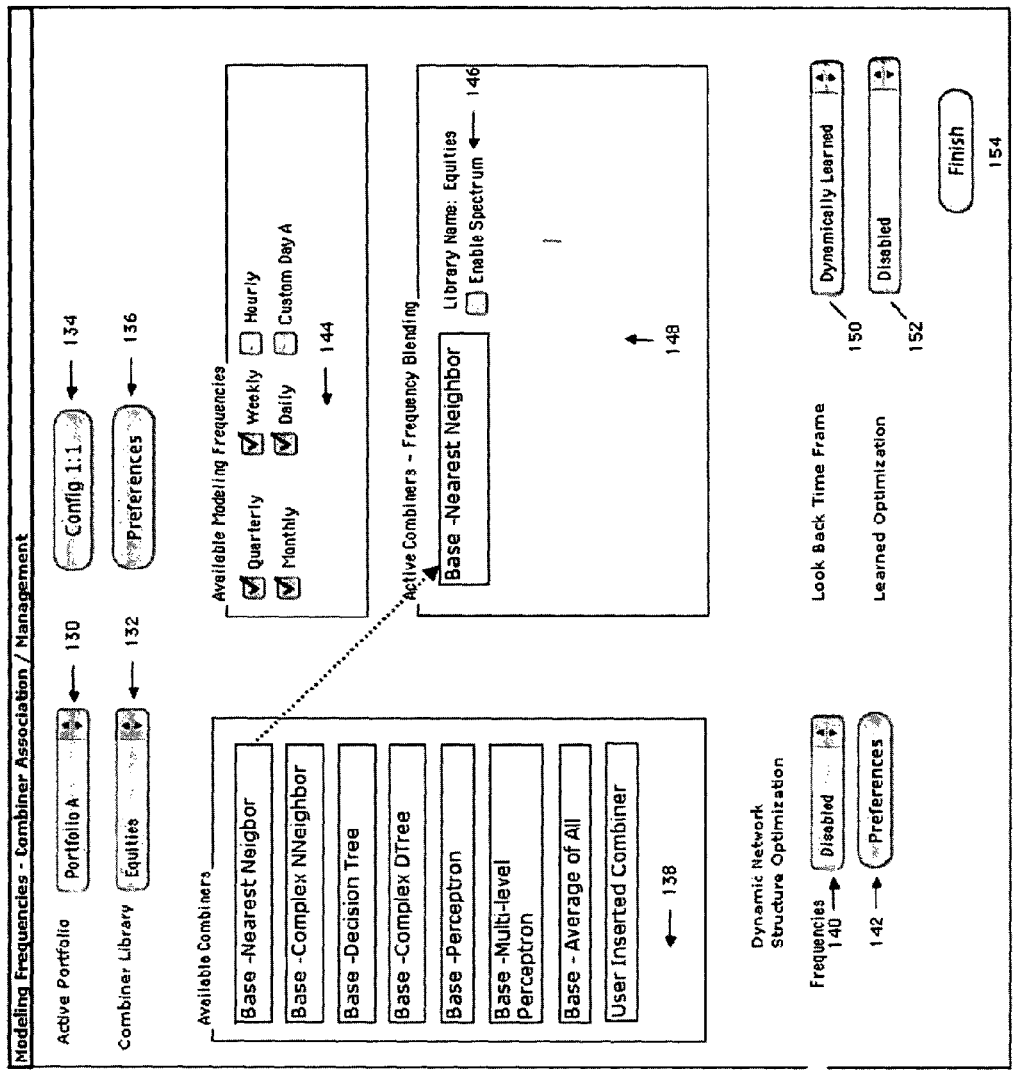
FIG. 2 illustrates a management interface screen.

FIG. 2 illustrates the Modeling Frequencies—Combiner Association/Management interface screen, where the user can specify that various modeling frequencies be combined using machine learning components provided with the system, called "Base Combiners," or other combiners provided by the user. The user can specify the Active Portfolio (i.e., operative portfolio for the current screen) at drop down menu 130, and the combiner library they wish to view at 132. Modeling frequencies that are to be combined to produce an overall prediction for the coarsest frequency specified, can be selected by checking the appropriate boxes in Available Modeling Frequencies window 144. Available Combiners window 138 lists all combiners in the specified library. The combiner symbols, icons or other identifiers are drag-and-drop enabled and can be transferred to Active Combiners—Frequency Modeling window 148.

At 146, the user can enable the selected combiner for use as a Spectrum Combiner, which will cause the combiner to process data over a spectrum of time periods, with the current optimum being used for processing. The user can specify the Look Back Time Frame, or the method of determining the LBTF, for combining modeling frequencies, by selecting one of the options from the drop down menu. The user can specify that the LBTF be "Dynamically Learned" as in the example at 150. This specifies that the LBTF will be dynamically adjusted to reflect the current optimum number of periods for each individual instrument or data type being modeled (i.e., each individual modeling subject has its own evolving optimum which could potentially be different with each new predictive task). The user can establish parameters for determination of the optimal LBTF and specify other advanced features by clicking button Preferences at 136, which will open a separate interface screen that is the same or similar to the screen illustrated by FIG. 7, which is described in detail later. When the preferences screen is accessed through Modeling Frequencies—Combiner Association/Management screen all preferences will be associated with this set of combiners only, and only with respects to portfolio currently being created or modified.

The applicant will specify a default LBTF for combining modeling frequencies, and can make available any possible parameter through the drop down menu, or other selection means. The user can also specify that the frequency combining process be tuned towards a particular performance objective, such as "lowest volatility" prediction performance, by enabling and selecting the desired tuning objective from Learned Optimization drop down menu at 152. Dynamic Network Structure Optimization (described in detail later) can be enabled or disabled at 140, and the advanced user preferences screen can be accessed at 142. The user can conclude the actions on this screen by activating Finish button 154.

Figure 3:
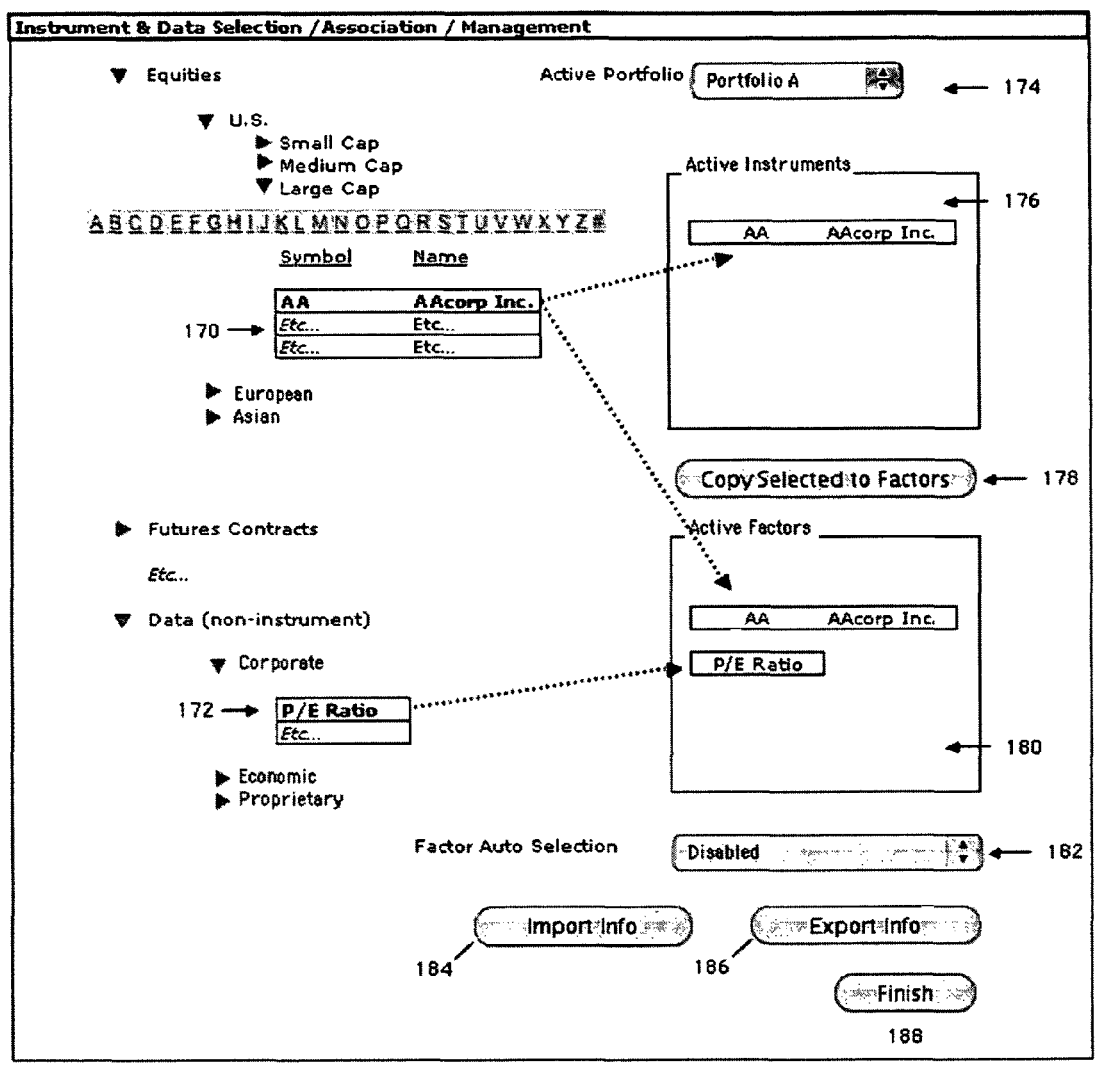
FIG. 3 shows an instrument selection and management screen.

FIG. 3 shows an instrument selection and management screen. The user can specify whether actions performed on this screen are for the new portfolio (default) or existing portfolios, which can be selected at 174. The selection of instruments and factors creates respective groupings that can later be duplicated for tasks such as creating a test portfolio with slight modifications. The user can also import instrument and factor groups created previously for another portfolio, e.g., a research portfolio, as well as export information for any portfolio that details the contents of each grouping by using buttons 184 and 186, respectively.

Predefined groups of instruments and factors can be imported from other files such as Excel (.xls) that are available on the user's hard drive or network. The user can enable select instruments to be copied to the factor group by selecting the instruments in the instrument grouping and clicking copy button 178 between the groupings. Instruments and factors can be removed from a grouping by dragging them outside of a grouping, and/or they can be transferred between groupings. A default condition is to use all instruments as factors.

In FIG. 3, types of data for modeling are grouped into 3 broad classes as "Equities," "Futures Contracts," and "Data" (i.e., non-instrument data), for purposes of illustration. The user is presented with sub-classes in the form of drop-down menus for selecting equities in, e.g., small, medium or large capitalization equities in U.S., European or Asian markets. Naturally, any other desired asset classes, sub-classes or categories within sub-classes, e.g., sector and industry, can be listed. A default condition would group the data types into conventional groupings in the particular field of use. Once a suitable sub-class or category is selected, the instruments in the sub-class or category are listed as, for example, at 170 of FIG. 3. A user can drag-and-drop the instrument symbol, icon or other data type identifier into Active Instruments or Active Factors windows at 176 and 180, respectively. FIG. 3 shows that "AA" for "AAcorp Inc." has been placed into each window. Any number of instruments or data types can be placed in the windows.

Placement of instruments or other data types into the Active Instruments window specifies these instruments and data types (collectively referred to in this context as "instruments") as the targets, or subject of the modeling processes for the designated portfolio. These target instruments have unique time-series data points, e.g., generally Open, High, Low and Close price data, Volume and Open Interest, which are then put through a user specified number of individually configured pre-processing routines (i.e., data transformations using some mathematical calculation, which is at a minimum (default) as simple as calculating the change in the value over the prior value), followed by machine learning based processing routines, resulting in a final prediction as described later. Placement of instruments or other data types into the Active Factors window allows the instruments and data to be used in subsequent modeling processes. The factors are themselves modeled, with their predictions used for learning linear and nonlinear relationships between the factors and instruments and data being modeled so that any detected relationships can be exploited by using the factors as indicators of instrument movements in further machine learning based processes. Button at 178 allows instruments selected for the Active Instruments window to be more easily copied to the Active Factors window as, for example, by selecting the items and then activating the button.

A Price to Earnings Ratio ("P/E Ratio") data type is shown at 130. This data type has been placed in the Active Factors window 180 and can be used in subsequent data preprocessing routines and machine learning based processes discussed, below. As discussed above, a user could also place the P/E Ratio data type into the Active Instruments window 176 if they wish to model the P/E Ratio itself, for purposes of predicting the change in the P/E Ratio over a specified period. Doing so would cause the P/E Ratio to be one of the instrument outputs on the user interface in FIGS. 21 and 22.

The user can also enable the system to perform an automatic selection of factors by selecting from the options available under the drop down menu at 182. These options may include applicant-provided utilities such as a correlation matrix based process with user specified selection parameters (with or without a learning mechanism), and/or third party factor selection engines, configuration of which may be provided through a separate interface screen. Any such utilities could be scheduled to re-run automatically, to mechanically re-select and thus optimize factor selection before further dynamic optimization provided by the system's machine learning processes, described in more detail below. Finish button can be activated at 188.

Figure 4:
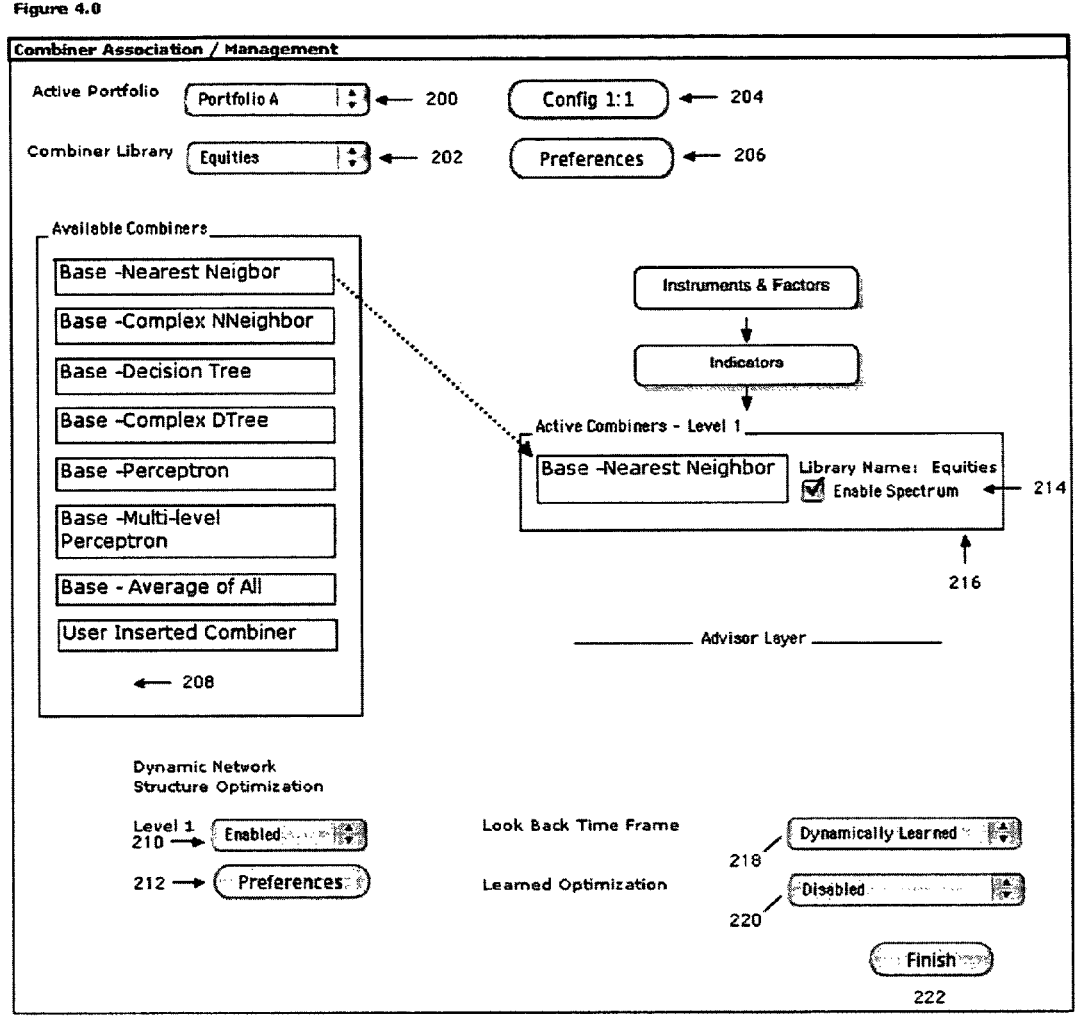
FIG. 4 shows how a user selects machine learning components.

FIG. 4 shows how a user selects the machine learning components called Combiners, which are described in detail later. In a preferred embodiment, the combiners at this level represent the first occurrence of machine learning components used in the system. Combiners can be used for review of raw instrument and factor time-series data and to identify the most relevant linear and non-linear relationships between instruments and factors, based especially upon the most recent data. These observations and rankings by relationship strength are subsequently considered by the system as indicators (strategy elements formally designated as Indicators will be detailed later), which accuracies will be measured and subsequently ranked together with the outputs of the strategy elements called Indicators. In a preferred embodiment, this process is iterative, and occurs with each new predictive task. Therefore the factor selection process can be unique to each individual instrument or data type being modeled, and also potentially unique with each new predictive task.

In a preferred embodiment, the 6 combiners in the Available Combiners window 208 are "base" combiners that are provided with the system. A default condition is to employ all available base combiners and use a simple average of all as a final result. Alternatively, a user can select any combination of combiners, or create and employ within the system their own combiners (machine learning based or mechanical). New base combiners can be added by the applicant as variants are developed or altogether new methods discovered. The current base combiners, and very likely any future base combiners, will remain proprietary trade secret information, with the specific details of their implementations not published unless specifically patented at some future date.

Figure 5:
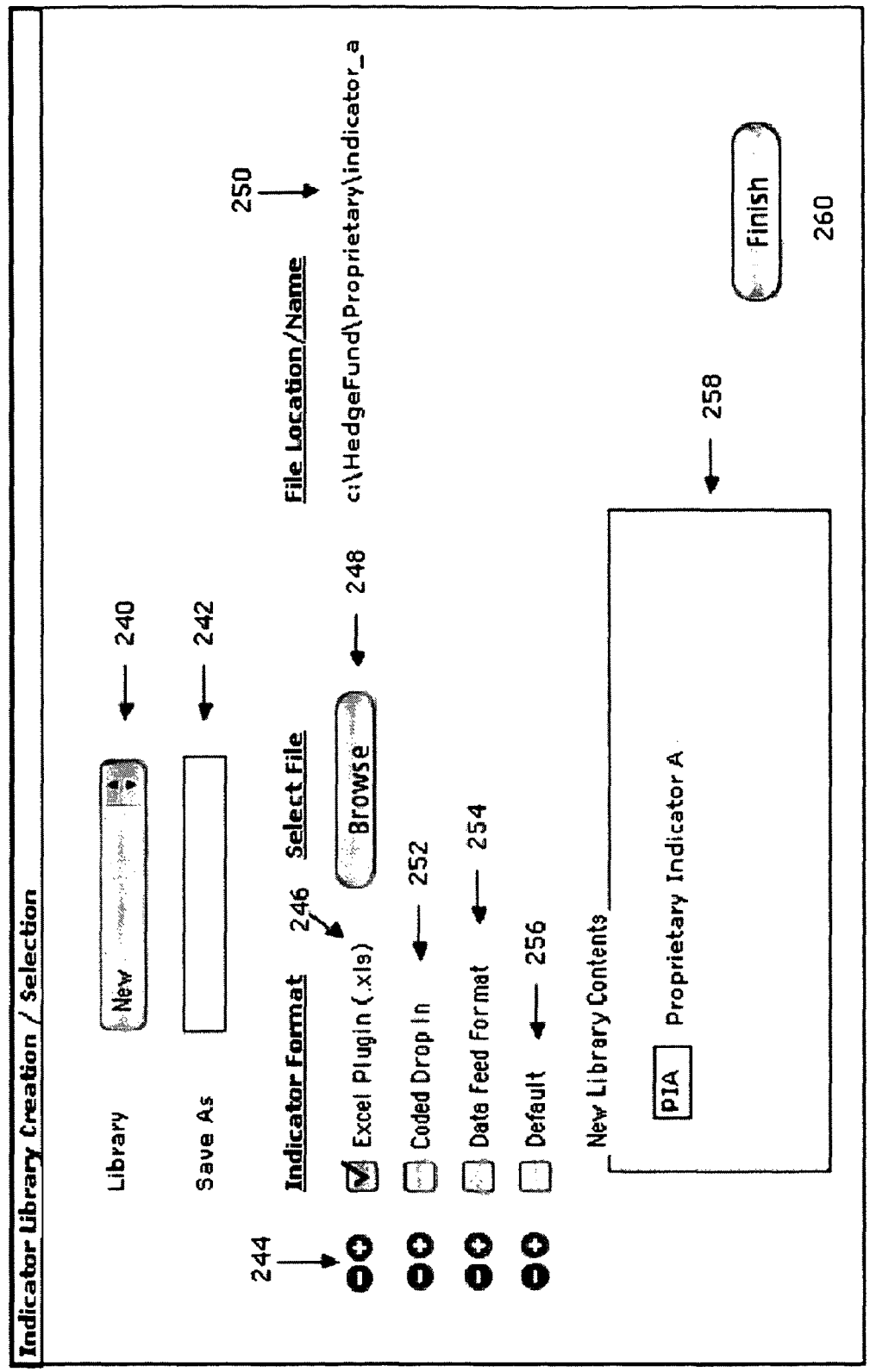
FIG. 5 illustrates an Indicator Library Creation and Selection screen.

FIG. 5 illustrates an Indicator Library Creation and Selection screen. Indicators are mathematical functions that operate on raw instrument or other data types. Indicators represent one form of pre-processing of raw data (described later), where their output signal is used as input in subsequent modeling processes. At 240, a user can designate the indicator library, selecting from new (default) or other indicator libraries that have already been created, including the base indicator libraries included with the system, or other libraries created previously, consisting of any combination of base indicators and/or proprietary indicators supplied by the user. The grouping of both base indicators and user supplied or created indicators into library is important, because, for example, some indicators are specifically designed for particular asset classes or investment strategies, and it may be desirable to organize them this way (e.g., stock indicators, or sell-short strategy indicators). At 242 the user can enter a name for the new library. Defining a name can be left completely to the user's discretion or a name or partial name can be automatically provided. For example, if this screen is accessed during a portfolio setup process, the automatically provided name might-reference the name of the portfolio currently being created, in whole or in part.

At 246, 252, 254, and 256 a user can select the format of the indicator(s) they wish to add, by checking the applicable boxes. Browse button 248 appears after an indicator format is selected. A user can activate the button to open window that will show the contents of the portion of the system directory where the indicator files of the respective file format type are located. The user can then select the desired indicator, which will close the browse window, displaying the file location/name as shown at 250. The applicant may provide, through a separate interface screen, some type of folder based organizational structure for the user to file indicators in their respective formats. For example, the user might be directed to transfer any Excel files containing indicator specifications into the folder marked "Excel," possibly through a similar browse function as at 248, except that the browse function would permit access to the user's entire hard drive or network. Other file formats can automatically be filed by the system, e.g., in cases where an indicator coded in the applicant's specified format is coded using a utility provided by the applicant. At 258 a grouping of all indicators that comprise the library being created or modified is shown. Add/Delete (+/−) buttons at 244 can be used to add any number of additional files of the respective types without exiting the current screen. Finish button 260 is used to finalize the operation and proceed to the next setup screen, or the main application screen, as applicable.

Figure 6:
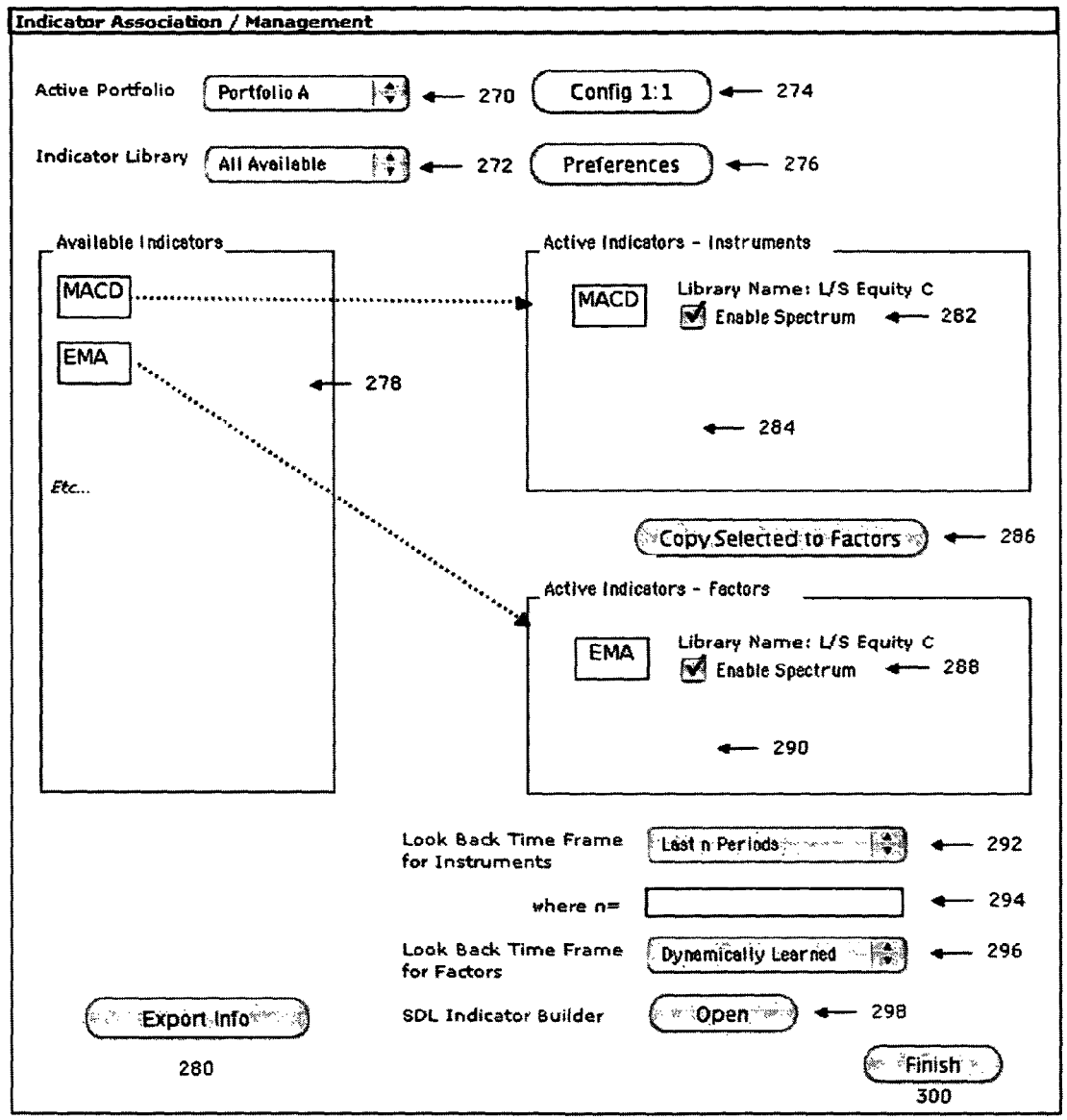
FIG. 6 illustrates an Indicator Association/Management screen.

FIG. 6 illustrates the Indicator Association/Management screen display where a user can associate particular indicators with the instrument and/or factor groupings specified for the portfolio being created or modified as indicated, for example, at 270. At 278, all available indicators contained in the indicator library specified by the user at 272 are shown. A user can drag-and-drop the indicator name, icon or other identifier into Active Indicators-Instruments or Active Indicators-Factors windows at 284 and 290, respectively. The example shows that the indicator called "MACD" has been placed into the instruments window, and the indicator called "EMA" has been placed into the factors window. As shown in 172 and 178, the source library name is displayed, and indicators that have been added can be designated by the user as a Spectrum Indicator by checking Enable Spectrum box, as in the examples at 282 and 288. A default condition of an enabled Spectrum Indicator (described in more detail later) would be a spectrum of parameters designated by the applicant. The user can modify any indicator parameters through a separate interface provided by the applicant, that is the same or similar to the screen illustrated by FIG. 7, by clicking on the indicator name, icon or other identifier.

Placement of indicators into the Active Indicators-Instruments window associates the specified indicators with the instruments previously specified by the user in the operative portfolio, causing the raw instrument data, exclusively, to be processed using the specified indicators. Similarly, placement of the indicators into the Active Indicators-Factors window associates the specified indicators with the factors previously specified by the user in the operative portfolio, causing the raw factor data, exclusively, to be processed using the specified indicators. In a preferred embodiment, the system uses indicators, which are mathematical functions that operate on raw instrument or other data types, to produce an output that represents the new value in a series, which is used as input in subsequent modeling processes. An indicator may be as simple as the calculation of the change in the raw data value from the prior raw data value, which could be expressed as $c-p=i$ where c is current raw data value, p is previous raw data value and i is new indicator value. Each asset class will have a default set of indicators specified for use in Quick Start portfolios. The use of indicators in a financial time-series application of the system represents one form of pre-processing, which is designed to help filter out the noise that is present in most data, and especially in financial time-series data, producing a signal. In evolutionary dynamical systems like financial markets, the level of noise fluctuates widely over time, and is present at different levels in differing asset classes and even in different instruments within an asset class or sub-class (i.e., sector or industry). Therefore, indicator produced signals fluctuate widely in their accuracy and usefulness over time. The applicant's system uses these signals in further machine learning based processing routines like that are able to make the best possible use of the indicator signals by reviewing each individual indicator signal's historic and current values, detecting performance patterns and learning when each signal type is performing well, or likely to perform well, in the current market environment. The signals showing or expected to show the most strength presently are then most influential in the producing the system's final predictive output for each respective instrument or data type being modeled.

At 292 and 296 the user can specify the Look Back Time Frame, or the method of determining the LBTF, for Instruments and Factors, respectively, by selecting one of the options from the drop down menu. In the example at 292, "Last n Periods" has been selected, causing the period specification field "where n=" to be displayed, as at 294. The user can then enter for n, the number of periods, or individual historical indicator values, that they want the system to use in the machine learning based portions of the modeling process. If, for example, the user specifies 500 days, the system will use the last 500 values produced by indicators associated with instruments, including the current period. If the user specifies a number of periods that exceeds the historical data available in the database for a given instrument or factor, (e.g., a newly listed stock of a newly created index included in the portfolio), the system will automatically use the maximum number of periods available, and will expand this to include new data until the specified number of periods exists (the applicant may provide an error notification pop-up window that requires user acknowledgement). The user can also specify that the LBTF for instruments and/or factors be "Dynamically Learned" as shown in the example at 296. This specifies that the LBTF will be dynamically adjusted to reflect the current optimum number of periods for each individual instrument or data type being modeled (i.e., each individual modeling subject has its own optimum which could potentially be different with each new predictive task).

Figure 7:
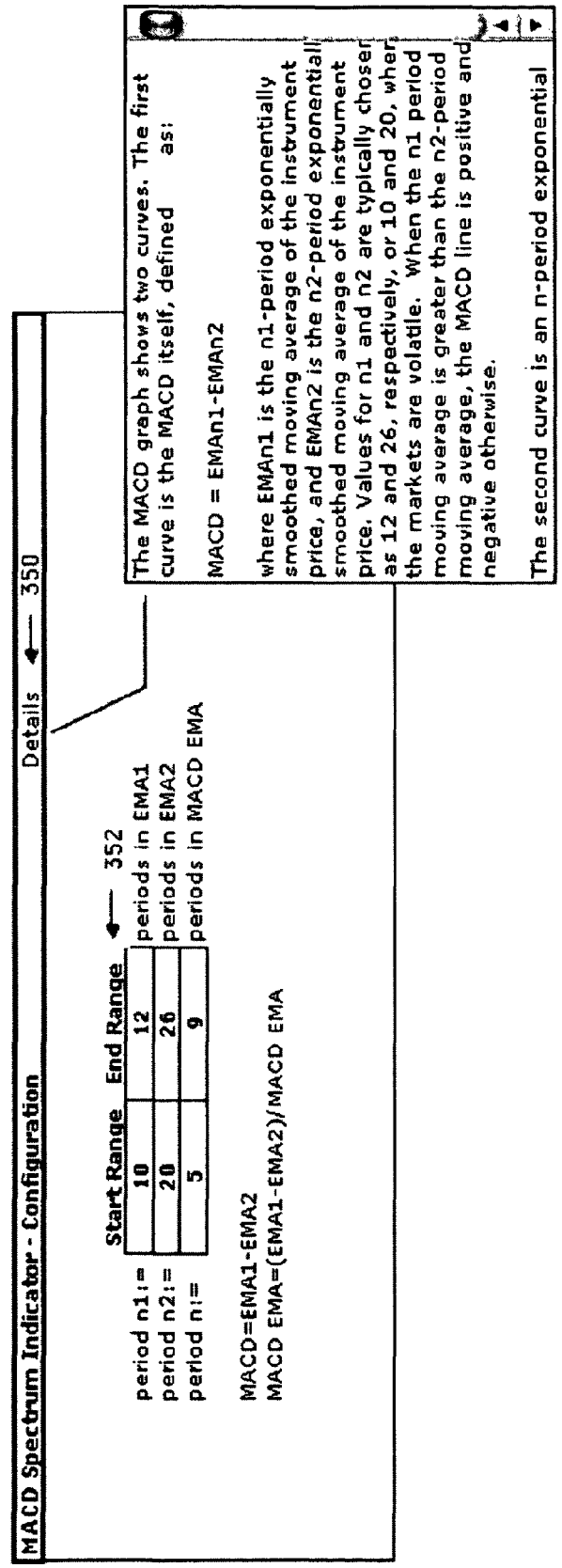
FIG. 7 illustrates an Advanced User Preferences interface screen.

The user can establish parameters for determination of the optimal LBTF and specify other advanced features by activating button Preferences at 276, which will open a separate interface screen as illustrated by FIG. 7, which is described in detail later. When the preferences screen is accessed through Indicator Association/Management screen all preferences will be associated with indicators only, and only with respects to portfolio currently being created or modified. The applicant will specify a default LBTF for both instruments and factors, and can make available any possible parameter through the drop down menu, or other selection means.

At 274 of FIG. 6, the button Configure 1:1 provides the user with access to a separate interface screen, illustrated by FIG. 8, where all strategy elements preceding the Advisor Layer (described later) can be linked on a one-to-one basis to form a strategy chain. SDL scripting interface screen can be accessed at 298. At 280, the user can export a complete list of indicators and their associations for any specified portfolio. At Finish button 300 is used to finalize the operation and proceed to the next setup screen, or the main application screen, as applicable.

FIG. 7 illustrates the Advanced User Preferences interface screen, which may be accessed from various other interface screens. The particular preference settings shown in FIG. 7, or otherwise described, are an example only, and the applicant may make any possible system variable accessible to the user for specification. The default settings described are preliminary and are specified as examples, and the applicant may change the default settings from time to time based upon future research. The advanced preferences selected by the user are applicable to the operative portfolio only, with each portfolio having its own advanced preferences screen available at each processing layer which may contain additional or different settings, and selection mechanisms. For example, the one-to-one configurations pages provide access to an advanced user preferences page that is the same or similar to the screen illustrated in FIG. 7, with a method of selecting any strategy element being worked with at that particular processing layer. The user can then specify their preferences, as applicable, for each strategy element individually.

At 312, the Spectrum Parameters grouping allows the user to specify which variable set in a spectrum processed strategy element the system will use in subsequent processes, e.g., if a 5-20 day moving average is specified, the variable set is 5-20 days, or 16 possible variations generating 16 different signals which will be used as specified by the user. The default setting uses the variable set that the machine learning processes have determined to be most effective overall (i.e., most useful in contributing to final prediction accuracy) in the most recent prediction tasks, which could potentially be any of the variable sets.

At 314, the Period Parameter grouping allows the user to specify various forms of period sampling parameters. The system default uses all periods within the default range rather than sampling based upon any criterion. At 318, the Look Back Time Frame grouping allows the user to specify various historical data range size parameters and sampling criterion. The default setting is to use all periods including the current period for the entire default range, e.g., 1000 periods. At 320, the Normalization—Input Data grouping allows the user to specify data transformations that raw instrument and other data types will undergo prior to any further processing by the system. At 322, the Normalization—Output Data grouping allows the user to specify data transformation operations that are to be performed on post-processing output data at each processing layer, prior to use of the data in subsequent processing. At 324, the Learning Criterion—General grouping allows the user to select various criterion for overall system performance. For example, the user may prefer to tune the system for greater accuracy in the direction of the predictions, where they may prefer the magnitude of the price move to wrong rather than the direction of the price move. The user can select the option to assign weightings to all possible tuning possibilities to achieve the desired balance. At 326, the user can activate the Restore Defaults button, and at 328, the user can activate the Save/Continue button to return to the previous screen.

Figure 8:
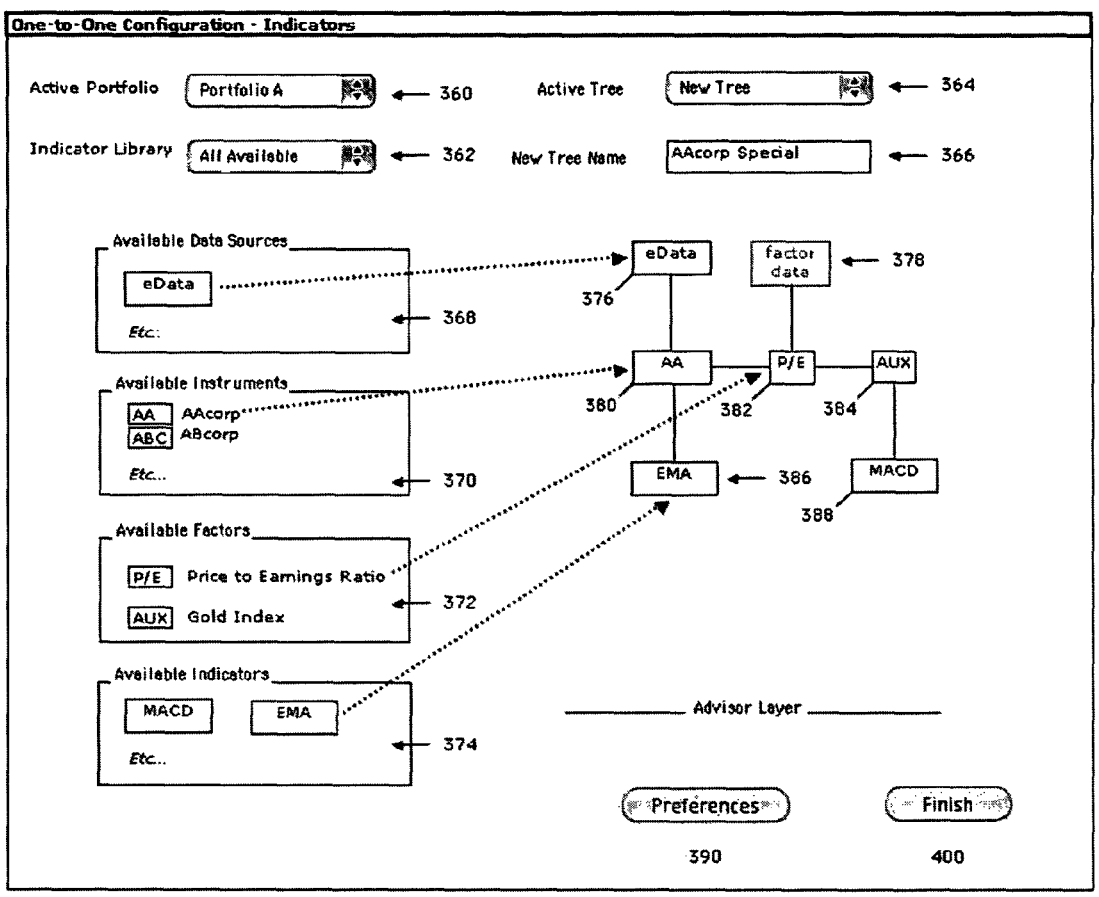
FIG. 8 illustrates a MACD Spectrum Indicator.

FIG. 8 illustrates a MACD Spectrum Indicator—Configuration screen, which can be accessed by the user by double clicking the MACD indicator symbol, icon, or other identifier on any interface screen. A default condition is that when an indicator is designated by the user as a spectrum indicator, e.g., by checking the enable spectrum box when selecting the indicator for inclusion in a portfolio as in FIG. 56 the default spectrum variables are used. A user can then expand any indicator into a screen that is the same or similar to FIG. 8, where at 352, the user can modify all variables, specifying the Start Range, which is the beginning spectrum variable, and the End Range, which is the ending spectrum variable. The primary consideration when selecting the number of variables in a spectrum, is computing resources. Wide spectrums, especially when used with a number of indicators, can be computationally expensive. The applicant will provide through a separate interface screen a utility for monitoring and managing computing resources, so that users can avoid overreaching their current computing capacity. This utility could provide a complete map of all computing resource consumption, so that users can eliminate bottlenecks. The applicant may also provide key resource requirements and allocation information through pop-up windows or other conspicuous means at critical points in the portfolio configuration processes. The applicant will provide basic indicator details and guidelines for each particular indicator's use via pop-up windows or other means, which can be accessed by the user by activating the selector marked Details, as at 3 50. In a case where the user specifies a proprietary indicator, they user can write and save within the system similar such information, if they choose.

Figure 9:
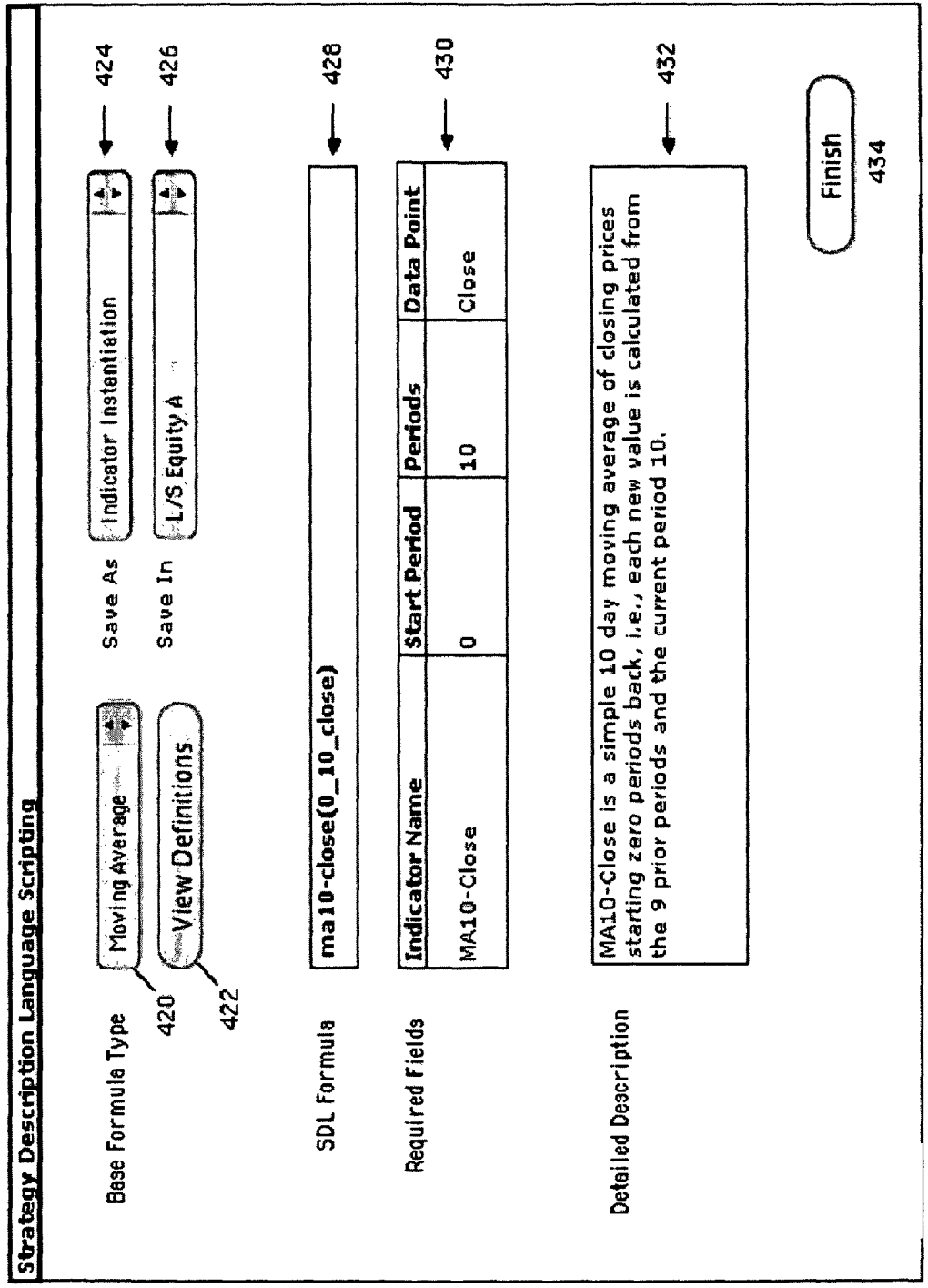
FIG. 9 illustrates a One-to-One Configuration—Indicators screen.

FIG. 9 illustrates the One-to-One Configuration—Indicators screen, where a user can link strategy elements together on a one-to-one basis to form the first part of a strategy chain. FIG. 9 is an example of the screen that can be accessed from the Indicator Association/Management screen, illustrated by FIG. 6, which covers strategy elements up to the Advisor Layer. The ability to string together strategy elements on a one-to-one basis allows the user to have the maximum possible control over how strategy elements are utilized within the system. At 390, the user can access the advanced user preferences screen, which is the same or similar to the advanced user preferences screen illustrated by FIG. 7, except that the applicant will provide a drop down menu where the user can select, individually, any strategy element contained in the tree currently being created or modified. The applicable preferences for each strategy element will be available to the user on this preferences screen, while inapplicable preferences will be grayed out, e.g., the data source preferences will be limited to operations specifically impacting the raw data, such as system input data transformations and period parameters. Any specifications by the user on the advanced preferences screen accessed through the One-to-One Configuration—Indicators screen (i.e., "local" settings) will override any "global" specifications from a prior preferences screen. These overrides will be applicable only to the particular strategy elements specified in the drop down menu that will be provided. For example, a change to one particular indicator will not effect other indicators in the same tree.

At 360, the user can select the operative portfolio. The default is, in the order of priority, the portfolio currently being created or modified, or the most recently created or modified portfolio. Drop down menu 362 allows the user to select the indicator library they wish to view at Available Indicators window 374. At 364, the user can designate which tree they wish to view for modification. The default tree display is New Tree which shows a basic tree structure with four placeholder strategy elements, representing data sources, instruments, factors, and indicators, which are automatically replaced when a user drags-and-drops strategy elements into their place.

There are four different type of strategy elements that can be specified at the Indicator Level. At 368, the Available Data Sources window displays all data sources previously specified by the user as available on their local workstation or network. Any data source can be dragged-and-dropped into the designated positions as shown with eData at 376. Both Instruments and factors can have one or more distinctly different data sources. The factor data placeholder is shown at 378. If a data source placeholder is not filled, the system default is to use the data source specified, for example for instruments, as the data source for factors.

At 370 and 372, the Available Instruments and Available Factors windows, respectively, display all of the symbols, icons or other identifiers for all data types previously specified by the user as instruments and factors in the operative portfolio. These instruments and/or factors can be dragged-and-dropped onto the instrument and factor placeholder areas, as shown at 380 with the example of the instrument AAcorp, and at 382 and 384 with the example of the factors P/E and AUX, respectively. Additional instruments and factors can be added in the same way by dropping them over the first instrument or factor added, where they will automatically be appended to the tree in the order in which they have been added.

At 374, the Available Indicators window displays all of the symbols, icons or other identifiers for indicators specified in Indicator Library drop down menu 362. The default is to list all of the indicators currently included in the operative portfolio. The indicators are, by default, in the same form they are used in the portfolio, i.e., if they have been specified as spectrum indicators, they remain as such, unless the user re-specifies them. These indicators can be associated with, i.e., linked to, either instruments or factors, by being dragged-and-dropped onto the target instrument or factor, as shown at 386, where the indicator EMA was dropped onto AAcorp at 380. Additional indicators can be added in the same way by dropping them over the same target instrument or factor, where they will automatically be appended to the tree in the order in which they have been added. At 388, the indicator MACD was associated with factor AUX at 384.

The tree specified as an example in FIG. 9 becomes the first part of the strategy chain and can be written in the following statements: (1) eData 376 is the data source for both instrument data AAcorp 380 and, factor data P/E 382 and AUX 384; (2) indicator EMA 386 will be used to pre-process instrument data AAcorp 380, while indicator MACD 388 will be used to pre-process factor data AUX 384; and, (3) factor data P/E 382, which has no indicator associated with it will be limited being pre-processed by Change, which is the default minimum indicator that exists for all data types (Change is the change in the data value between the prior period and the current period). Unless the user disables the use of Change as an indicator (and supplies at least one replacement indicator), a system default is to use Change in addition to any other indicators specified in by the user. Finally, to save the specifications and return to the preceding screen, the user activates Finish button 400.

Figure 10:
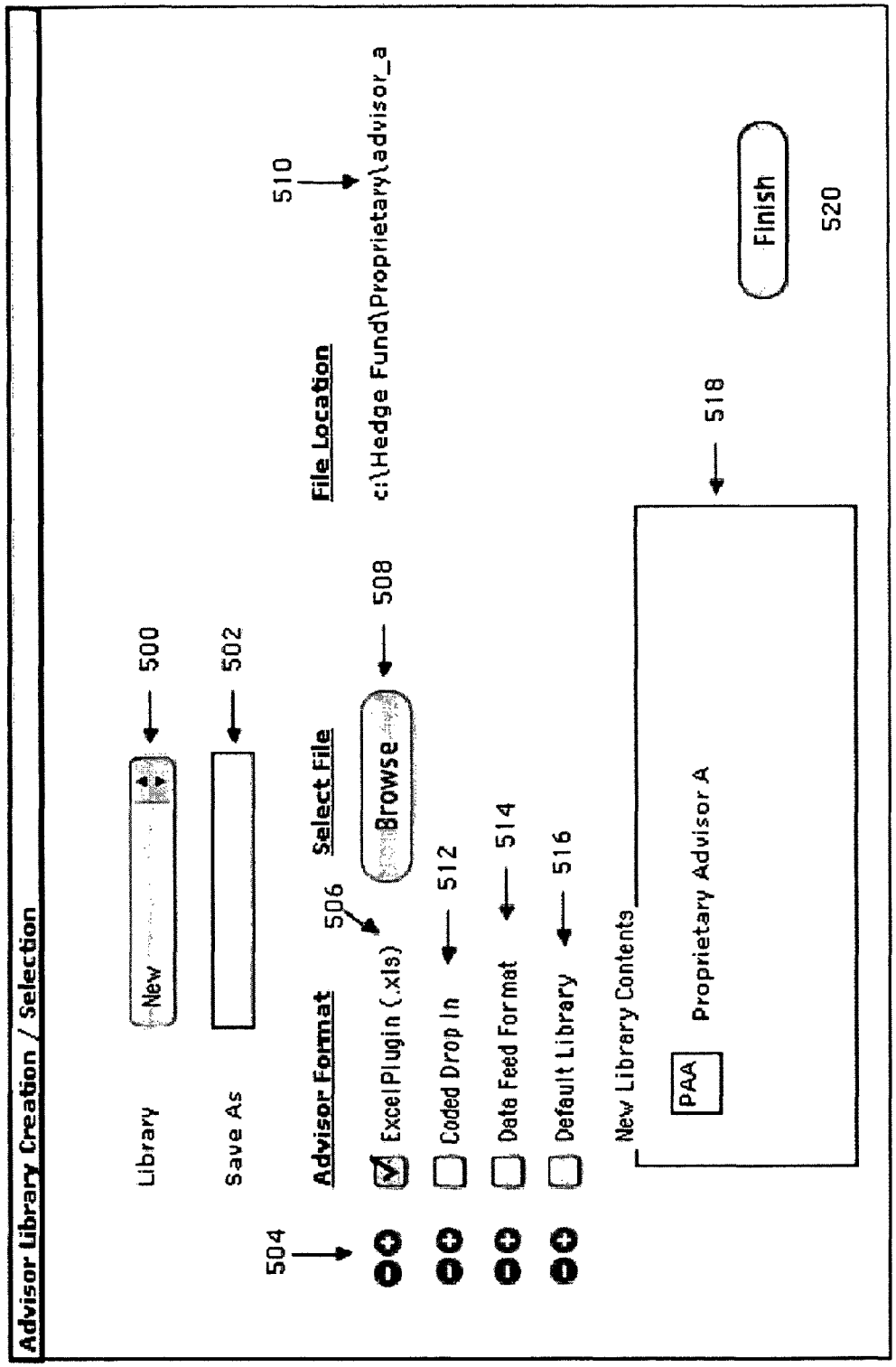
FIG. 10 illustrates a Strategy Description Language Scripting interface screen.

FIG. 10 illustrates the Strategy Description Language ("SDL") Scripting interface screen, where a user can create or re-specify any type of signal generating strategy element from a simple indicator to a complex trading system with nested strategy elements and operations including if/then logic. In a preferred embodiment, SDL is an intermediate language layer between the application graphical user interface and the core Lisp application. In a preferred embodiment of the system, signal generating strategy elements can take two forms. A strategy element formula "type" refers to the generic form and function of a strategy element, i.e., a moving average constitutes a strategy element type, where the specifications are not present. In object oriented programming, these "types" might be referred to as "macros." An "instantiation" of a strategy element type, is a particular instance of a strategy element where the specifications are present, i.e., a 10 day moving average calculated on the Close, is an instantiation of a moving average. In object oriented programming, these "instantiations" might be referred to as "functions," which can include the use of macros in their processes. The important difference between SDL and basic Lisp is that the resulting objects can read, modify and coordinate the use of instrument/factor symbol values across various timeframes, encompassing various histories, and perform various operations. For example, the user can insert into any formula type "shell," a simple syntax that refers to a specified set of values such as period options (e.g., start n periods back, and use k total periods for the calculation) for any database variables (OHL and/or C, etc.), and then the calculation/output of this newly specified object/function creates new values for the current prediction task that are stored in the database (whether these are used for further processing or accepted as the final modeling output, in the case of combiners). The applicant may create definitions that are compatible with other third-party strategy scripting products, so that users can employ strategies already created in another scripting language in the system.

The user can specify, using SDL, all details including the source data feed, data points, frequencies, number of periods, period sampling starting points, list functions, mathematical operations. The applicant will provide a library of default strategy element definitions, e.g., a simple moving average and OHLC data points. An example of syntax used to specify period data are as follows:

(IBM.high); means IBM's most recent High.
(IBM.high −1); means IBM's High for one default time frame back.
(IBM.high −1 daily); means IBM's High one period back in the time frame, "Daily."
(list IBM.high −3 11); lists all values beginning −3 back for a total of 11 periods as a list of values.

At 420, the user can select from a list of base formula types, e.g., moving average, which consists of default formula types supplied with they system, or new formula types defined by the user. The user can select Free Form if they prefer not to use a base formula type as a starting point. At 424, the user can specify whether the SDL formula being defined is a new type, or a new instantiation, for various broad strategy element categories, e.g., an indicator instantiation. The user can specify the library where they want the new strategy element to be saved at 426. A default condition is to permit only specific instantiations (i.e., fully specified strategy elements) to be stored in a library of already specified and operable strategy elements. Strategy element types, would be stored in broad strategy element category libraries, e.g., Advisor Types. The user can access full details for all SDL object definitions and examples for their use, through a separate interface screen, by activating View Definitions button at 422. At 428, the SDL Formula bar displays the formula type specified at 420. The user can either place their cursor into the formula bar and make direct entries into the indicated data area within the formula shell, or, alternatively, the user can make entries into Required Fields table at 430, where the field headers for each respective formula type's required input is displayed. If the user selects Free Form as the formula type, the formula bar will be empty, and the user can enter any SDL syntax they choose. At 432, the user can enter a detailed description of the strategy element in ordinary notation (i.e., not SDL), which can later be accessed for review and/or modification. The user can save the new SDL formula by activating finish button 434.

Figure 11:
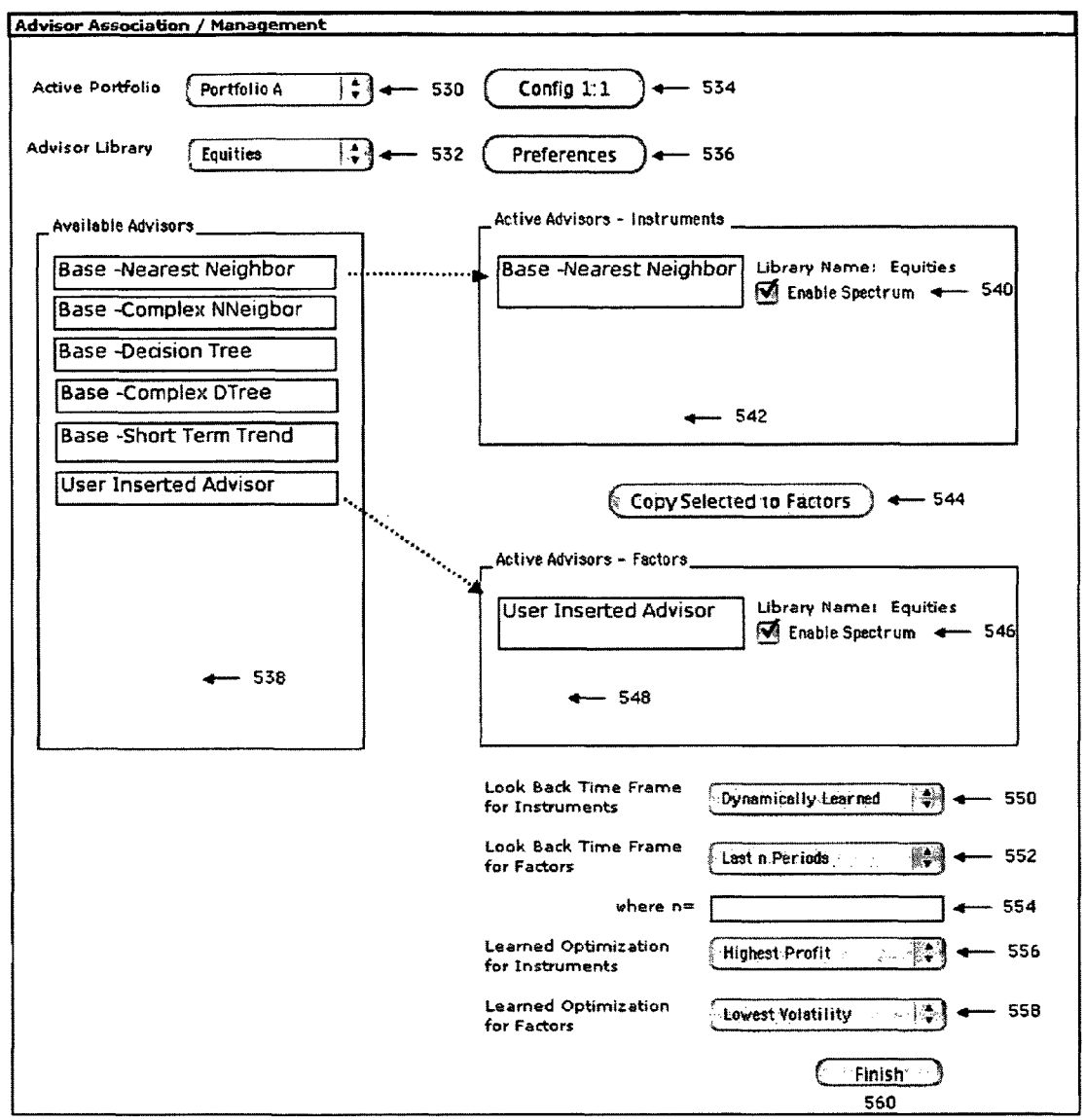
FIG. 11 illustrates an Advisor Creation and Selection screen.

FIG. 11 illustrates an Advisor Creation and Selection screen. Advisors are components within the system that serve to further pre-process signal data generated or made available at the preceding processing layer, e.g., the indicator layer, where all advisor output signal is then used as input in subsequent modeling processes, as described in more detail later. One primary difference between indicators and advisors includes their respective hierarchies within the system, i.e., the processing layer in which they operate. In theory, especially outside of the context of the applicant's system, they serve the same general purpose as indicators, i.e., they are advanced indicators. In practice, and in the context a preferred embodiment of the applicant's system, the more complex a signal generating strategy element is, the less additional processing a user would subject its output signal to. Therefore, advisors are generally more complex than indicators and would typically consist of the recommended Base Advisors (described in more detail later), and the user's proprietary or selected third-party provided models or complete trading systems (the distinction between models and trading systems by the applicant is intentional, e.g., if the user is specifying a portfolio within the system for risk management purposes vs. active trading, the term models is more appropriate than trading systems).

These advisor models or trading systems can be purely mathematical functions on input data, i.e., static signal generators, or, they may have any number of desired rules or logic embedded in them, i.e., non-static signal generators, such as neural networks or genetic algorithm based systems. In a case where the user has identified very powerful, i.e., accurate, yet simple signal generating strategy elements, the strategy element could be designated as an advisor rather than an indicator, or, the user could specify its use in both the indicator and advisor processing layers. A default condition is to utilize all base advisors, included with the system, which are machine learning based components described in more detail later. Other base advisors may be added by the applicant in the future, and the recommended default set may be re-specified.

The user can specify whether the advisors will operate on raw or pre-processed data, e.g., some advisors may be designed to produce output signal from raw instrument or other raw data types, where some advisors may be designed specifically to produce output from indicator output signal data (i.e., raw data pre-processed with one or more indicators), while the user may specify that some advisors do both, resulting in two different advisor output signals that will be used in subsequent processing tasks. The user can associate advisors with particular strategy elements, creating the next section of the strategy chain, as described in more detail later. The user can also specify the output of any externally generated signal data as an advisor in the system, where the system will treat this raw data (actually the output of external advisor processing) in the same way it treats internally produced advisor output for use in subsequent processing tasks. In other words, the user can either build advisors using system utilities, they can code advisors for insertion into the system, or utilize a data feed format to bring externally processed advisor output signals into the system for use in the modeling processes.

In FIG. 11, at 500, a user can designate the Advisor Library, selecting from new (default, which includes all base advisors) or other advisor libraries that have already been created, including the advisor library included with the system (advisors that are included that are not part of the base set of machine learning based advisors), or other libraries created previously, consisting of any combination of base advisors and/or proprietary advisors supplied by the user. The grouping of both base advisors and user supplied or created advisors into libraries is important, because, for example, some advisors are specifically designed for particular asset classes or investment strategies, and it may be desirable to organize them this way (e.g., stock advisors, or sell-short strategy advisors). At 502 the user can enter a name for the new library. Defining a name can be left completely to the user's discretion or a name or partial name can be automatically provided. For example, if this screen is accessed during a portfolio setup process, the automatically provided name might reference the name of the portfolio currently being created, in whole or in part.

At 506, 512, 514, and 516 a user can select the format of the advisor(s) they wish to add, by checking the applicable boxes. The browse button at 508 appears after an advisor format is selected. A user can activate the button to open a window that will show the contents of the portion of the system directory where the advisor files of the respective file format type are located. The user can then select the desired advisor, which will close the browse window, displaying the file location/name as shown at 510. The applicant may provide, through a separate interface screen, some type of folder based organizational structure for the user to file indicators in their respective formats. For example, the user might be directed to transfer any Excel files containing advisor specifications into the folder marked "Excel Advisors," possibly through a similar browse function as at 508, except that the browse function would permit access to the user's entire hard drive or network. Other file formats can automatically be filed by the system, e.g., in cases where an advisor coded in the applicant's specified format is coded using a utility provided by the applicant. At 518, the example shows a New Library Content window displaying a grouping of all advisors that comprise the library being created or modified as specified at 500. Add/Delete (+/−) buttons at 504 can be used to add any number of additional files of the respective types without exiting the current screen, or delete those previously selected. Finish button 520 is used to finalize the operation and proceed to the next setup screen, or the main application screen, as applicable.

Figure 12:
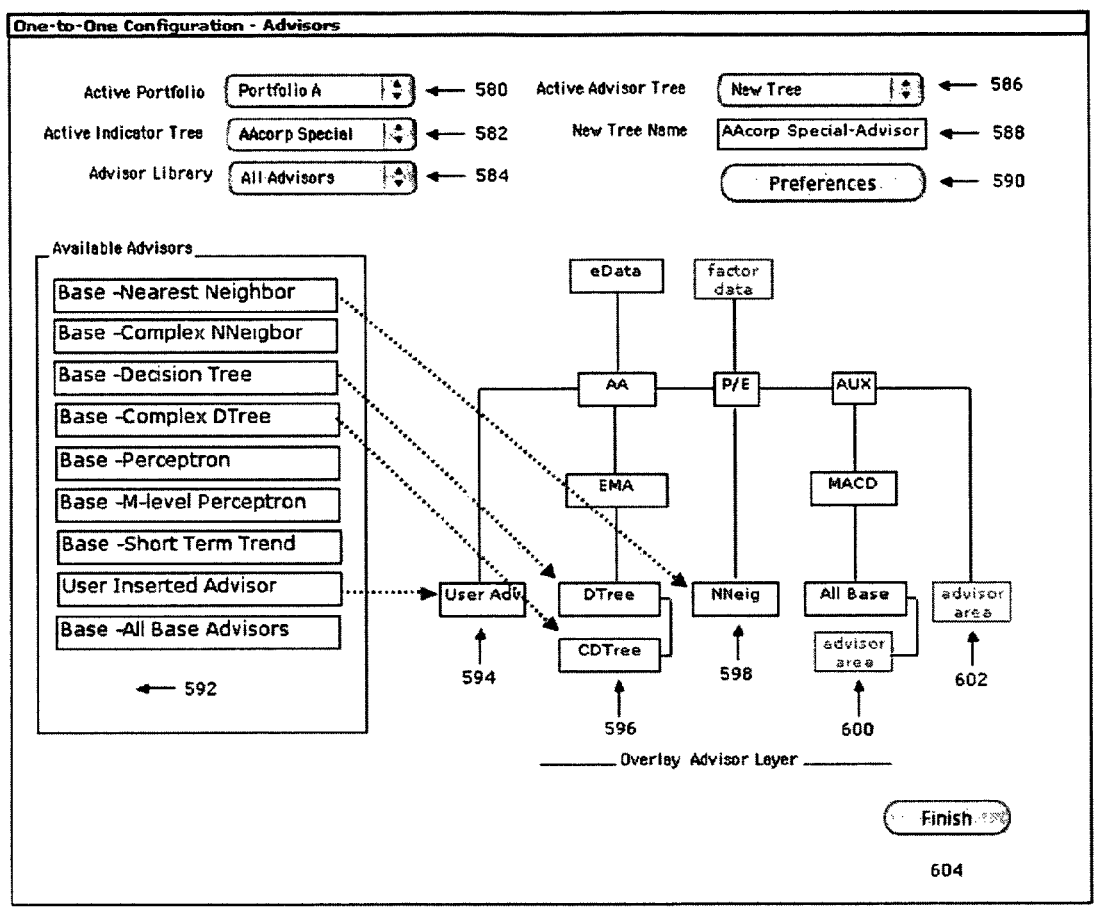
FIG. 12 illustrates an Advisor Association/Management screen display.

FIG. 12 illustrates the Advisor Association/Management screen display where a user can associate particular advisors with the instrument and/or factor groupings specified for the portfolio being created or modified as indicated, for example, as specified at 530. At 538 all available advisors contained in the Advisor Library specified by the user at 530 are shown. A default condition is to list all Base Advisors as available, regardless of which advisor library the user specifies, so in the example, only the "User Inserted Advisor" is a non-base advisor being shown as available in the library called Equities. The user can drag-and-drop the advisor symbol, icon or other identifier into Active Advisors-Instruments or Active Advisors-Factors windows at 542 and 548, respectively. FIG. 12 shows that the base advisor called "Nearest Neighbor" has been placed into the Active Advisors-Instruments window, and a user provided advisor called "User Inserted Advisor" has been placed into the Active Advisors-Factors window. As shown in 540 and 546, the advisor's source library name is displayed, and advisors that have been added can be designated as a Spectrum Advisor by checking the Enable Spectrum box, as in the examples. A default condition of an enabled Spectrum Advisor (described in more detail later) would be a spectrum of parameters designated by the applicant. The user can modify any advisor parameters through a separate interface provided by the applicant, illustrated by FIG. 7, by double clicking on the advisor symbol, icon or other identifier.

Placement of advisors into the Active Advisors-Instruments window associates the specified advisors with the instruments previously specified by the user in the operative portfolio, causing raw and indicator processed instrument data to be processed using the specified advisors. Similarly, placement of the advisors into the Active Advisors-Factors window associates the specified advisors with the factors previously specified by the user in the operative portfolio, causing the raw and indicator processed factor data, to be processed using the specified advisors. In a preferred embodiment, the system uses a default set of 7 base advisors, that operate on raw and indicator pre-processed instrument or other data types, to produce an output signal that represents the new value in a series of advisor output signals, which is used as input in subsequent modeling processes by combiners. The applicant may change the default set of base advisors and the data they operate on in the future.

One important feature of the applicant's system is that it is domain independent, or in the case of a securities prediction embodiment, the system has no investment strategy bias. The system is, therefore, not itself a model, but rather a flexible, modular framework for managing a users own proprietary models, using a collection of advanced and uniquely implemented and deployed machine learning technologies. This is of critical importance, because the system is, because of this, suitable for any type of user, irrespective of their particular approach to the domain. In other words, by using the system the user is not adopting a new strategy, but extracting the best possible results from their existing strategy (unless they choose to create a new strategy). The 7 base advisors that comprise the default set of advisors are listed in window 538. Six of the current set of 7 base advisors, namely Nearest Neighbor, Complex Nearest Neighbor, Decision Tree, Complex Decision Tree, Perceptron, and Multi-level Perceptron are strictly unique implementations of machine learning techniques, without any strategy bias, that may be used employed at various places within the system. The mathematical and logical underpinnings of these "unbiased" advisors (which are also used as default Base Overlay Advisors and Base Combiners, described later) do not need to be published because they do not conflict with any pre-existing user strategy bias or mandates, i.e., users do not require transparency with respects to these classifications of strategy elements any more than they require transparency into the source code used to program an interface screen.

In the context of a preferred embodiment of the applicant's system, a decision tree, is informally a conditional series of "tests" that are applied to the input, where depending on the outcome of the tests (a path through the tree), a prediction is made. Given n periods of past data, the system uses a "minimum entropy" heuristic that attempts to approximate the smallest "explanation" of the data over that period. For example, a small decision tree might look like the following:

```
If 13mvag is > close
    if 23ema is < high
        then expect 2.2% gain next period (based on 5 samples)
        else expect 0.1% loss next period (based on 2 samples)
    else
        if up 3 days in a row explect 4.5% drop next period (one sample)
        else expect 0.5% gain (7 samples).
```

One use of a decision tree is to identify and then possibly "mimic" or "fade" what it expects other trading systems may have discovered about the current period. In the context of a securities embodiment of the system, to mimic means to accept the decision tree's explanation as it's final output, and to fade means to reject the decision tree's explanation when the pattern described is not expected to be repeated, where the output is multiplied by negative 1, with the product accepted as the decision tree's final output. The use of multi period decision trees generally applies the same algorithm to many different Look Back Time Frames, where the results are then combined with other outputs in the same processing layer. This allows for modeling of populations of traders and other market participants across a wide range of different timeframes, creating hundreds of possible explanations or hypotheses for a single market action.

A Nearest Neighbor is, informally, a component that creates a vector of the input values, and using table lookup finds the vector of values in previous periods of time that is most similar (based on a selected distance metric) and "assumes" what happened then will happen again, thus, its prediction can be said to be reasoned by analogy with past data or "case based." Usually the more periods the nearest neighbor has to consider the more reliable it will be. Variations on nearest neighbor processing include: (a) Use k (some number) as opposed to just 1 nearest neighbor, and average; (b) Rather than using just k previous—use all data points inversely weighted by their closeness; (c) In "complex nearest neighbor" the distance metrics are themselves learned by the system in a way that may weight different inputs; and/or, (d) Any of the above can also be multi-period where different Look Back Time Frames are considered and the nearest neighbors combined.

A Perceptron is, informally, a type of neural network that attempts to learn a linear combination of its input weights to produce predictions that minimize their error. Perceptrons have some unique characteristics that make them suitable for determining market temperament: (a) since it iteratively adjusts itself, it most influenced by the most recent data, and (b) it tends to over compensate if the recent data point is misevaluated, and these characteristics are not unlike human emotion, a major factor in financial markets. Through a separate interface screen that is the same or similar to the one illustrated by FIG. 7, the user can specify and add non-linear terms to single layer Perceptrons so that non-linear functions can be learned. Multi-level Perceptrons can have any number of layers and nodes, which can be specified by the user for more complex non-linear learning. In general, the system can use any type of algorithms or analysis techniques including heuristic, deterministic, non-deterministic, etc.

Base advisor 7, as shown at 296, is a Short-Term Trend Advisor, which is a very simple indicator that the applicant recommends, and specifies as a default advisor. This simple advisor does contain strategy bias, and for this reason its specifications are published and made completely transparent to the user. The user may modify this advisor's parameters or, use its basic concept to create a their own proprietary replacement. It is recommended not because it is a powerful component, but because it is useful when combined with other signals. It's specific formula/process is as follows:

Short Term Trend Indicator/Advisor (STT):
1. initialize STT to direction of last period change.
2. initialize hi to last period High
3. initialize lo to last period Low Repeat for each period:
4. If the period Close>hi then STT=up
   hi replaced with period High
   lo replaced with period Low
   If the period Close<lo STT=down
   hi replaced with period High
   lo replaced with period Low Using the above formula, the STT base advisor determines if the trend is up or down based on the current OHLC bar for a given frequency when its direction was changed (when its previous OHLC bar was violated). Average trend length can be calculated by counting the number of consecutive bars in a given direction.

The applicant has developed other complex and powerful signal generating strategy elements that are suitable for use as advisors and Overlay Advisors, which are described in detail later. These strategy elements are not machine learning based, and they contain strategy bias of the applicant and others, e.g., in the case where the applicant has taken a published trading model and improved upon it. These "biased" base advisors may be included in the system for exploitation by those users that choose to select them for use in the modeling processes. In keeping with the governing principle of the system design and purpose, that of domain independence (i.e., zero strategy bias), any biased advisors included in the system will not be included in any default settings, except for the Quick Start portfolios, which are designed to provide demo and novice users of the system with everything they need to begin trading immediately after the instrument selection step. The applicant will organize Quick Start portfolios, and thus, the selection of strategy elements including biased advisors, by asset class, and some Quick Start portfolios will be geared towards particular strategy types within an asset class, e.g., long/short equity.

Other instantiations of the system which would include biased advisors would be preconfigured or "closed systems" as might be used in a retail application where all users receive predictions from a single instantiation of the system, i.e., none of the users have the ability to chose strategy elements or tune processes, they only receive predictions for some covered group of instruments and/or other data types selected by the sponsor, e.g., a brokerage firm. Because users are not obligated to employ biased advisors and overlay advisors to get the best use out of the system, nor is the advantage gained through use of the system dependent upon their use, there is no need to provide transparency of these components. Therefore, the detailed mathematical and logical underpinnings of biased advisors and overlay advisors that are developed by the applicant will generally not be published, and will remain proprietary to the applicant.

The use of unbiased base advisors in a financial time-series modeling embodiment of the system represents an additional form of data pre-processing, which is designed to provide a second order of signals that are derived from powerful machine learning technologies. The use of biased advisors also provides a second order of signals, which are derived from complex (generally more complex than indicators) models and trading systems. Generally, these types of models and/or trading systems constitute the highest order signals (the most advanced used in most financial applications, where they are used on a stand alone basis by market participants to perform systematic trading or risk management tasks, or as decision support tools with final decisions made at the discretion of a human user. Many of these models and trading systems are used by large populations of market participants, perhaps with only slight variations in their parameters. This is one reason why most such models and systems seem to degrade over time, becoming less useful or, frequently, less consistent. This pattern cancellation effect resulting from widespread use of low complexity, non-adaptive (i.e., parametric or rules based) models or systems, has been acknowledged by academics and practitioners alike. Therefore, signals such as those produced by biased advisors fluctuate widely in their accuracy and usefulness over time.

In evolutionary dynamical systems like financial markets, better results can be achieved by using these types of signals as inputs in a far more complex system that is sophisticated and powerful enough to detect and exploit market activity resulting from widespread use of these simple systems, and even systems of the same or similar complexity to itself. The applicant's system uses advisor signals in further machine learning based processing routines (described later) that are able to make the best possible use of the advisor signals by reviewing each individual advisor signal's historic and current values, detecting performance patterns and learning when each signal type is performing well in the current market environment. The signals showing the most strength presently or expected to show the most strength are then most influential in producing the system's final predictive output for each respective instrument or data type being modeled.

At 550 and 552 the user can specify the Look Back Time Frame, or the method of determining the LBTF, for Instruments and Factors, respectively, by selecting one of the options from the drop down menu. In the example at 552, "Last n Periods" has been selected, causing the period specification field "where n=" to be displayed, as at 554. The user can then enter for n, the number of periods, or individual historical indicator values, that they want the system to use in the machine learning based portions of the modeling process. If, for example, the user specifies 500 days, the system will use the last 500 values produced by indicators associated with instruments, including the current period. If the user specifies a number of periods that exceeds the historical data available in the database for a given instrument or factor, (e.g., a newly listed stock of a newly created index included in the portfolio), the system will automatically use the maximum number of periods available, and will expand this to include new data until the specified number of periods exists (the applicant may provide an error notification pop-up window that requires user acknowledgement). The user can also specify that the LBTF for instruments and/or factors be "Dynamically Learned" as in the example at 308. This specifies that the LBTF will be dynamically adjusted to reflect the current optimum number of periods for each individual instrument or data type being modeled (i.e., each individual modeling subject has its own optimum which could potentially be different with each new predictive task). In general, the system will dynamically seek the largest LBTF that performs well, narrowing the LBTF when market conditions appear to be less predictable.

At 556 and 558, the Learned Optimization for Instruments and Learned Optimization for Factors drop down menus, respectively, allow the user to specify their preferred optimization parameters based upon narrow tuning objectives such as Lowest Volatility, Lowest Drawdown and Highest Profit. As the names indicate, the Learned Optimization for Instruments operate only on advisors associated with the instrument grouping, and the Learned Optimization for Factors operate only on advisors associated with the factor grouping. These settings operate only on the base advisors that are machine learning components of the system, with subsequent machine learning components, such as Overlay Advisors and Combiners, having their own respective learning optimization controls. On the advanced Preferences screens there is a Learning Criterion-General window, as illustrated at 324 on FIG. 7, that allows users to fine tune the learning optimization at each processing layer through more specific parameters, such as Maximize Correct % (direction), Maximize Correct % (magnitude), Minimize Consecutive Error (direction), and Minimize Consecutive Error (magnitude). The user can weight these preferences to create a balance that suits their needs for the portfolio currently being created or modified.

The user can establish advanced parameters for determination of the optimal LBTF and specify other advanced features by clicking button Preferences at 536, which will open a separate interface screen that is the same or similar to FIG. 7, except that all preferences will be associated with advisors only, and only with respects to portfolio currently being created or modified. Any specifications by the user on the advanced preferences screen accessed through the Advisor Association/Management screen will override any specifications from a prior advisor preferences screen for the operative portfolio. The applicant will specify a default LBTF for both instruments and factors, and can make available any possible parameter through the drop down menu, or other selection means. The user can also specify for each base and non-based advisor whether they will process raw data and/or indicator output signals.

At 534 of FIG. 12, the button Configure 1:1 provides the user with access to a separate interface screen, illustrated by FIG. 13 where all strategy elements preceding the Overlay Advisor Layer (described later) can be linked on a one-to-one basis to form a strategy chain.

Figure 13:
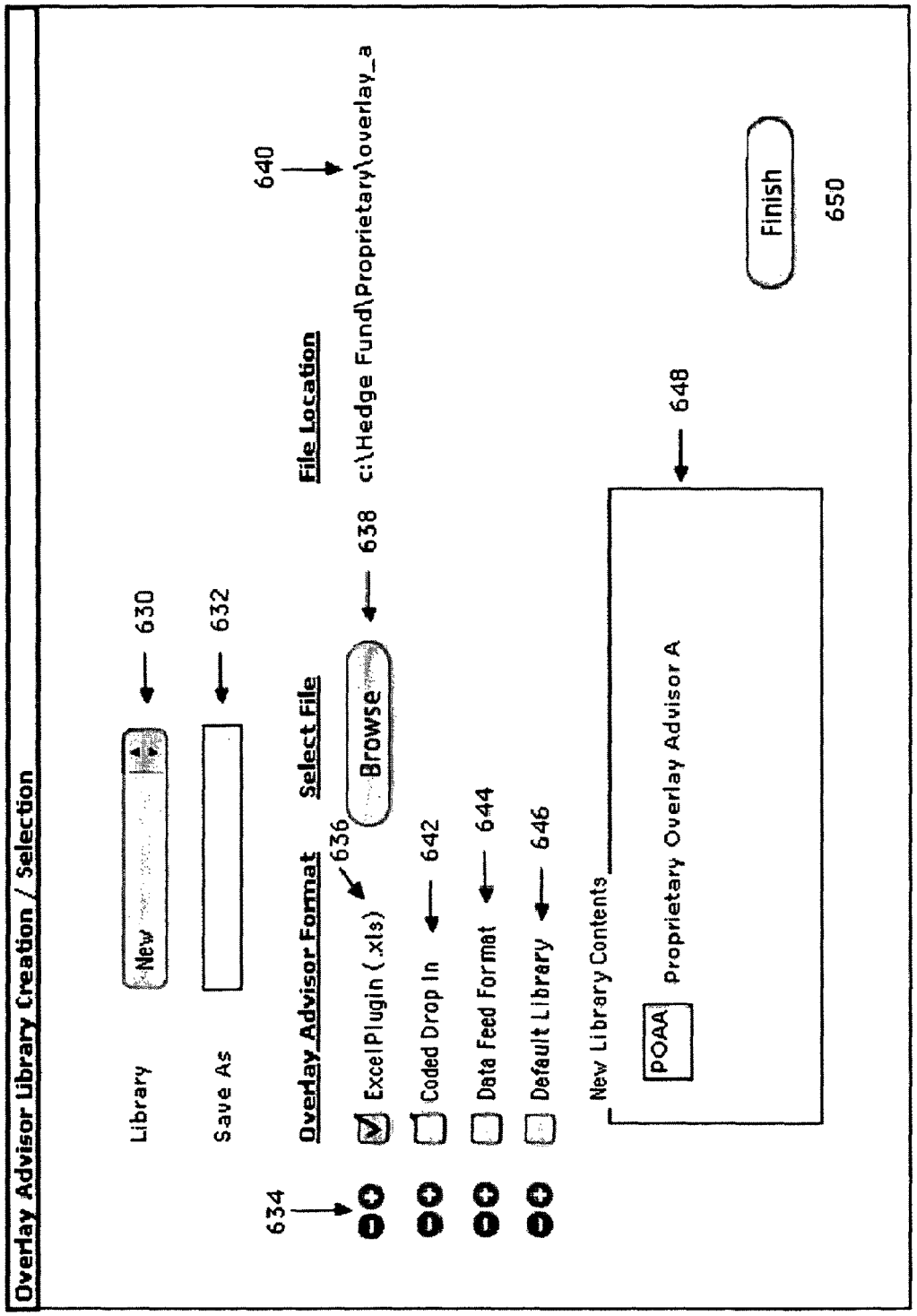
FIG. 13 illustrates a One-to-One Configuration—Advisors interface screen.

FIG. 13 illustrates the One-to-One Configuration—Advisors interface screen that is accessed through Configuration 1:1 button 534 on the Advisor Association/Management interface screen illustrated by FIG. 12. Through this interface screen, the user can add to previous trees to create a strategy chain that covers strategy elements up to the Overlay Advisor Layer. The ability to string together strategy elements on a one-to-one basis allows the user to have the maximum possible control over how strategy elements are utilized within the system. At 590, the user can access the Preferences screen which is the same or similar to the advanced user preferences screen illustrated by FIG. 7, except that the applicant will provide a drop down menu where the user can select, individually, any strategy element contained in the tree currently being created or modified. The applicable preferences for each strategy element will be available to the user on this preferences screen, while inapplicable preferences will be grayed out, e.g., if advisors are selected from the drop-down menu, the available preferences will be limited to operations specifically impacting the advisors. Any specifications by the user on the advanced preferences screen accessed through the One-to-One Configuration—Advisors screen will override any specifications from a prior preferences screen. These overrides will be applicable only to the particular strategy elements specified in the drop down menu that will be provided. For example, a change to one particular advisor will not effect other advisors in the same tree.

At 580, the user can select the operative portfolio. The default is, in the order of priority, the portfolio currently being created or modified, or the most recently created or modified portfolio. At 582, the user can specify the active indicator tree. The default is to show the indicator tree most recently created that is not yet associated with any advisors. Drop down menu 584 allows the user to select the Advisor Library they wish to view in the Available Advisors window at 592. At 586, the user can designate which tree they wish to view for modification. The default tree display is New Tree which shows a basic tree structure with placeholder Advisor Area icons shown at each possible connection point, as at 600 and 602, which are automatically replaced when a user drags-and-drops advisors into their place.

There are 2 different types of advisors that can be specified at the Advisor Level, both base and user created/provided, i.e., unbiased and biased. At 592, the Available Advisors window displays all base advisors as well as all non-base advisors contained in the advisor library specified by the user. Any advisor can be dragged-and-dropped into the designated positions as shown in the example at 594, 596 and 598. Advisors may be removed by dragging them outside of the tree area. The Advisor Area placeholder at 602 is shown as empty for purposes of illustration only. In a preferred embodiment, a default condition is that all strategy elements from the preceding processing layer, e.g., the indicator processing layer, are operated on by all base advisors and any user specified advisors. For example, the branch at 600 shows the actual default condition that a user will see upon first accessing this screen, where All Base Advisors is the first advisor layer strategy element (i.e., MACD further up the branch is part of the indicator layer), followed by an advisor placeholder area, that may or may not be filled by the user. When the user removes the default symbol, icon or other identifier that represents All Base Advisors, an advisor placeholder area is displayed, as in the example at 602. When the preceding strategy element is not associated with any advisor then the preceding strategy element's signal data, e.g., indicator output signals, will be advanced in the database to the fields where the advisor data would have been stored, and will be operated upon by combiners as if it were advisor output signal data, to arrive at the consensus signal used as input for the next processing layer. The advisors are, by default, in the same form they are used in the portfolio, i.e., if they have been specified as spectrum advisors, they remain as such, unless the user re-specifies them.

As shown in the example at 596, additional advisors can be added by dropping them over another advisor on a branch, where they will automatically be appended to the tree in the order in which they have been added.

The advisor layer portion of the tree is now linked or appended to the indicator portion of the tree specified in the example, complete the first and second part of the strategy chain and can be written in the following statements: (1) advisor User Advisor 594, will process instrument data AA's indicator output Change (AA has no other indicator associated with it), (2) advisors DTree and CDTree at 201 will process indicator EMA's output for instrument AA, (3) advisor NNeig at 598 will process factor data P/E's indicator output Change (P/E has no other indicator associated with it), and (4) advisors All Base at 600 will process indicator MACD's output of factor data AUX and no advisors will process AUX's indicator Change. Finally, to save the specifications and return to the preceding screen, the user activates Finish button 604.

Figure 14:
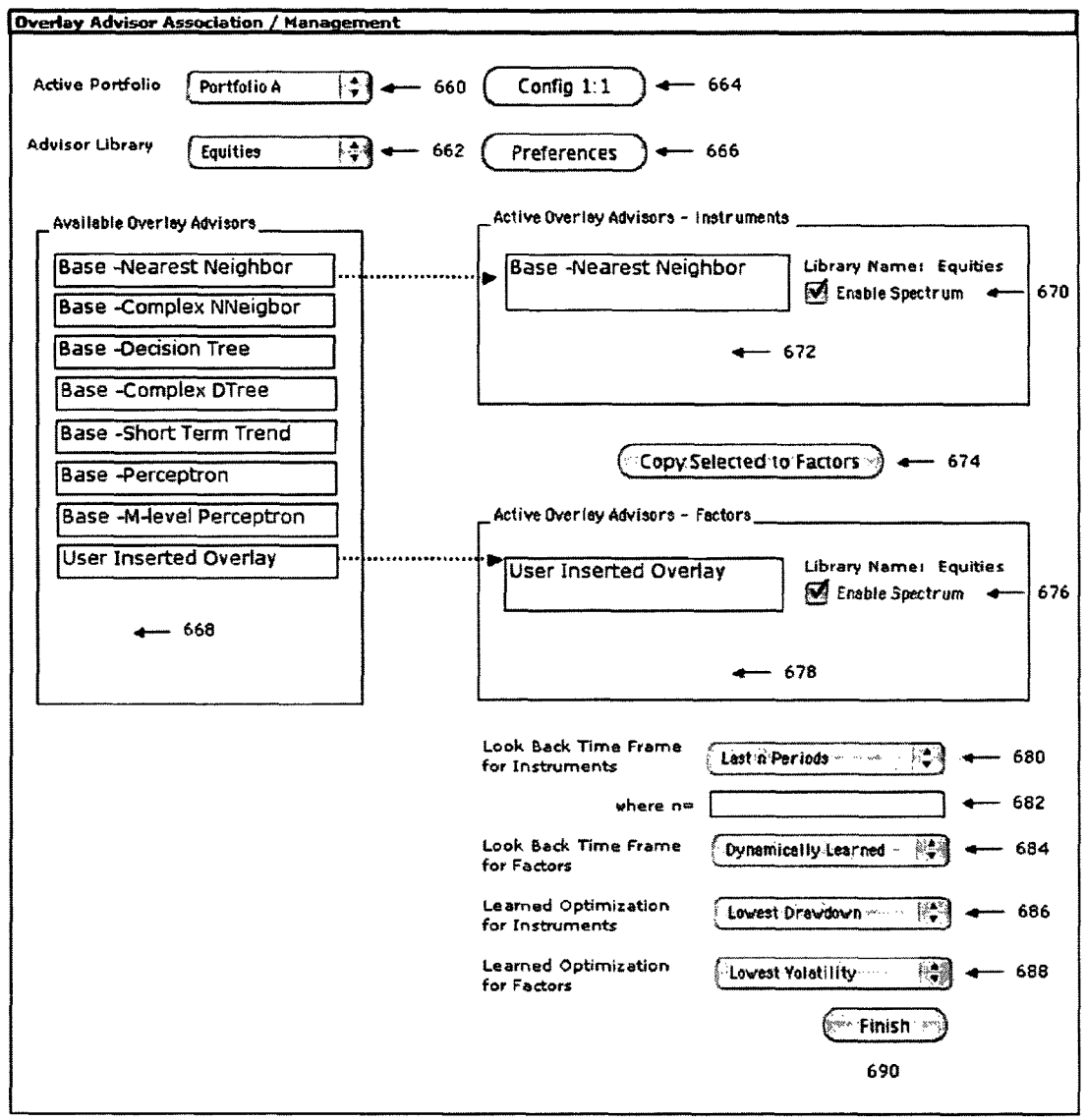
FIG. 14 illustrates an Overlay Advisor Creation and Selection screen

FIG. 14 illustrates an Overlay Advisor Creation and Selection screen. Overlay Advisors are components within the system that serve to further pre-process signal data generated or made available at the preceding processing layer, e.g., the indicator layer, where all advisor output signal data is then used as input in subsequent modeling processes, as described in more detail later. One primary difference between advisors and overlay advisors includes their respective hierarchies within the system, i.e., the processing layer in which they operate. In theory, especially outside of the context of the applicant's system, they serve the same general purpose. In practice, and in the context of the applicant's system, the more complex a signal generating strategy element is, the less additional processing a user would subject its output to. Therefore, overlay advisors are generally more complex than advisors and would typically consist of the recommended Base Advisors (described in more detail later), and the user's most advanced proprietary or selected third-party provided models or complete trading systems (the distinction between models and trading systems by the applicant is intentional, e.g., if the user is specifying a portfolio within the system for risk management purposes vs. active trading, the term models is more appropriate than trading systems). Because overlay advisor output signals receive the least amount of processing prior to the system's generation of a final prediction, overlay advisors can, when they are very effective on a stand-alone basis, have greater influence on the final prediction. While the applicant has determined that an overlay advisor processing layer is generally advantageous, and has specified that a default condition of a preferred embodiment of the system recommends their use, the use of an overlay advisor processing layer is not a requirement, and the advantages gained from using the system are not dependent upon the use of overlay advisors. Each user's unique strategy, objectives and independent proprietary research using the system will govern whether overlay advisors are used for a given portfolio.

These overlay advisor models or trading systems can be purely mathematical functions of input data, i.e., static signal generators, or, they may have any number of desired rules or logic embedded in them, i.e., non-static signal generators, such as neural networks or genetic algorithm based systems. In a case where the user has identified very powerful, i.e., accurate, signal generating strategy elements, the strategy element could be designated as an overlay advisor rather than an advisor, or, the user could specify its use in both the advisor and overlay advisor processing layers (the use could also use the same strategy element in the indicator processing layer, if desired). A default condition is to utilize all base overlay advisors, included with the system, which are machine learning based components described in more detail later. Other base overlay advisors may be added by the applicant in the future, and the default set may be re-specified.

The user can specify whether the overlay advisors will operate on raw or pre-processed data, e.g., some overlay advisors may be designed to produce output signals from raw instrument or other raw data types, where some advisors may be designed specifically to produce output signals from indicator or advisor output signal data (i.e., raw data pre-processed with one or more indicators or advisors), while the user may specify that some overlay advisors do all three, resulting in three different overlay advisor output signals that will be used in subsequent processing tasks, by Combiners, which are described in detail later. The user can associate overlay advisors with particular strategy elements, creating the next section of the strategy chain, as described in more detail later. The user can also specify the output of any externally generated signal data as an overlay advisor in the system, where the system will treat this raw data (actually the output signals of external overlay advisor processing) in the same way it treats internally produced overlay advisor output signals for use in subsequent processing tasks. In other words, the user can either build overlay advisors using system utilities, they can code overlay advisors for insertion into the system, or utilize a data feed format to bring externally processed overlay advisor output signals into the system for use in the modeling processes.

In FIG. 14, at 630, a user can designate the Overlay Advisor Library, selecting from new (default) or other overlay advisor libraries that have already been created, including the base overlay advisor library included with the system, or other libraries created previously, consisting of any combination of base overlay advisors and/or proprietary overlay advisors supplied by the user. The grouping of both base indicators and user supplied or created overlay advisors into libraries is important, because, for example, some overlay advisors are specifically designed for particular asset classes or investment strategies, and it may be desirable to organize them this way (e.g., stock overlay advisors, or sell-short strategy overlay advisors). At 632 the user can enter a name for the new library. Defining a name can be left completely to the user's discretion or a name or partial name can be automatically provided. For example, if this screen is accessed during a portfolio setup process, the automatically provided name might reference the name of the portfolio currently being created.

At 636, 642, 644, and 646 a user can select the format of the overlay advisor(s) they wish to add, by checking the applicable boxes. The browse button at 638 appears after an overlay advisor format is selected. A user can click on the button to open window that will show the contents of the portion of the system directory where the overlay advisor files of the respective file format type are located. The user can then select the desired overlay advisor, which will close the browse window, displaying the file location/name as shown at 640. The applicant may provide, through a separate interface screen, some type of folder based organizational structure for the user to file indicators in their respective formats. For example, the user might be directed to transfer any Excel files containing overlay advisor specifications into the folder marked "Excel Advisors," possibly through a similar browse function as at 638, except that the browse function might permit access to the user's entire hard drive or network. Other file formats can automatically be filed by the system, e.g., in cases where an overlay advisor coded in the applicant's specified format is coded using a utility provided by the applicant. At 648, the example shows a New Library Content window displaying a grouping of all overlay advisors that comprise the library being created or modified as specified at 630. Add/Delete (+/−) buttons at 634 can be used to add any number of additional files of the respective types without exiting the current screen, or delete those previously selected. Finish button 340 is used to finalize the operation and proceed to the next setup screen, or the main application screen, as applicable.

Figure 15:
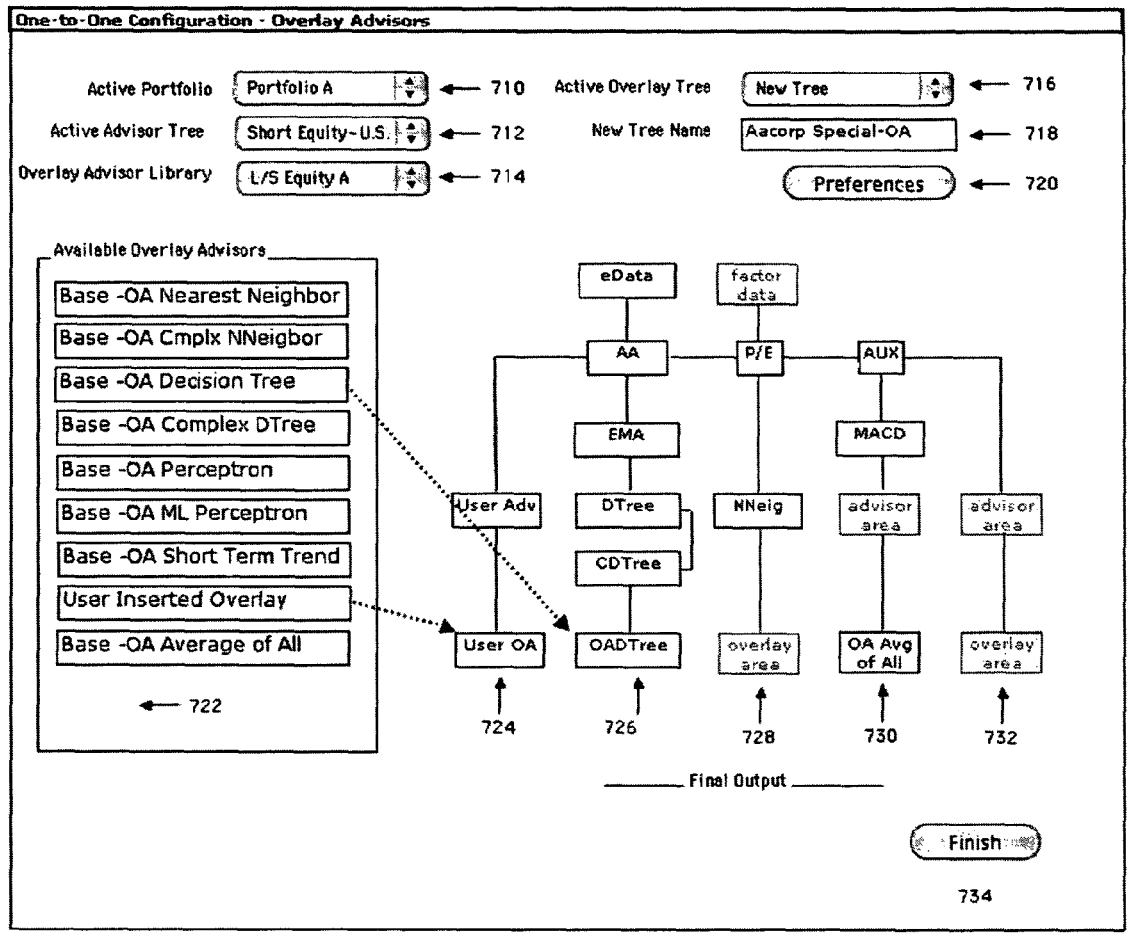
FIG. 15 illustrates an Overlay Advisor Association/Management screen display.

FIG. 15 illustrates the Overlay Advisor Association/Management screen display where a user can associate particular overlay advisors with the instrument and/or factor groupings specified for the portfolio being created or modified as indicated, for example at 660. At 668 all available overlay advisors contained in the Overlay Advisor Library specified by the user at 660 are shown. A default condition is to list all Base Overlay Advisors as available, regardless of which overlay advisor library the user specifies, so in the example, only the "User Inserted Overlay" is a non-base overlay advisor being shown as available in the library called Equities. The user can drag-and-drop the overlay advisor symbol, icon or other identifier into Active Overlay Advisors-Instruments or Active Overlay Advisors-Factors windows at 672 and 678, respectively. FIG. 15 shows that the base overlay advisor called "Nearest Neighbor" has been placed into the Active Advisors-Instruments window, and a user provided advisor called "User Inserted Overlay" has been placed into the Active Advisors-Factors window. As shown in 670 and 676, the overlay advisor's source library name is displayed, and overlay advisors that have been added can be designated as a Spectrum Overlay Advisor (where applicable) by checking the Enable Spectrum box, as in the examples. A default condition of an enabled Spectrum Overlay Advisor (described in more detail later) would be a spectrum of parameters designated by the applicant. The user can modify any overlay advisor parameters through a separate interface provided by the applicant, illustrated by FIG. 7, by double clicking on the overlay advisor symbol, icon or other identifier. The SDL formula editor window not shown in FIG. 7 will also be included.

Placement of overlay advisors into the Active Overlay Advisors-Instruments window associates the specified overlay advisors with the instruments previously specified by the user in the operative portfolio, causing raw and indicator and advisor processed instrument data to be processed using the specified overlay advisors. Similarly, placement of the overlay advisors into the Active Overlay Advisors-Factors window associates the specified overlay advisors with the factors previously specified by the user in the operative portfolio, causing the raw and indicator processed factor data, to be processed using the specified overlay advisors. In a preferred embodiment, the system uses as a default set of 7 base overlay advisors (6 of which are unbiased), that operate on raw and indicator and advisor pre-processed instrument or other data types, to produce an output signal that represents the new value in a series of overlay advisor output signals, which is used as input in subsequent modeling processes by Combiners. These default base overlay advisors are the same or similar to the default base advisors described earlier, and the 6 unbiased components' mathematical underpinnings are not disclosed because they are strictly machine learning mechanisms without any strategy bias. The applicant may change the default set of base overlay advisors and the data they operate on in the future. As discussed previously, the applicant has created "biased" strategy elements that are complex and powerful enough to be suitable for use as overlay advisors. These biased strategy elements are included in default sets of overlay advisors for Quick Start portfolios only, and are not required.

The use of unbiased base overlay advisors in a financial time-series modeling embodiment of the system represents an additional form of data pre-processing, which is designed to provide a third order of signals that are derived from a blend of powerful machine learning technologies. The use of biased overlay advisors also provides a third order of signals, which are derived from complex (generally more complex than advisors) models and trading systems that can then be combined with outputs of unbiased overlay advisors to arrive at a final prediction. Generally, these types of models and/or trading systems constitute the very highest order signals (i.e., the most advanced used by the most sophisticated financial applications, where they are used on a stand alone basis by market participants, to perform systematic trading or risk management tasks, or as decision support tools with final decisions made at the discretion of a human user. While many of these models and trading systems are used by smaller populations of market participants than less complex systems such as the advisors described previously (e.g., the most sophisticated hedge funds and banks with staffs of Ph.D.s), they may also be employed with only slight variations in their parameters from firm to firm. Thus, as the number of firms that can afford to conduct research and development at this level grows, or, as an example, as the techniques they are using become popularized through offerings made by software or other sophisticated vendors, these models and systems may also suffer from diminished usefulness. Even the most complex proprietary user models and trading systems can benefit substantially through use within the applicant's system. For example, a user with more than one very effective complex model or trading system can combine their outputs and get the best use of each of them without having to make subjective judgments to determine which to use in a given instance (e.g., model switching in high/low volatility environments). Additionally, a user can add strategy elements, such as fundamental data or even an individual trader or risk manager's discretionary viewpoint, that ordinarily could not be coupled with their models or trading systems in a systematic and dynamically adaptive way (i.e., used to the extent it is helpful). The effectiveness of a single, very complex model or trading system can also be improved by the applicant's system, e.g., by using the system to learn when it is most likely to produce a correct signal. In other words, the applicant's system might assign a Confidence Level (described in more detail later) that corresponds to a low probability of correctness, thereby keeping the user out of the market (or spurring another action such as reduction of position size or the increase of a hedge position), resulting in avoidance or reduction of a loss. Even a user's proprietary machine learning based (e.g., neural networks and genetic algorithms) can benefit-as just described, with the applicant's system adding additional stability to the user's existing nonparametric model. The applicant's system is sophisticated and adaptive enough to detect and exploit market activity resulting from widespread use of these complex models and trading systems, and even systems of the same or similar complexity to itself, ensuring continuing benefits to the user.

The applicant's system uses overlay advisor output signals in further machine learning based processing routines performed by Combiners (described later) that are able to make the best possible use of the overlay advisor signals by reviewing each individual advisor signal's historic and current values, detecting performance patterns and learning when each signal type is performing well or likely to perform well in the current market environment. The signals showing the most strength presently or expected to show the most strength are then most influential in the producing the system's final predictive output for each respective instrument or data type being modeled. At 680 and 684 the user can specify the Look Back Time Frame, or the method of determining the LBTF, for Instruments and Factors, respectively, by selecting one of the options from the drop down menu. In the example at 680, "Last n Periods" has been selected, causing the period specification field "where n=" to be displayed, as at 682. The user can then enter for n, the number of periods, or individual historical overlay advisor values, that they want the system to use in the machine learning based portions of the modeling processes. If, for example, the user specifies 500 days at 682, the system will use the last 500 values produced by overlay advisors associated with instruments, including the current period. If the user specifies a number of periods that exceeds the historical data available in the database for a given instrument or factor, (e.g., a newly listed stock of a newly created index included in the portfolio), the system will automatically use the maximum number of periods available, and will expand this to include new data until the specified number of periods exists (the applicant may provide an error notification pop-up window that requires user acknowledgement). The user can also specify that the LBTF for instruments and/or factors be "Dynamically Learned" as in the example at 684. This specifies that the LBTF will be dynamically adjusted to reflect the current optimum number of periods for each individual instrument or data type being modeled (i.e., each individual modeling subject has its own optimum which could potentially be different with each new predictive task).

At 686 and 688, the Learned Optimization for Instruments and Learned Optimization for Factors drop down menus, respectively, allow the user to specify their preferred optimization parameters based upon narrow tuning objectives such as Lowest Volatility, Lowest Drawdown and Highest Profit. As the names indicate, the Learned Optimization for Instruments operate only on advisors associated with the instrument grouping, and the Learned Optimization for Factors operate only on advisors associated with the factor grouping. These settings operate only on the base advisors that are machine learning components of the system, with subsequent machine learning components, such as Combiners, having their own respective learning optimization controls. On the advanced Preferences screens there is a Learning Criterion-General window, as illustrated at 324 on FIG. 7, that allows users to fine-tune the learning optimization at each processing layer through more specific parameters, such as Maximize Correct % (direction), Maximize Correct % (magnitude), Minimize Consecutive Error (direction), and Minimize Consecutive Error (magnitude). The user can weight these preferences to create a balance that suits their needs for the portfolio currently being created or modified.

The user can establish advanced parameters for determination of the optimal LBTF and specify other advanced features by clicking button Preferences at 590, which will open a separate interface screen that is the same or similar to FIG. 7, except that all preferences will be associated with overlay advisors only, and only with respects to portfolio currently being created or modified. Any specifications by the user on the advanced preferences screen accessed through the Overlay Advisor Association/Management screen will override any specifications from a prior overlay advisor preferences screen for the operative portfolio. The applicant will specify a default LBTF for both instruments and factors, and can make available any possible parameter through the drop down menu, or other selection means.

At 664 of FIG. 15, the button Configure 1:1 provides the user with access to a separate interface screen, illustrated by FIG. 15, where all strategy elements preceding the Overlay Advisor Layer (described later) can be linked on a one-to-one basis to form a strategy chain. The user can activate Finish button at 690.

Figure 16:
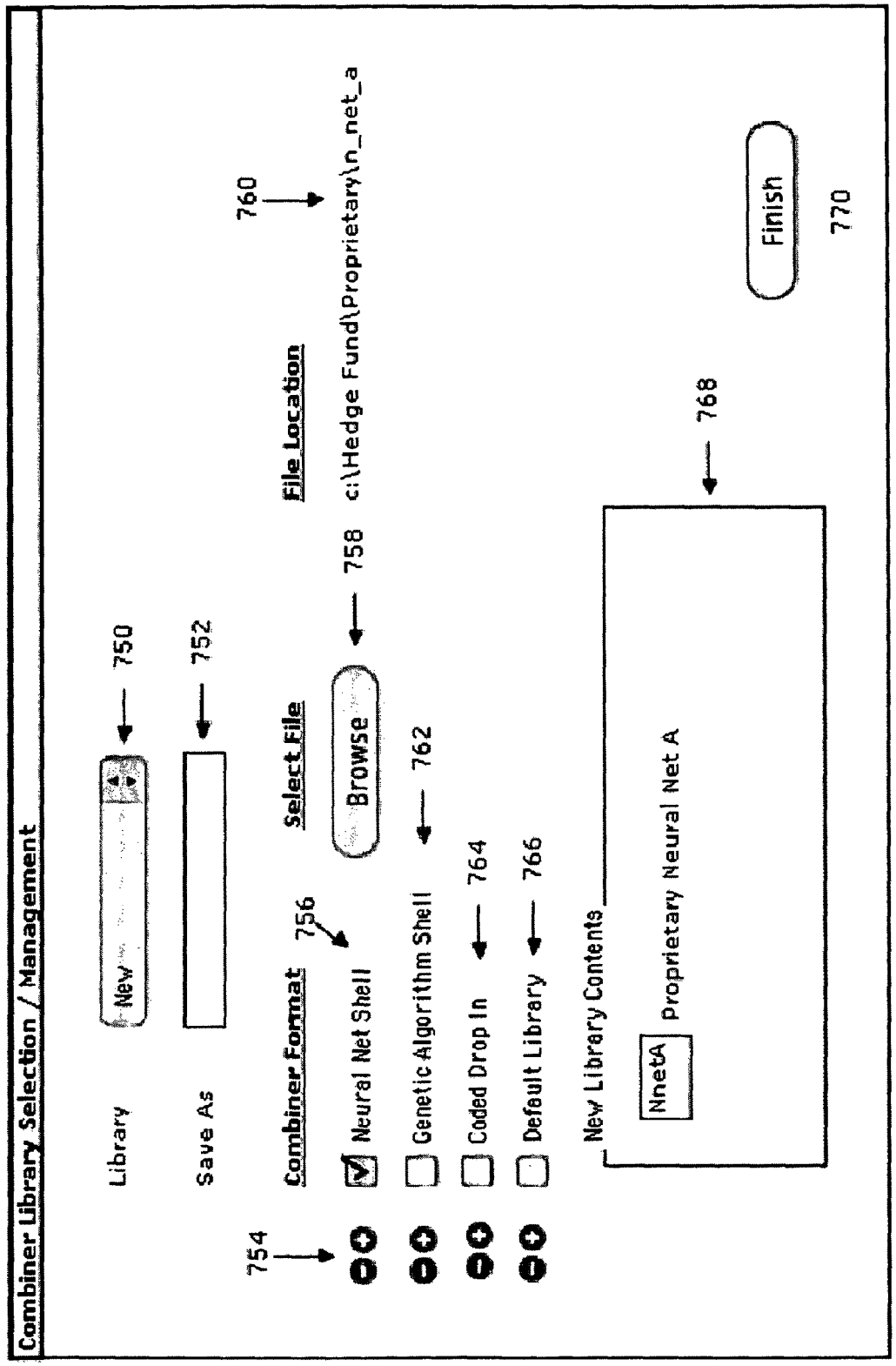
FIG. 16 illustrates a One-to-One Configuration—Overlay Advisors interface screen.

FIG. 16 illustrates the One-to-One Configuration—Overlay Advisors interface screen that is accessed through Configuration 1:1 button 664 on the Overlay Advisor Association/Management interface screen illustrated by FIG. 15. Through this interface screen, the user can add to previous trees to create a strategy chain that covers strategy elements up through the Overlay Advisor Layer. The ability to string together strategy elements on a one-to-one basis allows the user to have the maximum possible control over how strategy elements are utilized within the system. At 720, the user can access the Preferences screen which is the same or similar to the advanced user preferences screen illustrated by FIG. 7, except that the applicant will provide a drop down menu where the user can select, individually, any strategy element contained in the tree currently being created or modified. The applicable preferences for each strategy element will be available to the user on this preferences screen, while inapplicable preferences will be grayed out, e.g., if advisors are selected from the drop-down menu, the available preferences will be limited to operations specifically impacting the advisors. Any specifications by the user on the advanced preferences screen accessed through the One-to-One Configuration—Overlay Advisors screen will override any specifications from a prior preferences screen. These overrides will be applicable only to the particular strategy elements specified in the drop down menu that will be provided. For example, a change to one particular advisor will not effect other advisors in the same tree.

At 710, the user can select the operative portfolio. The default is, in the order of priority, the portfolio currently being created or modified, or the most recently created or modified portfolio. Drop down menu 714 allows the user to select the Overlay Advisor Library they wish to view in the Available Overlay Advisors window at 722. At 716, the user can designate which tree they wish to view for modification. The default tree display is New Tree which shows a basic tree structure with placeholder Overlay Advisor Area icons shown at each possible connection point, as at 728 and 732, which are automatically replaced when a user drags-and-drops advisors into their place.

There are 2 different types of overlay advisors that can be specified at the Overlay Advisor Level, both base and user created/provided, i.e., unbiased and biased. At 220, the Available Overlay Advisors window displays all base overlay advisors as well as all non-base overlay advisors contained in the advisor library specified by the user. Any overlay advisor can be dragged-and-dropped into the designated positions as shown in the example at 724, 726 and 730. Overlay advisors may be removed by dragging them outside of the tree area. The Overlay Advisor Area placeholders at 728 and 732 are shown as empty for purposes of illustration only. In a preferred embodiment, a default condition is that all strategy elements from the preceding processing layer, e.g., the advisor processing layer, are operated on by all base overlay advisors and any user specified overlay advisors. For example, the branch at 730 shows the actual default condition that a user will see upon first accessing this screen, where All Base Overlay Advisors is the first overlay advisor layer strategy element (i.e., MACD further up the branch is part of the indicator layer), followed by an advisor placeholder area, that may or may not be filled by the user (not filled in the example). When the user removes the default symbol, icon or other identifier that represents All Base Overlay Advisors, an overlay advisor placeholder area is displayed, as in the example at 728 and 732. When the preceding strategy element is not associated with any overlay advisor then the preceding strategy element's signal data, e.g., indicator or advisor output signals, will be advanced in the database to the fields where the overlay advisor data would have been stored, and will be operated upon by combiners as if it were advisor output signal data, to arrive at the consensus signal used as input for the next processing layer. The overlay advisors are, by default, in the same form they are used in the portfolio, i.e., if they have been specified as spectrum overlay advisors, they remain as such, unless the user re-specifies them.

As shown in the example at 201, additional advisors can be added by dropping them over another advisor on a branch, where they will automatically be appended to the tree in the order in which they have been added.

The indicator and advisor portions of the tree is now linked or appended to the overlay advisor portion of the tree specified in the example, which completes the first, second and third part of the strategy chain (the entire recommended default strategy chain) and can be written in the following statements: (1) User Overlay Advisor 724 will process the User Advisor output, (2) Overlay Advisor Decision Tree 726 will process advisor level Decision Tree and Complex Decision Tree outputs, and (3) Overlay Advisor Average of All 730 will process MACD output. Finally, to save the specifications and return to the preceding screen, the user activates Finish button 734.

Figure 17:
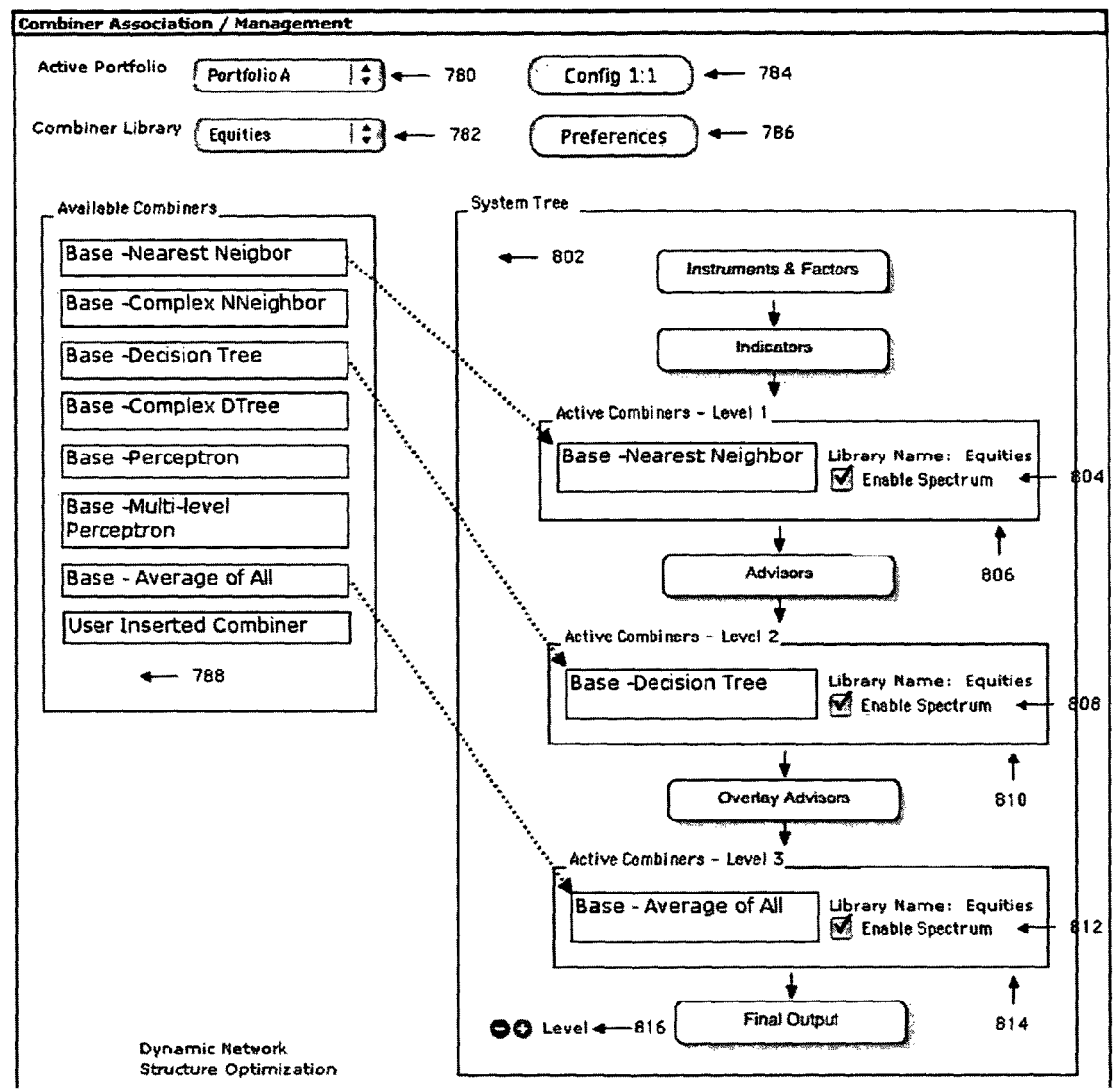
FIG. 17 shows combiner selection and management.

In FIG. 17, at 750, a user can designate the Combiner Library, selecting from new (default) or other combiner libraries that have already been created, including the base combiner library included with the system, or other libraries created previously, consisting of any combination of base combiners and/or proprietary combiners created or supplied by the user. The grouping of both base combiners and user supplied or created combiners into libraries is important, because, for example, some combiners can be specifically designed for particular asset classes or investment strategy, and it may be desirable to organize them this way (e.g., stock combiners, or sell-short strategy combiners). At 752 the user can enter a name for the new library. Defining a name can be left completely to the user's discretion or a name or partial name can be automatically provided. For example, if this screen is accessed during a portfolio setup process, the automatically provided name might reference the name of the portfolio currently being created, in whole or in part.

At 756, 762, 764, and 766 a user can select the format of the combiner(s) they wish to add, by checking the applicable boxes. The browse button at 758 appears after an overlay advisor format is selected. A user can click on the button to open window that will show the contents of the portion of the system directory where the overlay advisor files of the respective file format type are located. The user can then select the desired overlay advisor, which will close the browse window, displaying the file location/name as shown at 760. The applicant may provide, through a separate interface screen, some type of folder based organizational structure for the user to file indicators in their respective formats. For example, the user might be directed to transfer any Excel files containing overlay advisor specifications into the folder marked "Excel Advisors," possibly through a similar browse function as at 758, except that the browse function might permit access to the user's entire hard drive or network. Other file formats can automatically be filed by the system, e.g., in cases where an overlay advisor coded in the applicant's specified format is coded using a utility provided by the applicant. At 768, the example shows a New Library Content window displaying a grouping of all combiners that comprise the library being created or modified as specified at 750. Add/Delete buttons (+/−) at 754 can be used to add any number of additional files of the respective types without exiting the current screen, or delete those previously selected. Finish button 770 is used to finalize the operation and proceed to the next setup screen, or the main application screen, as applicable.

Figure 18:
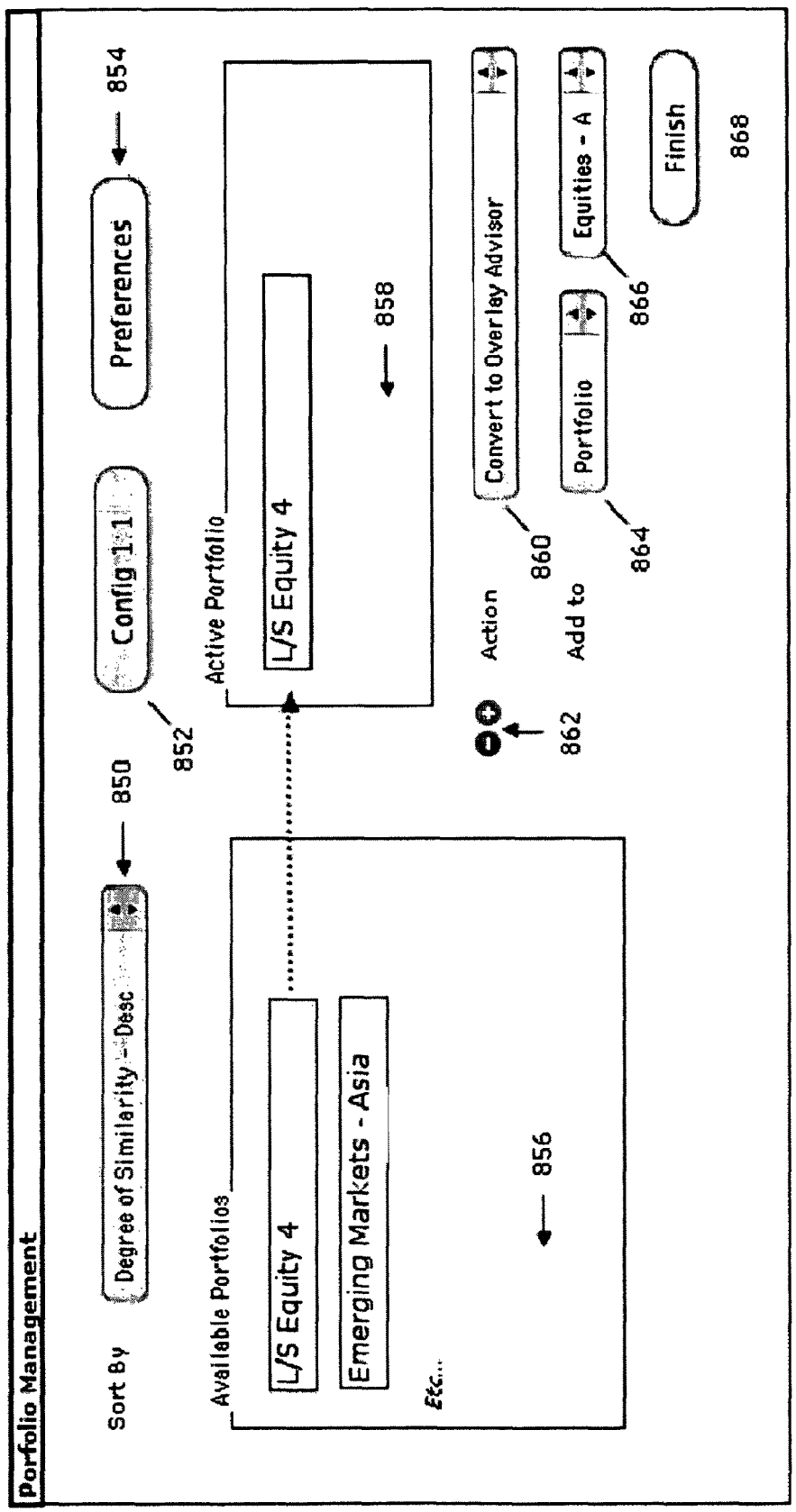
FIG. 18 illustrates a Combiner Association/Management screen display.

FIG. 18 illustrates the Combiner Association/Management screen display where a user can associate particular combiners with the indicator, advisor and overlay advisor processing layers for the portfolio being created or modified as indicated, for example, as specified at 780. At 788 all available combiners contained in the Combiner Library specified by the user at 780 are shown. A default condition is to list all Base Combiners as available, regardless of which overlay advisor library the user specifies, so in the example, the "User Inserted Combiner" is the only non-base combiner being shown as available in the library called Equities. The user can drag-and-drop the combiner symbol, icon or other identifier into Active Combiner-Level 1 (indicator processing layer) window at 806, Active Combiner-Level 2 window (advisor processing layer) at 810, and/or the Active Combiners-Level 3 window (overlay advisor processing layer) at 814. FIG. 15 shows that the base combiner called "Nearest Neighbor" has been placed into the Active Combiners-Level 1 window, a base combiner called "Decision Tree" has been placed into the Active Combiners-Level 2 window, and a combiner called "Average of All" has been has been placed into the Active Combiners-Level 3 window. The combiner called Average of All is not itself an actual combiner, but rather, a short cut feature for specifying the inclusion of all base combiners at any processing layer, and deriving the final prediction from the simple mathematical average of all combiner outputs. If the Average of All feature is used, then any non-base combiner added by the user to the same Active Combiner window will be included in the calculation, and equally weighted in its contribution to the final prediction. A default condition of a preferred embodiment of the system is to use all base combiners at all processing layers and derive the final prediction at each processing layer from a simple mathematical average of all combiner outputs, where the final prediction of the last processing layer is the prediction received by a human user through an output interface screen.

As shown in 804, 808, and 812, the combiner's source library name is displayed, and combiners that have been added can be designated as a Spectrum Combiners by checking the Enable Spectrum box. A default condition of an enabled Spectrum Combiner (described in more detail later) would be a spectrum of parameters designated by the applicant. Spectrum Combiners could process a spectrum of Look Back Time Frames, and/or can process a spectrum of other parameters, e.g., a spectrum of non-linear terms in a perceptron. The user can modify any combiner parameters through a separate interface provided by the applicant, illustrated by FIG. 7 or 10 by double clicking on the combiner symbol, icon or other identifier.

Placement of combiners into the Active Combiners-Level 1 window associates the specified combiners with the indicators previously specified by the user in the operative portfolio, causing indicator processed instrument, factor and other data types (i.e., indicator output signals) to be processed using the specified combiners. Each individual instrument or other data type being modeled is pre-processed by a minimum of one indicator (the default minimum indicator called Change, which is simply the calculated change in the value of the current period over the prior period), and each new indicator value is used to produce its own prediction generated by each respective combiner. In other words, if there is (a) one instrument being modeled (as opposed to a data type with a single data point), and (b) the default Open, High, Low, and Close raw data points are specified for inclusion (i.e., the user didn't exclude any default data points), and (c) there is only the minimum default indicator Change used (i.e., the user didn't specify any other indicators), and (d) all 6 default combiners are being used (i.e., the user didn't exclude any default combiners or specify any non-base combiners), then there are 24 different signals (one for each data point and indicator pairing (4 data points multiplied by 1 indicator in the example) multiplied by one for each combiner (6 in the example)). These 4 data points, each with one indicator in the example, have 6 predictions each, which are then distilled into a single prediction per indicator by using a Consensus Function. The default Consensus Function is to calculate the simple mathematical average of all 6 combiner predictions for each indicator, which produces a new value that is operated on by advisors at the next processing layer. The user can specify other Level 1 Consensus Functions through the advanced Preferences button at 786, such as custom weighting of the base combiner outputs.

Placement of combiners into the Active Combiners-Level 2 window associates the specified combiners with the advisors previously specified by the user in the operative portfolio, causing advisor processed instrument, factor and other data types (i.e., advisor output signals) to be processed using the specified advisor layer combiners. After each individual instrument or other data type being modeled has passed through the indicator processing layer, each new indicator layer combiner value is processed using the default set of advisors (if not excluded by the user) and any other user specified advisors. For example, if there is (a) one instrument being modeled, and (b) only the default set of 5 base advisors is used (i.e., the user didn't specify any other advisors), and (c) all 6 default advisor layer base combiners are being used (i.e., the user didn't exclude any default combiners or specify any non-base combiners), then there are 6 different signals (one for each indicator layer combiner (1 data point from the indicator layer combiner consensus, multiplied by 5 base advisor outputs in the example) multiplied by 1 for each combiner (6 in the example)=30). These 5 advisor outputs, have 6 different combiner predictions each, which are then distilled into a single prediction per advisor by using a Consensus Function. The default Consensus Function is to calculate the simple mathematical average of all 6 combiner predictions for each advisor, which produces a new value that is operated on by overlay advisors at the next processing layer. Adding either a single additional instrument or a single additional advisor increases the number of values that are produced and processed by 6 values. Enabling the single advisor as a spectrum, multiplies the number of values that are produced and processed (30 in the example) by the number of different period variables in the spectrum, e.g., a 2-10 day spectrum specifies 9 different variations, or 9 multiplied by 24.

Placement of combiners into the Active Combiners-Level 3 window associates the specified combiners with the overlay advisors previously specified by the user in the operative portfolio, causing overlay advisor processed instrument, factor and other data types (i.e., overlay advisor output signals), to be processed using the specified overlay advisor layer combiners. After each individual instrument or other data type being modeled has passed through the advisor processing layer, each new advisor layer combiner value is processed using the default set of overlay advisors (if not excluded by the user) and any other user specified overlay advisors. For example, if there is (a) one instrument being modeled, and (b) only the default set of 6 base overlay advisors is used (i.e., the user didn't specify any other overlay advisors), and (c) all 6 default overlay advisor layer base combiners are being used (i.e., the user didn't exclude any default combiners or specify any non-base combiners), then there are 6 different signals (one for each advisor layer combiner (1 data point from the advisor layer combiner consensus, multiplied by 6 base overlay advisor outputs in the example) multiplied by 1 for each combiner (6 in the example)=36). These 6 overlay advisor outputs, have 6 different combiner predictions each, which are then distilled into a single prediction per advisor by using a Consensus Function. The default Consensus Function is to calculate the simple mathematical average of all 6 combiner predictions for each overlay advisor, which produces a new value that is the final prediction published to the interface screen illustrated by FIGS. 16 and 17 (theoretically, the user may specify another processing layer using add/delete control at 420, where these new values will be operated on by level 4 overlay advisors). Adding either a single additional instrument or a single additional advisor or overlay advisor increases the number of values that are produced and processed by 6 values. Enabling a single overlay advisor as a spectrum, multiplies the number of values that are produced and processed (30 in the example) by the number of different period variables in the spectrum, e.g., a 2-10 day spectrum specifies 9 different variations, or 9 multiplied by 24.

The 6 base combiners that comprise the default set of advisors are listed in window 296. All 6 of the current set of 6 base combiners namely Nearest Neighbor, Complex Nearest Neighbor, Decision Tree, Complex Decision Tree, Perceptron, and Multi-level Perceptron are strictly unique implementations of machine learning techniques, without any strategy bias. The mathematical and logical underpinnings of these "unbiased" machine learning components (which are also used as default Advisors, Overlay Advisors and Combiners) do not need to be published because they do not have any intrinsic strategy bias. In other words, they are strictly speaking, technology, not trading or risk management models.

The applicant's system uses Combiners to make the best possible use of the signal generating strategy elements by reviewing each individual signal's historic and current values, detecting interrelationships and performance patterns and learning when each signal type is performing well in the current market environment. The signals showing the most strength or expected to show the most strength presently are then most influential in the producing the system's final predictive output for each respective instrument or data type being modeled. At 818, 822 and 828 the user can specify the Look Back Time Frame, or the method of determining the LBTF, for Level 1, Level 2 and Level 3, respectively, by selecting one of the options from the drop down menu. In the example at 822, "Last n Periods" has been selected, causing the period specification field "where n=" to be displayed, as at 824. The user can then enter for n, the number of periods, or individual historical overlay advisor values, that they want the system to use in the machine learning based portions of the modeling processes. If, for example, the user specifies 500 days at 824, the system will use the last 500 values produced by Level 2 combiners, including the current period. If the user specifies a number of periods that exceeds the historical data available in the database for a given instrument or factor, (e.g., a newly listed stock of a newly created index included in the portfolio), the system will automatically use the maximum number of periods available, and will expand this to include new data until the specified number of periods exists (the applicant may provide an error notification pop-up window that requires user acknowledgement). The user can also specify that the LBTF for combiners' values at the prior level be "Dynamically Learned" as in the example at 818. This specifies that the LBTF will be dynamically adjusted to reflect the current optimum number of periods for each individual instrument or data type being modeled (i.e., each individual modeling subject has its own optimum which could potentially be different with each new predictive task).

At 820, 826 and 830, the Learned Optimization for combiners specified for use at Level 1, Level 2, and Level 3, respectively, allow the user to specify their preferred optimization parameters based upon narrow tuning objectives such as Lowest Volatility, Lowest Drawdown and Highest Profit. These settings operate on default parameters within the machine learning mechanisms themselves, by selecting a set of parameters that the applicant has specified as a default for each tuning objective, e.g., highest profit. On the advanced user Preferences screens there is a Learning Criterion-General window, as illustrated at 202 on FIG. 7, that allows users to fine-tune the learning optimization at each processing layer through more specific parameters, such as Maximize Correct % (direction), Maximize Correct % (magnitude), Minimize Consecutive Error (direction), and Minimize Consecutive Error (magnitude). The user can weight these preferences to create a balance that suits their needs for the portfolio currently being created or modified. The applicant may, in the future, re-specify the default settings for system tuning, and may add additional tuning options.

The user can establish advanced parameters for determination of the optimal LBTF and specify other advanced features by activating button Preferences at 786, which will open a separate interface screen that is the same or similar to FIG. 7, except that all preferences will be associated with combiners only, and only with respects to portfolio currently being created or modified. Any specifications by the user on the advanced preferences screen accessed through the Combiner Association/Management screen will override any specifications from a prior overlay advisor preferences screen for the operative portfolio. The applicant will specify a default LBTF for both instruments and factors, and can make available any possible parameter through the drop down menu, or other selection means.

At 784 of FIG. 18, the button Configure 1:1 provides the user with access to a separate interface screen, that is the same or similar to the one illustrated by FIG. 7, where all strategy elements that have been linked on a one-to-one basis to form a strategy chain can be associated with particular combiners.

A default condition for the system specifies three processing layers, Level 1 the indicator processing layer, Level 2 the advisor processing layer, and Level 3 the overlay advisor processing layer. The user can activate Add/Delete buttons (+/−) 816, to add or delete a level for the portfolio currently being created or modified. Adding or deleting a level will duplicate or remove, respectively, all of the other features associated with a processing layer. For example, a user may wish to create a portfolio that will itself be specified as an advisor or overlay advisor in another portfolio, and since the final prediction will be subjected to further processing, the user may wish to omit the Level 3 overlay advisor processing layer. The applicant will provide collections of pseudorandom number generators that can be used to break ties in decisions/selections by combiners, and add noise to prevent over commitment to exact values, and to model chaotic system activity. Being pseudo-random these processes are actually following a deterministic rule that might actually be correlated with a system's activity. The applicant will specify the defaults with respect to pseudorandom number generators, and will make the settings available to the user through the advanced user preferences screen accessed at 786, or through a separate interface screen.

In a preferred embodiment, the entire collection of system settings that operate on a particular processing layer/level can be optimized using one or more genetic algorithms. These genetic algorithms are seeded by either the default settings, or the user specified settings, and will then create combinations of system settings and evaluate the impact of these new combinations based upon a user supplied evaluation criterion (e.g., highest profit, or lowest volatility). The system's settings, as specified through the user interface screens, are either directly written into and/or translated into the applicant's intermediate language called Strategy Description Language ("SDL"), and stored in the database in SDL format. It is this SDL formatted settings data that the genetic algorithms used in the Dynamic Network Optimization feature of the system operate upon. The applicant may provide the user with the ability to specify their own genetic algorithms and/or modify default genetic algorithms through one or more additional interface screens.

At 790, 794, and 798, the user can enable the Dynamic Network Structure Optimization ("DNSO") feature of the system, for Level 1, Level 2, and Level 3, respectively. At 792, 796, and 800, the user can access an advanced Preferences screen, where the DNSO parameters can be specified, including the particulars settings or other controls that will be operated upon by the genetic algorithms and the degrees of freedom granted in the genetic optimization as various points within the system. The user can proceed to the next screen by clicking Finish button at 832.

Figure 19:
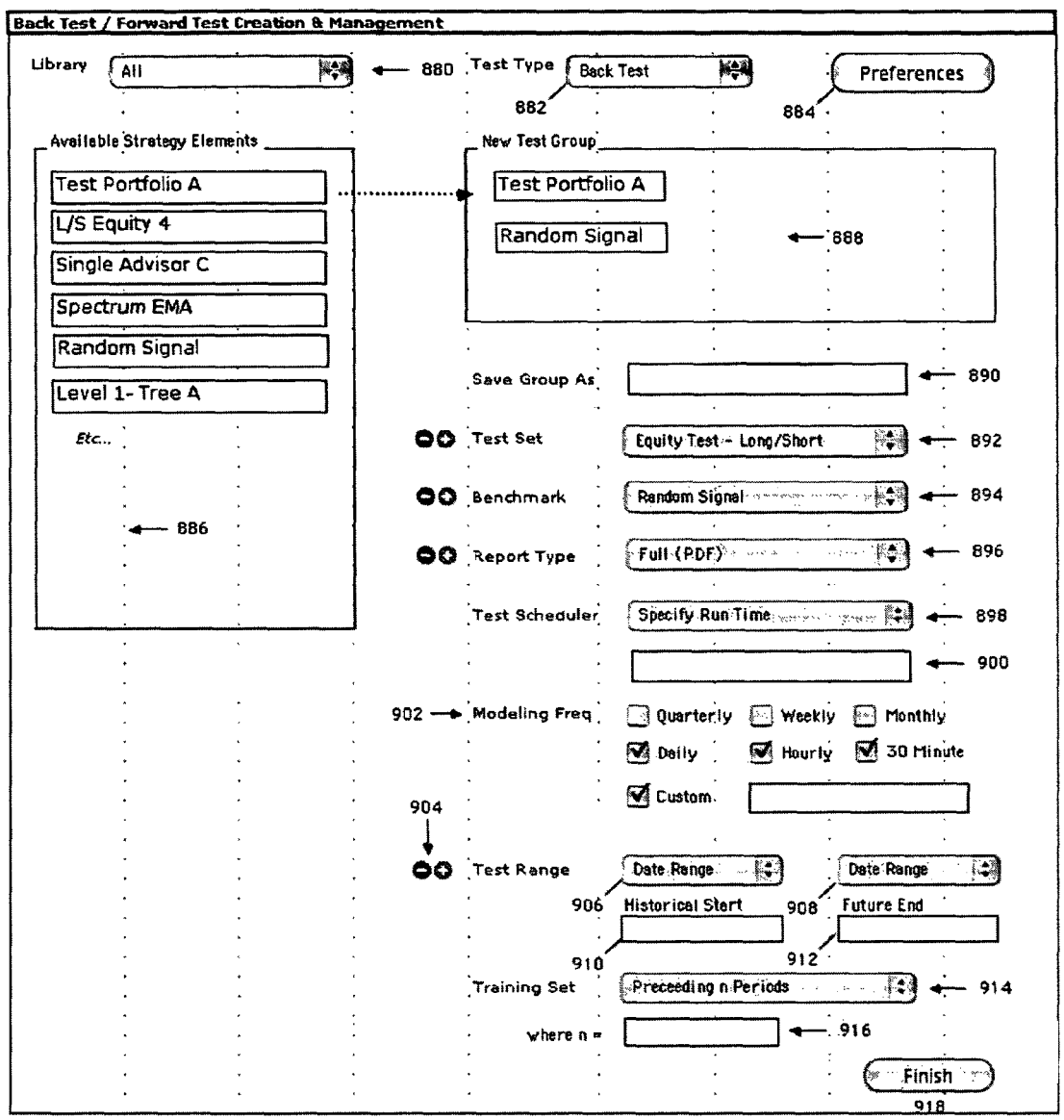
FIG. 19 illustrates a Portfolio Management interface screen.

FIG. 19 illustrates the Portfolio Management interface screen, which allows the user to perform a number of portfolio management functions. At 850 the user can activate a sort function by selecting a sort type from the drop down menu. Sort types can include the degree of similarity between portfolios, as in the example, asset class, research or executing portfolio types or any other possible sort type. Available Portfolios window 856, lists the symbol, icon or other identifier for each portfolio specified by the user selected sort type. A default condition is to show all portfolios in the system in alphabetical order. The user can drag-and-drop any portfolio symbol, icon or other identifier into Active Portfolio window at 858, which specifies the selected portfolio as the operative on in any subsequent action specified through this interface screen. A default condition- is that only one portfolio can be modified at a time. At 860, the user can select an action to perform on the specified portfolio from the drop down menu. In the example, the selected action "Convert to Overlay Advisor," requires additional specifications such as what portfolio or library the new overlay advisor will be added to, as shown in the example. Other selection mechanisms that present information required to complete an action will be automatically displayed, as shown in the example drop-down menus at 864, and 866, which allow the designation of either a portfolio or library destination, and the name of the portfolio or library, respectively. The user can specify additional actions for the same operative portfolio, such as renaming it, or delete actions by using the Add/Delete button (+/−) 862.

At 852 and 854, the user can access the Configure One-to-One and Preferences interface screens, respectively, for the specified portfolio. On the Configure One-to-One screen, the user will be provided with a drop-down menu or other selection mechanism, where the user will be required to specify the portion of the operative portfolio that they wish to modify, e.g., strategy elements within Level 1, Level 2 or Level 3, etc. Similarly, on the Preferences screen the user will be provided with a drop-down menu or other selection mechanism, where the user will be required to specify the portion of the operative portfolio for which they wish to modify the preferences, e.g., indicators, advisors, overlay advisors, combiners, etc. After the user has finished specifying the desired actions, they can activate Finish button 868.

Figure 20:
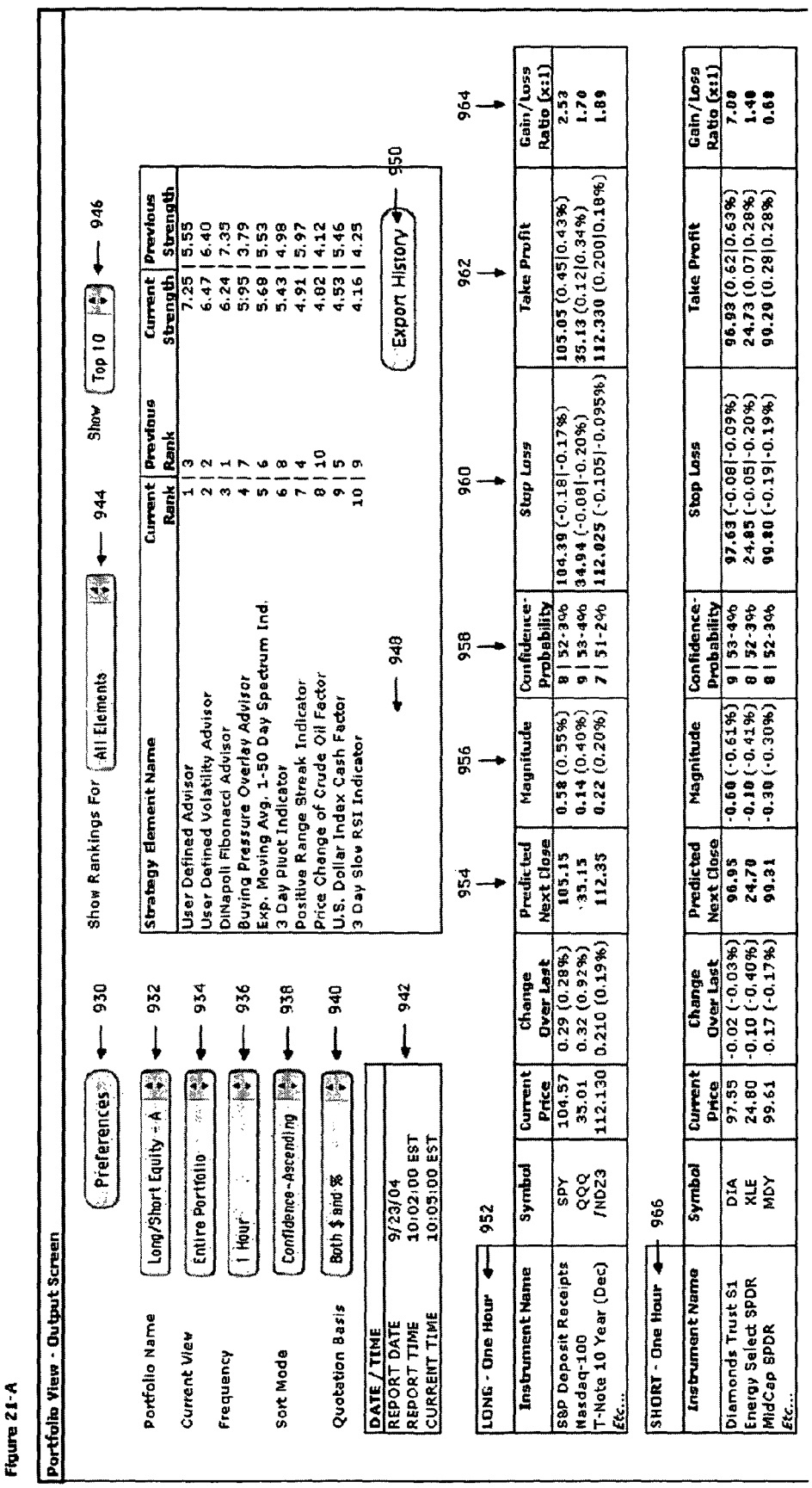
FIG. 20 illustrates a Back Test/Forward Test Creation and Management interface screen.

FIG. 20 illustrates the Back Test/Forward Test Creation and Management interface screen. The user can conduct back tests designed to test the performance of the selected portfolio historically by processing historical data through the current portfolio configuration (including strategy elements, machine learning components and tuning parameters, etc.) as well and forward tests which will test the performance of the selected portfolio using new, previously unseen data processed at each specified frequency. Back tests involve a defined historical number of periods where the data is used for training, and out-of-sample data (not used in the training data set, but not necessarily newly occurring data) from a second defined period is used for evaluating the performance of the portfolio configuration. The user can select any individual component of the system for testing from complete portfolios, trees from any processing layer, or any other signal generating strategy elements, e.g., indicators, advisors, overlay advisors, and combiners. The ability to back test and forward test any system component provides the user with maximum flexibility in research and strategy development.

At 880, the user can use the drop-down menu to specify the Library of strategy elements they wish to select from. In the example, the user has selected "All." A default condition is to show all portfolios specified as research portfolios by the user, e.g., "All Research Portfolios." The contents of the library the user specifies will be displayed in Available Strategy Elements window 886. At drop-down menu 882, the user can specify the test type, e.g. back or forward or a combination. The user can drag-and-drop the symbol, icon or other identifier of any available strategy element into a New Test Group window as shown at 888. If more than one strategy element is selected, the test will be run with identical parameters for each selected strategy element. At 906 and 908, the user can specify type of range for the test, i.e., date or period, and the range, e.g. start date of the test and end date for the test, can be entered into the fields at 910 and 912. By activating the Add/Delete buttons (+/−) at 904, the user can specify more than one date range.

To select a default set of parameters for the test, the user can select from drop-down menu 892, a Test Set. Default test sets are organized by asset classes and strategy types, so that variables such as slippage, e.g., currency futures vs. spot FX, and which signals to simulate execution of, e.g., dedicated short bias, are predefined for ease of use. At Preferences button 884, the applicant will provide advanced user preferences settings through a separate interface screen. This preferences screen will provide access to the full range of variables that a user could adjust, to reflect their perception of the actual market environment and its impact on the execution of their strategy. For example, the user can configure Test Set templates which record preferences which include, but are not limited to: the period covered in the test the benchmarks used for comparative analysis, the type of signal to include in the evaluation (such as the particular confidence levels, particular gain/loss ratios, etc), simulated stop loss and take profit levels, actual system recommended stop loss and take profit levels (may also be adjusted by a user defined variable), commission rates (as a flat dollar price or some function of the number of shares or other units), the user defined permissible long/short exposure ratio, leverage factors, etc. The preferences screen will also provide the user with an option to save and name the preferences set, so that it can be referenced for future use.

At 894, the user can select one or more benchmarks for the test group from a drop-down menu. The applicant will provide default benchmarks, which will range from random signal generation to buy and hold comparisons, to popular indices. Selection of a benchmark will produce reports that allow for quick and easy comparison, through graphical representations, performance figures and industry standard statistical metrics. At 896, the user can specify the Report Type they would like generated, e.g., full or summary, and the format, e.g., .pdf or .xls. At 890, the user is provided with a Save Group As field for naming the test group for archiving and re-testing purposes. Modeling Frequencies for the test can be selected by checking the boxes at 486, which correspond to the prediction frequencies that will be tested. If a user elects to designate a custom frequency, they will enter notation that will be specified by the applicant, e.g., Day(09:00-15:30) NY.GMT, which specifies a custom day consisting of price activity between 9:00 am and 3:30 pm in New York. A default condition is that all strategy elements included in the test group will be tested all designated frequencies. At 898, the Test Scheduler drop-down menu allows the user to specify when the testing will be performed by the system. The user can specify that the test run immediately upon activating Finish button 918, or they can specify that tests run at an off peak time, such as after execution portfolio processing is finished (e.g., after the close of market), or they can specify the exact time they want the test to run as shown in the example. If the user selects Specify Run Time, a field for entering the time will be displayed as at 900.

The decision path transparency (described in more detail later) provided for each type of strategy element over the entire test period, provides the user with a very robust research tool that can lead to discovery of unique strategy ideas.

Figure 21:
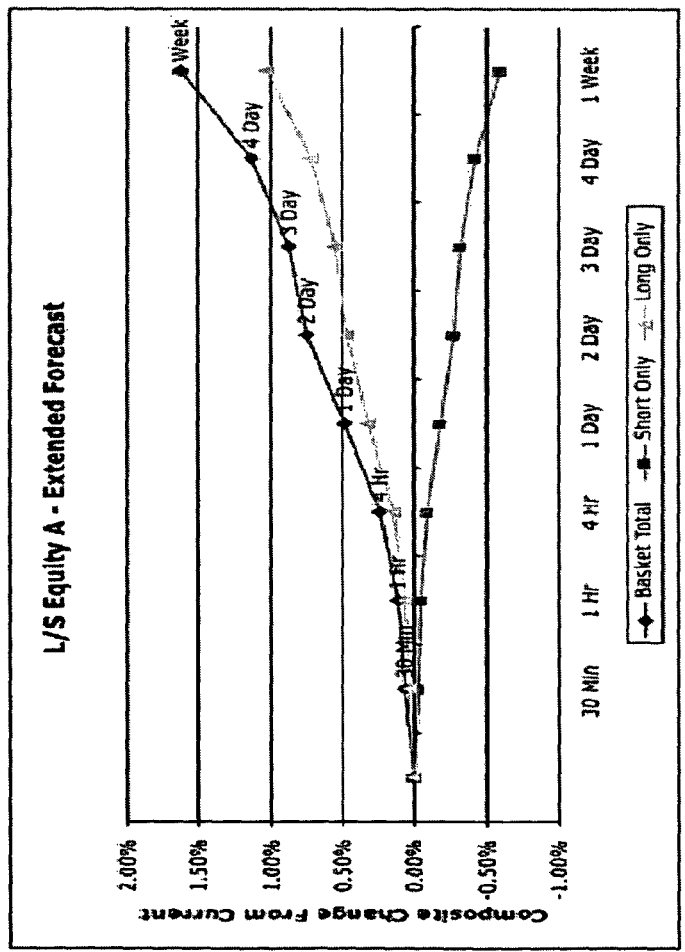
FIG. 21A is a first part of a Portfolio View Output Screen.
FIG. 21B is a second part of a Portfolio View Output Screen.

FIG. 21 illustrates the Portfolio View Output Screen which is one example of an interface screen based interactive report that allows the user to organize and analyze the system's output, and information derived from the system's output. A default condition is that this screen is the primary interface screen, i.e., the home page displayed after the user logs in, from which all other system screens can be accessed. The user can specify the portfolio they wish to view by selecting from all research and execution portfolio types available under drop down menu labeled Portfolio Name at 932. At 934, the Current View drop down menu allows the user to quickly change what information is displayed. For example, the user can view all information for the entire portfolio, or they could view only the long or short side of the portfolio. Drop down menu Sort Mode, at 938, allows the user to sort the prediction output data for both the long and short side of the portfolio in a variety of ways, e.g., by Confidence-Ascending (confidence levels are discussed in more detail later) as in the example, or by any number of other output types and formats, such as Magnitude-Descending, etc. At Quotation Basis drop down menu 940, the user can specify whether they want to see currency and/or percentage based quotation for data such as instrument prices and predicted magnitude moves, etc. The example at 942 shows the Date/Time window, where the report date and time as well as the current local portfolio time is shown.

With each new prediction task, the system provides complete decision path transparency, which is displayed as in the example at 948. At 944, the Show Rankings For drop down menu allows the user to specify which category of strategy elements they want to view, and at 946, the Show drop down menu allows the user to specify the number of strategy elements they want to be displayed. A default condition is to show the top 10 user provided/created strategy elements (i.e., excluding unbiased base machine learning components) of all types, as shown in the example. Both the current and previous rank and strength is also shown for each strategy element displayed. Export History button 950 allows the user to export a complete decision path history. Activating the button displays a separate interface screen where the user can select the export file type, e.g., xls, .csv, .txt, .pdf or html, as well as the date or period based range for the data to be exported. The applicant will specify a default file format and data layout.

At 952 and 966, the example shows the Long—One Hour window and Short—One Hour window (includes the entire tabular display immediately below each respective label) in one possible configuration, where long and short recommendations for a one hour modeling frequency are shown, respectively. The first four columns display the instrument name (or other data type being modeled), symbol, current price (real-time), the change over last (i.e., the difference between the close of the respective modeling frequency period and the prior period), which represent forms of data originating from a data feed, that is either raw, e.g., the current price, or derivative of raw data, i.e., is not an output of the system processes, like the change over the last periods closing price.

The column at 954 displays the Predicted Next Close, which is the price the instrument (or other value for non-instrument data types) that is expected to be reached before or at the close of the current period for the specified modeling frequency. The column at 956, Magnitude, is the predicted magnitude of the movement in the price/value for the instrument or other data type for the current period (i.e., between the prediction output time and the next prediction output), and can be displayed in currency units and/ or a percentage of the base instrument price or data type value. The column at 958, Confidence—Probability, displays the Confidence Level (scale of 1-10 with 1 being the lowest confidence, and 10 being the highest confidence) and it's corresponding Probability statistics (expressed as a percentage) of the system's prediction for each respective instrument or data type, for the current period. The column at 960 and 962, Stop Loss and Take Profit, display the recommended stop loss and take profit levels for each respective instrument, respectively (non-instrument data types that can not be traded directly or indirectly, e.g., unemployment data, return N/A). Stop loss levels for long positions are a function of the system's predicted Low price for each respective instrument for the current period and prediction error each respective instrument's prediction error. Take profit levels are a function of the predicted magnitude, (which can be either the expected High or Close, depending on what the user specifies) for each respective instrument for the current period, and the prediction error. The stop loss and take profit levels for the short positions are derived from the same data and function, except in a precisely converse way, e.g., stop losses for short positions are based upon the High and prediction error. These dynamically optimized stop loss and take profit levels can be used to replace or augment the arbitrarily fixed stop loss and take profit levels that are widely used in the financial sector. Because each instrument is modeled individually by the system, such levels are tailored to the unique characteristics of each instrument's price activity in the current market environment, which is something that can not be accomplished with other methods, e.g., always placing a stop loss so that not more than 0.25% is lost on a single instrument. Stop loss and take profit levels are also used to produce other valuable decision support data, that the can be used to evaluate instruments in the portfolio and filter opportunities and select the most advantageous recommendations to follow based upon a user's own investment objectives and risk tolerance. For example, column Gain/Loss Ratio at 964, provides the user with a very simple way to quickly and easily filter out the opportunities with the lowest risk vs. reward, which is measured by dividing the expected gain if the take profit level is reached by the expected loss if the stop loss level is reached first. In the example, the gain/loss ratio column is sorted in descending order (default), and if the user was going to choose to execute only one trade from both the long and short positions, the user might select the first instrument in each table, perhaps further filtering this data by reviewing the confidence levels and only accepting trades with a confidence level of 9 or above, in which case the user would execute the second trade in the long list (QQQ) and the first on the short list (DIA).

The foregoing data is either produced directly from processes unique to the system, e.g., the magnitude and confidence, or they are derived from such data, as with the predicted next close, recommended stop loss and take profit levels and gain/loss ratio. All data that is available for long positions is also available for short positions (i.e., instruments or other data types which values are expected to decrease in the current period, finishing lower than the closing value from the prior period). At 968, the Portfolio ID drop down menu shows the portfolio the that is charted immediately below it, with the operative portfolio being specified by default, At 970, Chart Type drop down menu allows the user to select from a variety of default chart types or chart types created through the separate interface screen provided by the applicant that can be accessed by activating Chart Preferences button 974. At 972, the Compare To drop down menu allows the user to add an additional item to the chart, e.g., another instrument or basket of instruments, or a benchmark. At 976, the user can enable or disable a smoothing function that will operate on plotted items. The applicant can make available, any possible chart utilities.

The particular format and content of FIG. 21 are for illustrative purposes only, and the applicant can make available any number of different windows that display the same or derivative data any possible format, as well as provide mechanisms for the user to utilize any new display type or feature, e.g., through advanced user preferences at 974.

Figure 22:
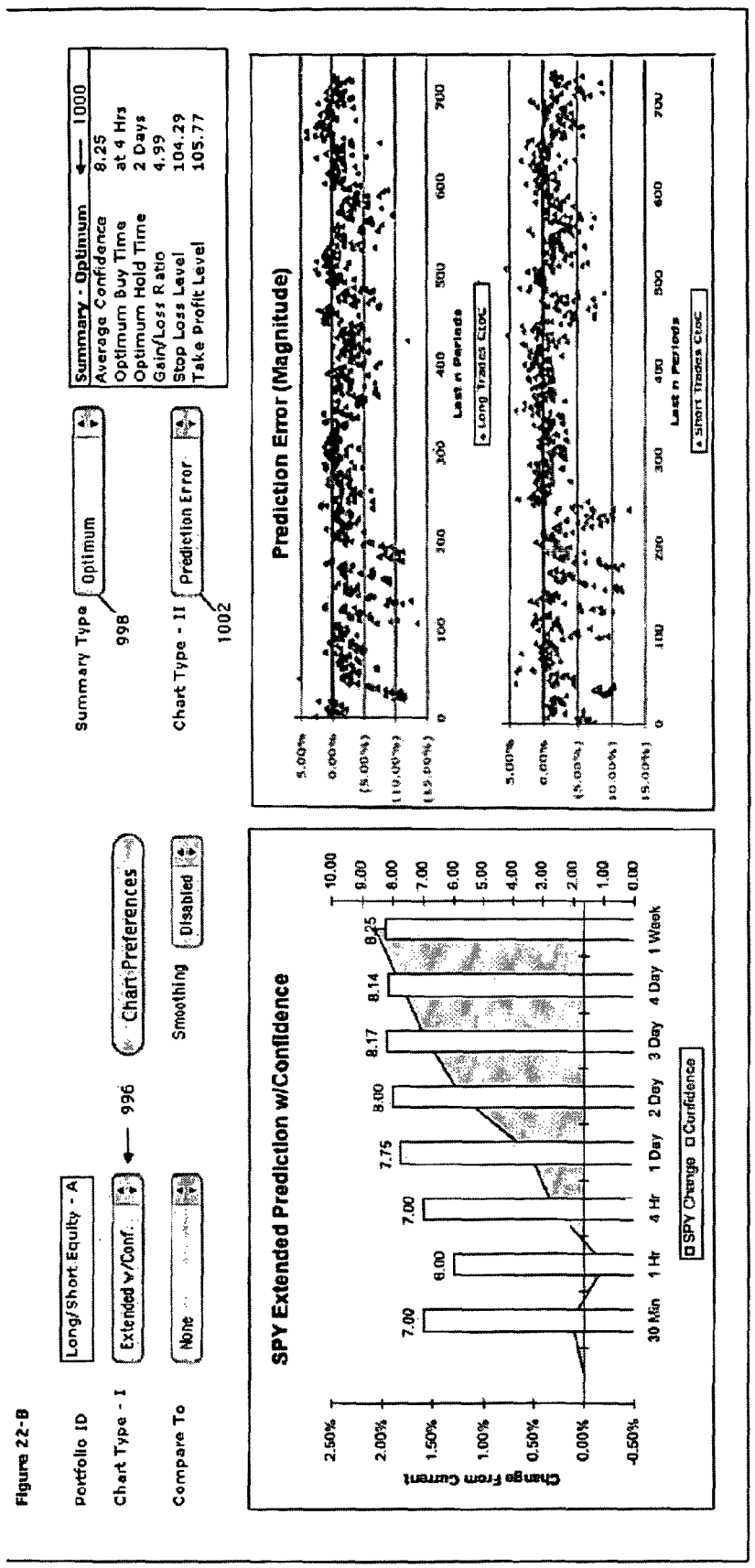
FIG. 22A is a first part of an Instrument View/Output Screen.
FIG. 22B is a second part of an Instrument View/Output Screen.

FIG. 22 illustrates one possible configuration of an Instrument View—Output Screen, which the user can access, for example, by clicking on any instrument in the long or short position tables on the Portfolio View screen. The example shown is for SPY (S&P Deposit Receipts). The features that differ from the Portfolio View screen illustrated by FIG. 21, are minimal for the sake of brevity. At 990, the Frequency drop down menu shows that Multi-Period has been selected. This selection specifies what information is shown in the window at 992 (including the entire tabular display below the label), which in the example, the selection multi-period effects Frequency at 994, causing all available prediction frequencies for this instrument to be shown. This selection will also effect other displays, defaulting them to the matching specification, as shown at 996 in the example of Chart Type—I, which is set to Extended Prediction with Confidence, displayed immediately below it. All features that are available for an entire portfolio view are also available for a single instrument view, and some of the features shown in FIG. 22 for instruments, could also be applied to entire portfolios, e.g., for basket trading, etc. Any number of charts can be viewed by the user, and at 1002, there is a selection mechanism for Chart Type—II, which, for purposes of illustration, displays the Prediction Error chart immediately below. At 998, a user can select a Summary Type, which summarizes all of the vital statistics based upon the type of summary chosen. At 1000, the example shows the Summary—Optimum, which provides information that is useful in making a decision based upon the larger information set in the window where all frequency data is displayed. The applicant will provide summary type templates which can be modified in whole or in part by the user through the advanced user preferences screen, where the user can chose to display any prediction output data or metric available within the system. All windows/displays in both FIGS. 21 and 22 can be moved and resized to create a custom view that is recalled for the user each time they log in.

Although the invention has been discussed with respect to specific embodiments, these embodiments are merely descriptive, and not restrictive, of different aspects of the invention. For example, although specific user interface controls such as buttons, sliders, menus, text boxes, etc., are disclosed, any type of user interface controls can be adapted for use with the present invention. For example, voice detection, gestures or positional information, three-dimensional or "virtual reality" or other types of controls or input devices are possible. Also, any suitable type of visual output or representation can be used in place of, or in addition to, the example displays of the disclosed embodiments. Other output formats can be used including audio, three-dimensional, etc.

Although specific factors, indicators, instruments, algorithms, parameters, values or other computational items are disclosed, other embodiments may use any other suitable types of computational items including data structures, data representations, etc. Although functionality has been described with respect to a preferred system or collection of features, other embodiments can include only portions of the functionality disclosed herein. Various of the functions can be used as auxiliary functions, or "plug-ins," to other analysis systems. The functionality discussed herein can be used as a standalone system or in conjunction with other programs or systems.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A computer implemented method for predicting the behavior of an instrument, the method using a processor coupled to a user input device and a display, the method comprising:
   storing a machine learning mechanism and a plurality of identified combiner processes in the processor;
   identifying via the processor a plurality of predictor instruments wherein each one of the plurality of predictor instruments includes associated data points defining properties of the one of the plurality of predictor instruments;
   displaying the plurality of predictor instruments on the display;
   receiving a selection of a predictor instrument from the displayed predictor instruments via the user input device;
   displaying the plurality of combiner processes on the display;
   receiving a selection of a combiner process from the displayed combiner processes via the user input device;
   identifying, via the processor and using the selected combiner process, linear and non-linear relationships between the associated data points of the selected predictor instrument using a machine learning mechanism;
   generating via the processor and based on the identified linear and non-linear relationships a prediction and a recommendation concerning an outcome of the selected predictor instrument;
   displaying the prediction and the recommendation on the display.

2. The method of claim 1, wherein an instrument includes a financial security.

3. The method of claim 2, wherein the instrument includes a stock.

4. The method of claim 2, wherein the instrument includes a bond.

5. The method of claim 2, wherein the instrument includes an option.

6. The method of claim 2, wherein the instrument includes a commodity future.

7. The method of claim 1, further comprising accepting a signal from a user input device to designate one or more factors associated with the data points.

8. The method of claim 1, wherein each of the plurality of the predictor instruments include data points having data types, wherein a factor includes a data type designation, the method further comprising:
- identifying a plurality of indicators;
- displaying the plurality of indicators on the display;
- receiving from the user input device a selection of at least one indicator of the plurality of indicators as at least one active indicator;
- using factors to determine data points having data types in accordance with a factor's data type; and
- using the determined data points as inputs to the at least one active indicator.

9. The method of claim 8, wherein a data type includes an open value.

10. The method of claim 8, wherein a data type includes a close value.

11. The method of claim 8, wherein a data type includes a high value.

12. The method of claim 8, wherein a data type includes a low value.

13. The method of claim 8, wherein a data type includes a price/earnings ratio value.

14. The method of claim 8, wherein the accuracy of said predicting the outcome is fed back to the at least one active indicator for subsequent predictions of outcomes.

15. The method of claim 1, further comprising using at least one of a data feed and a database linked to the processor to provide an input as an active indicator.

16. The method of claim 15, further comprising storing and retrieving the record of the at least one active indicator;
- and using the retrieved record of the at least one active indicator to predict the behavior of the selected predictor instrument.

17. An apparatus for predicting the behavior of a system, the apparatus comprising:
- a processor coupled to a user input device and a display;
- a non-transitory, machine-readable medium including code executable by the processor, the non-transitory machine-readable medium including:
- code for a machine learning mechanism executable by the processor;
- code for a plurality of identified combiner processes;
- code for identifying a plurality of predictor instruments wherein each one of the plurality of predictor instruments includes associated data points defining properties of the one of the plurality of predictor instruments;
- code for displaying the plurality of predictor instruments on the display;
- code for receiving a selection of one of the predictor instruments via the user input device;
- code for displaying the plurality of combiner processes on the display;
- code for receiving a selection of a combiner process from the displayed combiner processes via the user input device;
- code for identifying, via the processor and using the selected combiner process, linear and non-linear relationships between the associated data points of the selected predictor instrument using the machine learning mechanism;
- code for generating via the processor and based on the identified linear and non-linear relationships, a prediction and a recommendation concerning an outcome of the selected predictor instrument; and
- code for displaying the prediction and the recommendation on the display.

18. A non-transitory machine-readable medium including code executable by a processor for predicting the behavior of an instrument, the non-transitory machine-readable medium comprising:
- code for a machine learning mechanism executable by the processor;
- code for a plurality of identified combiner processes;
- code for identifying a plurality of predictor instruments wherein each one of the plurality of predictor instruments includes associated data points defining properties of the one of the plurality of predictor instruments;
- code for displaying the plurality of predictor instruments on the display;
- code for receiving a selection of one of the predictor instruments via the user input device;
- code for displaying the plurality of combiner processes on the display;
- code for receiving a selection of a combiner process from the displayed combiner processes via the user input device;
- code for identifying, via the processor and using the selected combiner process, linear and non-linear relationships between the associated data points of the selected predictor instrument using the machine learning mechanism;
- code for generating via the processor and based on the identified linear and non-linear relationships, a prediction and a recommendation concerning an outcome of the selected predictor instrument; and
- code for displaying the prediction and the recommendation on the display.

* * * * *